US012607529B2

(12) United States Patent (10) Patent No.: US 12,607,529 B2
Uchida et al. (45) Date of Patent: Apr. 21, 2026

(54) TORQUE DETECTION SYSTEM

(71) Applicant: DENSO CORPORATION, Kariya-city (JP)

(72) Inventors: Keisuke Uchida, Kariya-city (JP); Seiji Takasaka, Kariya-city (JP)

(73) Assignee: DENSO CORPROATION, Kariya-city (JP)

( * ) Notice: Subject to any disclaimer, the term of this patent is extended or adjusted under 35 U.S.C. 154(b) by 310 days.

(21) Appl. No.: 18/410,071

(22) Filed: Jan. 11, 2024

(65) Prior Publication Data

US 2024/0142325 A1 May 2, 2024

Related U.S. Application Data

(63) Continuation of application No. PCT/JP2022/037505, filed on Oct. 6, 2022.

(30) Foreign Application Priority Data

Oct. 22, 2021 (JP) ................................. 2021-173061
Sep. 5, 2022 (JP) ................................. 2022-140804

(51) Int. Cl.
*G01L 3/10* (2006.01)
*B62D 5/04* (2006.01)
(52) U.S. Cl.
CPC ............ *G01L 3/104* (2013.01); *B62D 5/0463* (2013.01)
(58) Field of Classification Search
CPC .............................. G01L 3/104; G01L 5/221
See application file for complete search history.

(56) References Cited

U.S. PATENT DOCUMENTS 6,912,923 B2 * 7/2005 Froehlich ................ G01L 3/104
73/862.331
7,174,795 B2 * 2/2007 Feng ...................... G01D 5/145
73/862.331
(Continued)

FOREIGN PATENT DOCUMENTS

JP 2005265580 A 9/2005
JP 2013195288 A 9/2013
JP 5948100 B2 7/2016

OTHER PUBLICATIONS

U.S. Appl. No. 18/410,224, filed Jan. 11, 2024, Okui.
U.S. Appl. No. 18/410,036, filed Jan. 11, 2024, Suzuki et al.

*Primary Examiner* — Freddie Kirkland, III
(74) *Attorney, Agent, or Firm* — Posz Law Group, PLC

(57) ABSTRACT

In a torque sensor of a torque detection system, in a state where a torque is not generated, a first magnetic detector overlaps with one (e.g., N-pole) of a plurality of magnetic poles of a magnet when the one of the plurality of magnetic poles of the magnet is radially projected onto the first magnetic detector. A second magnetic detector overlaps with another one (e.g., S-pole) of the magnetic poles when the another one of the magnetic poles is radially projected onto the second magnetic detector. A motor control device calculates a sum of a value, which relates to a detected strength of a magnetic field detected by the first magnetic detector, and a value, which relates to a detected strength of the magnetic field detected by the second magnetic detector. The motor control device is configured to calculate a steering torque based on the sum.

33 Claims, 45 Drawing Sheets

(56)                    References Cited

U.S. PATENT DOCUMENTS

|  |  |  |  |  |
|---|---|---|---|---|
| 7,363,825 | B2 * | 4/2008 | Feng | G01L 3/104 |
|  |  |  |  | 73/862.325 |
| 8,448,528 | B2 * | 5/2013 | McDonald | B62D 6/10 |
|  |  |  |  | 73/862.331 |
| 8,915,150 | B2 * | 12/2014 | Shimomura | G01L 3/101 |
|  |  |  |  | 73/862 |
| 9,459,165 | B2 * | 10/2016 | Hama | H02K 11/24 |
| 10,274,385 | B2 * | 4/2019 | Nishiguchi | G01L 3/104 |
| 10,814,909 | B2 * | 10/2020 | Yang | G01B 7/06 |
| 10,948,369 | B2 * | 3/2021 | Shigeta | B62D 6/10 |
| 11,112,321 | B2 * | 9/2021 | Tanaka | G01R 33/0047 |
| 11,255,931 | B2 * | 2/2022 | Suzuki | G01L 5/221 |
| 11,353,521 | B2 * | 6/2022 | Tanaka | G01R 33/0076 |
| 11,579,211 | B2 * | 2/2023 | Tanaka | G01R 33/0076 |
| 11,860,053 | B2 * | 1/2024 | Fröhlich | G01L 3/104 |
| 2004/0093961 | A1 * | 5/2004 | Nakane | G01L 3/104 |
|  |  |  |  | 73/862.331 |
| 2004/0194560 | A1 | 10/2004 | Froehlich et al. |  |
| 2013/0312539 | A1 | 11/2013 | Shimomura et al. |  |
| 2015/0276519 | A1 * | 10/2015 | Hama | G01L 3/101 |
|  |  |  |  | 310/68 B |
| 2020/0041366 | A1 * | 2/2020 | Tanaka | B62D 6/10 |
| 2020/0386636 | A1 * | 12/2020 | Shigeta | B62D 5/0481 |
| 2021/0109166 | A1 * | 4/2021 | Tanaka | G01R 33/091 |
| 2021/0302246 | A1 * | 9/2021 | Fröhlich | G01L 3/104 |
| 2022/0291297 | A1 * | 9/2022 | Tanaka | G01L 3/10 |
| 2024/0142324 | A1 * | 5/2024 | Suzuki | G01L 3/104 |

* cited by examiner

TORQUE DETECTION SYSTEM

CROSS REFERENCE TO RELATED APPLICATIONS

This application is a continuation application of International Patent Application No. PCT/JP2022/037505 filed on Oct. 6, 2022, which designated the U.S. and claims the benefit of priority from Japanese Patent Application No. 2021-173061 filed on Oct. 22, 2021 and Japanese Patent Application No. 2022-140804 filed on Sep. 5, 2022. The entire disclosures of all of the above applications are incorporated herein by reference.

TECHNICAL FIELD

The present disclosure relates to a torque detection system.

BACKGROUND

Previously, as recited in, for example, the patent literature 1 (JP5675700B2 corresponding to US2013/0312539A1 while the contents of US2013/0312539A1 are incorporated by reference herein in its entirety), there has been proposed a torque sensor that includes a magnet, yokes, magnetism collecting rings (serving as magnetism collecting elements) and Hall ICs. The magnet is rotated together with the steering shaft. The yokes are rotated together with the steering shaft to change a magnetic field generated by the magnet. Furthermore, the magnetism collecting elements guide the magnetic field, which is changed by the yokes, to the Hall ICs. The Hall ICs detect the strength of this magnetic field to detect a torque applied to the steering shaft.

SUMMARY

This section provides a general summary of the disclosure, and is not a comprehensive disclosure of its full scope or all of its features.

According to one aspect of the present disclosure, there is provided a torque detection system configured to detect a torque generated at a detection subject. The torque detection system includes a torque sensor. The torque sensor includes a magnet, a rotor, at least one yoke, a first magnetic detector and a second magnetic detector. The magnet is configured to generate a magnetic field and is configured to be rotated together with the detection subject about an axis of the magnet which extends in an axial direction of the magnet. The rotor is shaped in a ring form and is configured to be rotated together with the detection subject. The at least one yoke includes a ring and a plurality of claws. The ring is shaped in a ring form and is configured to be rotated together with the rotor. The plurality of claws project from the ring in the axial direction and are thereby opposed to the magnet in a direction that is perpendicular to the axial direction. The plurality of claws are configured to be rotated together with the ring and thereby collect the magnetic field generated by the magnet. The first magnetic detector is configured to detect a strength of the magnetic field which corresponds to the torque and changes in response to a change in a relative angle of the at least one yoke relative to the magnet in a rotational direction of the magnet. The second magnetic detector is configured to detect the strength of the magnetic field which corresponds to the torque and changes in response to the change in the relative angle of the at least one yoke relative to the magnet in the rotational direction of the magnet.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
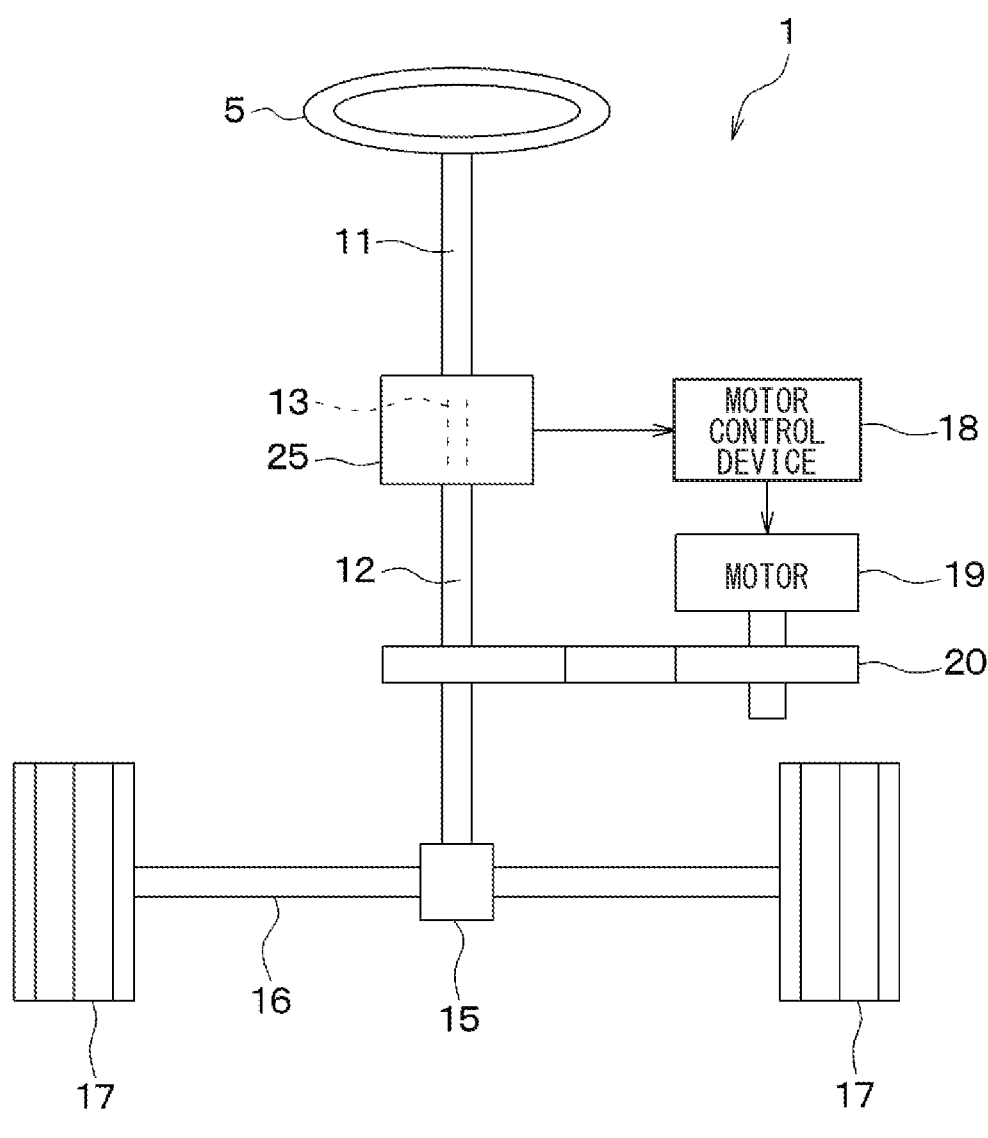
FIG. 1 is a diagram of a steering system in which a torque sensor of a torque detection system of a first embodiment is applied.

According to the study of the inventors of the present application, in a state where an electric motor is placed adjacent to the previously proposed torque sensor described above, the magnetism collecting elements guide the magnetic field, which is changed by the yokes, to the Hall ICs, and the magnetism collecting elements also guide a magnetic field, which is generated by the electric motor, to the Hall ICs. Therefore, the amount of noises, which are detected by the Hall ICs, is increased, and thereby a torque detection accuracy may be deteriorated. It is conceivable to eliminate the magnetism collecting elements to improve the tolerance of the torque sensor against the interfering magnetic field. However, the magnetism collecting elements protect the Hall ICs such that the magnetic field, which leaks from the magnet, does not pass through the Hall ICs. Therefore, when the magnetism collecting elements are eliminated or when the relative position of the Hall ICs relative to the yokes deviates, the Hall ICs detect the strength of the magnetic field leaking from the magnet in addition to the strength of the magnetic field changed by the yokes. Therefore, in the previously proposed torque sensor described above, when the magnetism collecting elements are eliminated, or when the relative position of the Hall ICs relative to the yokes deviates, the magnetic field leaking from the magnet becomes the noise, and thereby the tolerance to the noise magnetic field leaking from the magnet is deteriorated.

According to one aspect of the present disclosure, there is provided a torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:

a ring which is shaped in a ring form and is configured to be rotated together with the rotor; and a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet;

a first magnetic detector that overlaps with the ring when the ring is projected onto the first magnetic detector in the axial direction, wherein the first magnetic detector is configured to detect a strength of the magnetic field which corresponds to the torque and changes in response to a change in a relative angle of the at least one yoke relative to the magnet in a rotational direction of the magnet; and a second magnetic detector that overlaps with the ring when the ring is projected onto the second magnetic detector in the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detector and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in a corresponding orthogonal direction that is perpendicular to the axial direction and is directed to the one of the plurality of magnetic poles;

in the state where the torque is not generated, the second magnetic detector overlaps with another one of the plurality of magnetic poles, which has a polarity that is different from a polarity of the one of the plurality of magnetic poles, when the another one of the plurality of magnetic poles is projected onto the second magnetic detector in a corresponding orthogonal direction that is perpendicular to the axial direction and is directed to the another one of the plurality of magnetic poles; and the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum.

According to another aspect of the present disclosure, there is provided a torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:

a ring which is shaped in a ring form and is configured to be rotated together with the rotor; and a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet;

a first magnetic detector that overlaps with the ring when the ring is projected onto the first magnetic detector in the axial direction, wherein the first magnetic detector is configured to detect a strength of the magnetic field which corresponds to the torque and changes in response to a change in a relative angle of the at least one yoke relative to the magnet in a rotational direction of the magnet; and a second magnetic detector that overlaps with the ring when the ring is projected onto the second magnetic detector in the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detector and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in an orthogonal direction that is perpendicular to the axial direction and is directed to the one of the plurality of magnetic poles, and the first magnetic detector is placed in the axial direction on one side of a center line, which passes through a center of the one of the plurality of magnetic poles and extends in the orthogonal direction that is perpendicular to the axial direction;

in the state where the torque is not generated, the second magnetic detector overlaps with the one of the plurality of magnetic poles when the one of the plurality of magnetic poles is projected onto the second magnetic detector in the orthogonal direction that is perpendicular to the axial direction, and the second magnetic detector is placed in the axial direction on another side of the center line which is opposite to the one side; and the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum.

According to a further aspect of the present disclosure, there is provided a torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:

a ring which is shaped in a ring form and is configured to be rotated together with the rotor;

a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet; and a flange which projects from the ring in the axial direction;

a first magnetic detector that overlaps with the flange when the flange is projected onto the first magnetic detector in the direction perpendicular to the axial direction, wherein the first magnetic detector is configured to detect a strength of the magnetic field which corresponds to the torque and changes in response to a change in a relative angle of the at least one yoke relative to the magnet in a rotational direction of the magnet; and a second magnetic detector that overlaps with the flange when the flange is projected onto the second magnetic detector in the direction perpendicular to the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detector and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in a corresponding orthogonal direction that is perpendicular to the axial direction and is directed to the one of the plurality of magnetic poles;

in the state where the torque is not generated, the second magnetic detector overlaps with another one of the plurality of magnetic poles, which has a polarity that is different from a polarity of the one of the plurality of magnetic poles, when the another one of the plurality of magnetic poles is projected onto the second magnetic detector in a corresponding orthogonal direction that is perpendicular to the axial direction and is directed to the another one of the plurality of magnetic poles; and the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum.

Therefore, the direction of the magnetic field (magnetic field lines), which leaks from the magnet and is detected by the second magnetic detector, is opposite to the direction of the magnetic field (magnetic field lines), which leaks from the magnet and is detected by the first magnetic detector. Thus, the noise, which is detected by the first magnetic detector, and the noise, which is detected by the second magnetic detector, are canceled with each other. Furthermore, the calculation processor calculates the sum of the value, which relates to the detected strength of the magnetic field detected by the first magnetic detector, and the value, which relates to the detected strength of the magnetic field detected by the second magnetic detector. Thereby, the noise, which is detected by the first magnetic detector, and the noise, which is detected by the second magnetic detector, are removed. Therefore, even when the magnetism collecting elements are eliminated, or when the relative position of the magnetic detector relative to the yoke deviate, the tolerance to the noise magnetic field leaking from the magnet is improved.

Embodiments of the present disclosure will be described with reference to the drawings. In each of the following embodiments, portions, which are the same or equivalent to each other, will be indicated by the same reference signs.

First Embodiment

A torque sensor 25 of a torque detection system of the present embodiment is used in, for example, a steering system 1 installed in a vehicle. First of all, this steering system 1 will be described.

Figure 2:
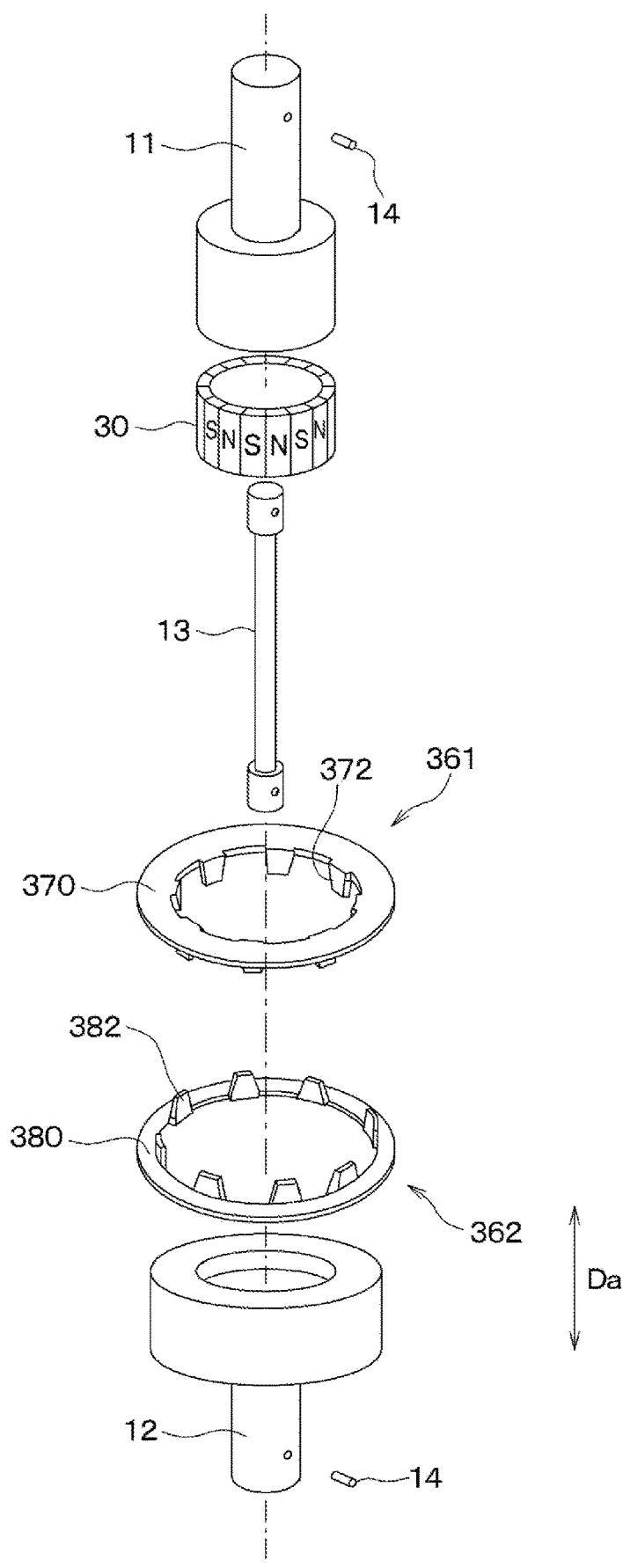
FIG. 2 is an exploded perspective view of a portion of the steering system.

The steering system 1 assists a steering operation for changing the orientation of wheels 17 of the vehicle. Specifically, as shown in FIGS. 1 and 2, the steering system 1 includes a steering wheel 5, a first steering shaft 11, a torsion bar 13 and a second steering shaft 12. Furthermore, the steering system 1 includes shaft pins 14, a pinion gear 15, a rack shaft 16, the wheels 17, the torque sensor 25, a motor control device 18, an electric motor 19 and reduction gears 20.

As shown in FIG. 1, the steering wheel 5 is rotated through the steering operation of the steering wheel 5 by a driver of the vehicle or an automated driving of the vehicle.

The first steering shaft 11 is coupled to the steering wheel 5. Therefore, the first steering shaft 11 is rotated together with the steering wheel 5.

The torsion bar 13 is coupled to the first steering shaft 11. Therefore, the torsion bar 13 is rotated together with the steering wheel 5 and the first steering shaft 11.

The second steering shaft 12 is coupled to the torsion bar 13. Therefore, the torsion bar 13 is rotated together with the steering wheel 5 and the first steering shaft 11.

As shown in FIG. 2, one of the shaft pins 14 is inserted into a hole of the first steering shaft 11 and a hole of the torsion bar 13 which correspond with each other. Thereby, the first steering shaft 11 and the torsion bar 13 are fixed together. Furthermore, another one of the shaft pins 14 is inserted into a hole of the second steering shaft 12 and another hole of the torsion bar 13 which correspond with each other. Thereby, the second steering shaft 12 and the torsion bar 13 are fixed together.

As shown in FIG. 1, the pinion gear 15 is coupled to the second steering shaft 12. Furthermore, the pinion gear 15 is meshed with the rack shaft 16 described later. In addition, the pinion gear 15 converts the rotational motion of the second steering shaft 12 into linear motion of the rack shaft 16.

The rack shaft 16 is coupled to the wheels 17 through tie rods (not shown). The rack shaft 16 changes the orientation of the wheels 17 through the linear motion.

A portion of the torsion bar 13 is inserted into the torque sensor 25. Furthermore, the torque sensor 25 detects a signal that corresponds to the torsional torque generated at the torsion bar 13 through the rotation of the steering wheel 5. Thereby, the torque sensor 25 detects the steering torque. Furthermore, the torque sensor 25 outputs the signal, which corresponds to the detected steering torque, to the motor control device 18. The torque sensor 25 will be described in detail later. The steering torque is the torque that is exerted when the steering wheel 5 is rotated.

The motor control device 18 includes a microcomputer as its main component and includes a CPU, a ROM, a flash memory, a RAM, an I/O device, a drive circuit, and bus lines connecting these components. The motor control device 18 executes a program(s) stored in the ROM. Thereby, the motor control device 18 calculates a rotational angle of the electric motor 19 described later. Furthermore, the motor control device 18 calculates the steering torque based on the signal, which corresponds to the steering torque and is outputted from the torque sensor 25. The motor control device 18 controls the rotation of the electric motor 19 based on the calculated rotational angle of the electric motor 19 and the calculated steering torque.

The electric motor 19 is rotated based on the output from the motor control device 18. Thereby, the electric motor 19 generates the torque.

The reduction gears 20 are coupled to the electric motor 19 and the second steering shaft 12. Furthermore, the reduction gears 20 reduce the rotational speed of the rotation outputted from the electric motor 19 and transmit the torque of the rotation generated by the electric motor 19 to the second steering shaft 12. Therefore, the steering operation, which changes the orientation of the wheels 17, is assisted.

The steering system 1 is configured as described above. Next, the structure of the torque sensor 25 will be described.

As shown in FIGS. 2 to 11, the torque sensor 25 includes a magnet 30, a rotor 35, a first yoke 361, a second yoke 362 and a fixation collar 354. The torque sensor 25 further includes a circuit board 60, a first magnetic detector 61, a second magnetic detector 62, a sensor case 75, a plurality of terminals 80, a first cover 85 and a second cover 86.

As shown in FIGS. 2 and 8 to 11, the magnet 30 is shaped in a circular ring form. Furthermore, the magnet 30 is coupled to an end portion of the first steering shaft 11. A portion of the torsion bar 13 is inserted into a hole of the magnet 30. An axis of the magnet 30 is coaxial with an axis of the torsion bar 13. Therefore, the magnet 30 is rotated together with the first steering shaft 11 about the axis of the torsion bar 13. Furthermore, the magnet 30 is magnetized such that magnetic poles are arranged in the rotational direction of the magnet 30 such that the polarities of the magnetic poles are alternately reversed in the rotational direction of the magnet 30. In this instance, the number of the magnetic poles of the magnet 30 is sixteen.

Hereafter, for the sake of convenience, a radial direction of the magnet 30 will be simply referred to as a radial direction. Furthermore, an axial direction Da of the magnet 30 will be simply referred to as an axial direction Da. Also, a circumferential direction about the axis of the magnet 30 will be simply referred to as a circumferential direction.

As shown in FIGS. 3 to 7, the rotor 35 is shaped in a cylindrical tubular form. An axis of the rotor 35 is coaxial with the axis of the magnet 30. Therefore, the axis of the rotor 35, the axis of the magnet 30 and the axis of the torsion bar 13 are coaxial to each other.

Figure 3:
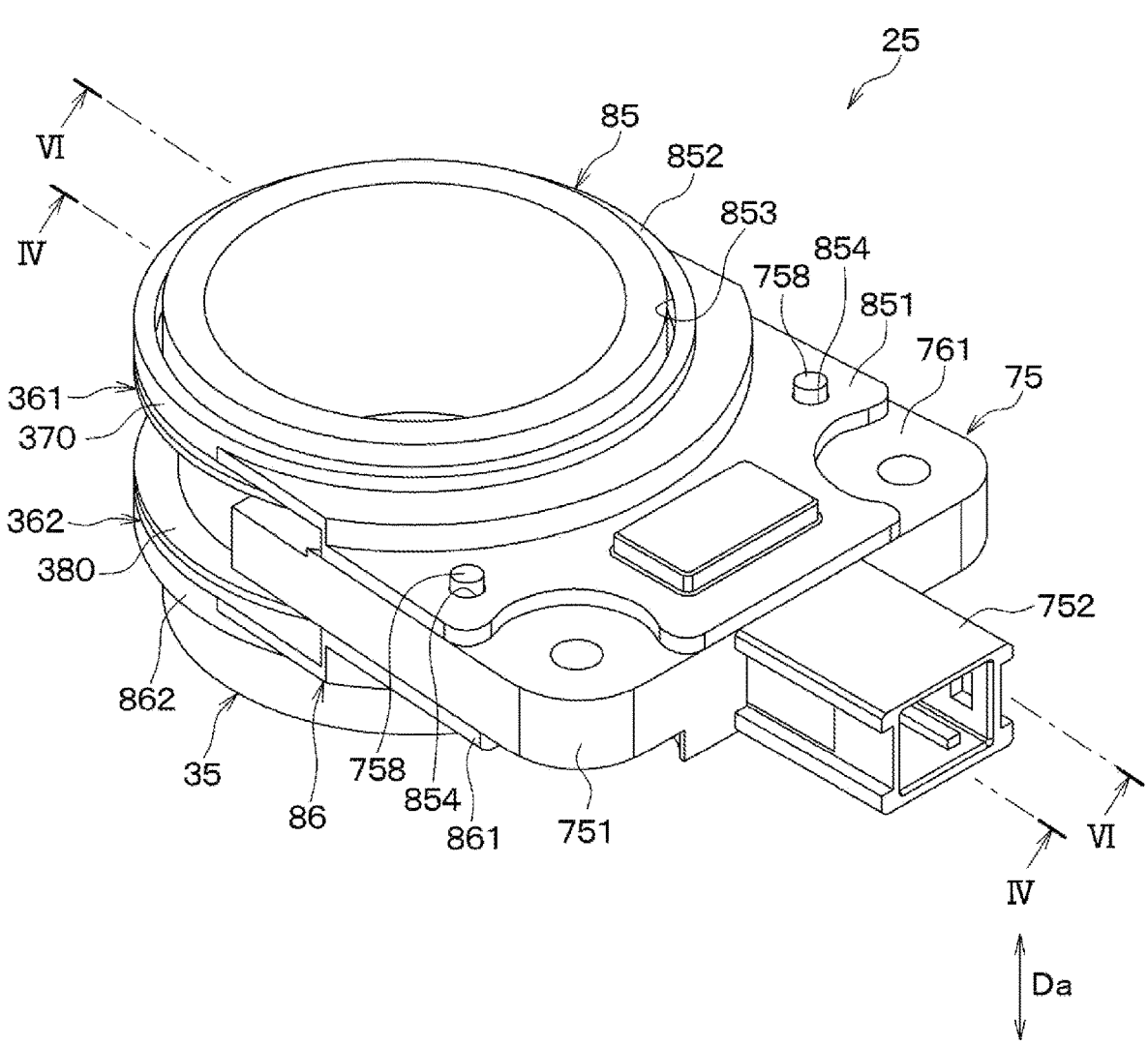
FIG. 3 is a perspective view of the torque sensor.
Figure 4:
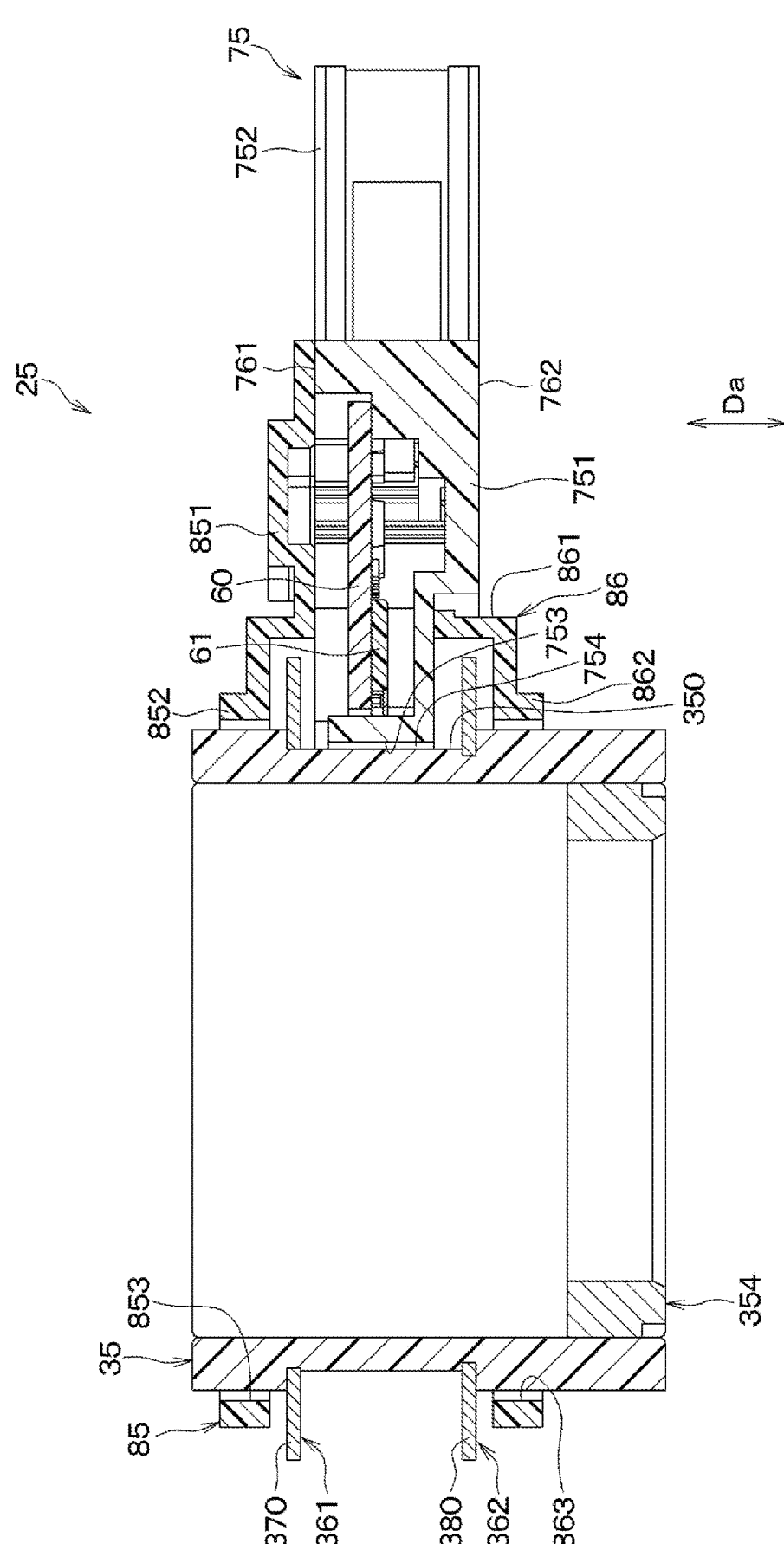
FIG. 4 is a cross-sectional view taken along line IV-IV in FIG. 3.
Figure 5:
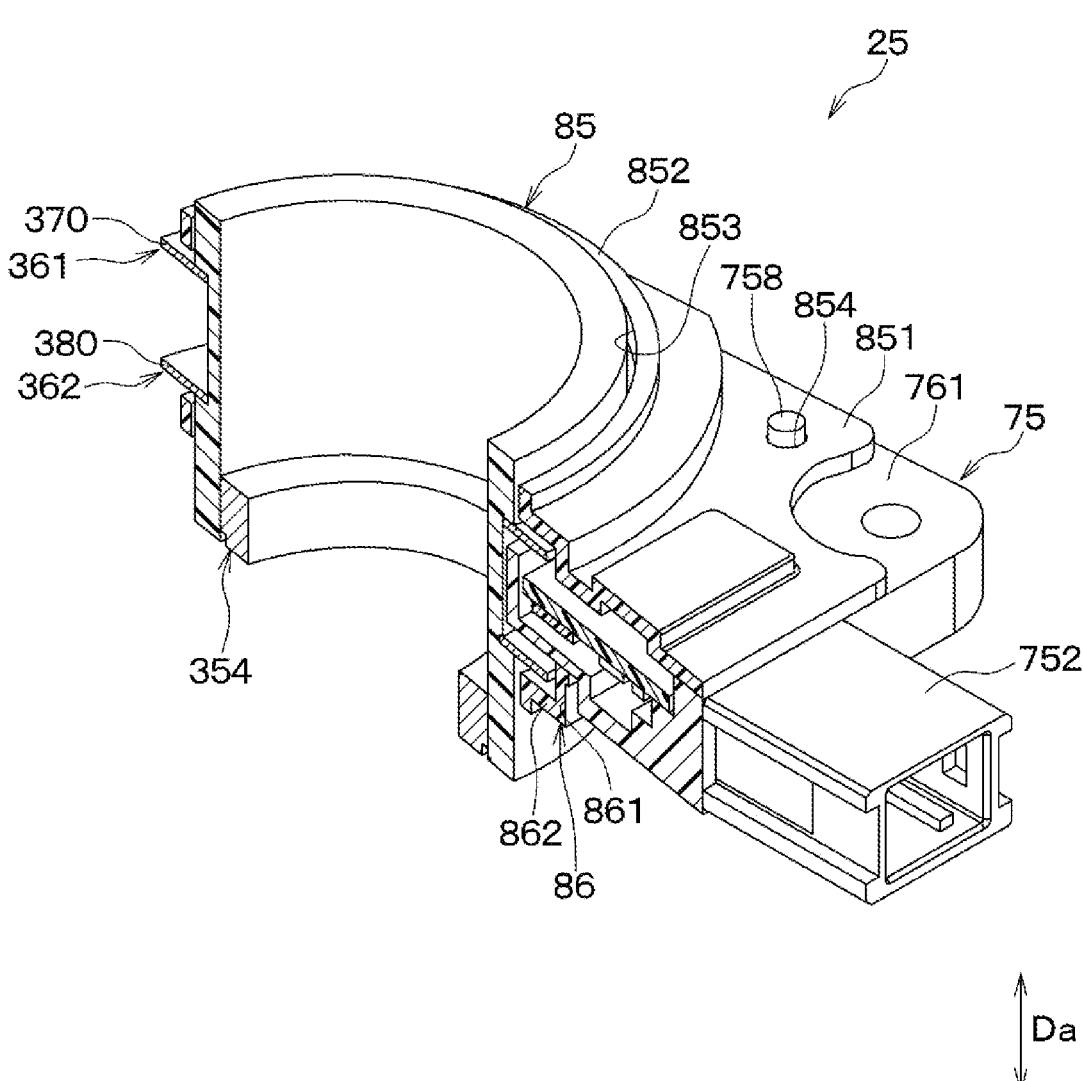
FIG. 5 is a perspective cross-sectional view of the torque sensor.
Figure 6:
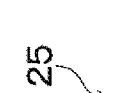
FIG. 6 is a cross-sectional view taken along line VI-VI in FIG. 3.
Figure 7:
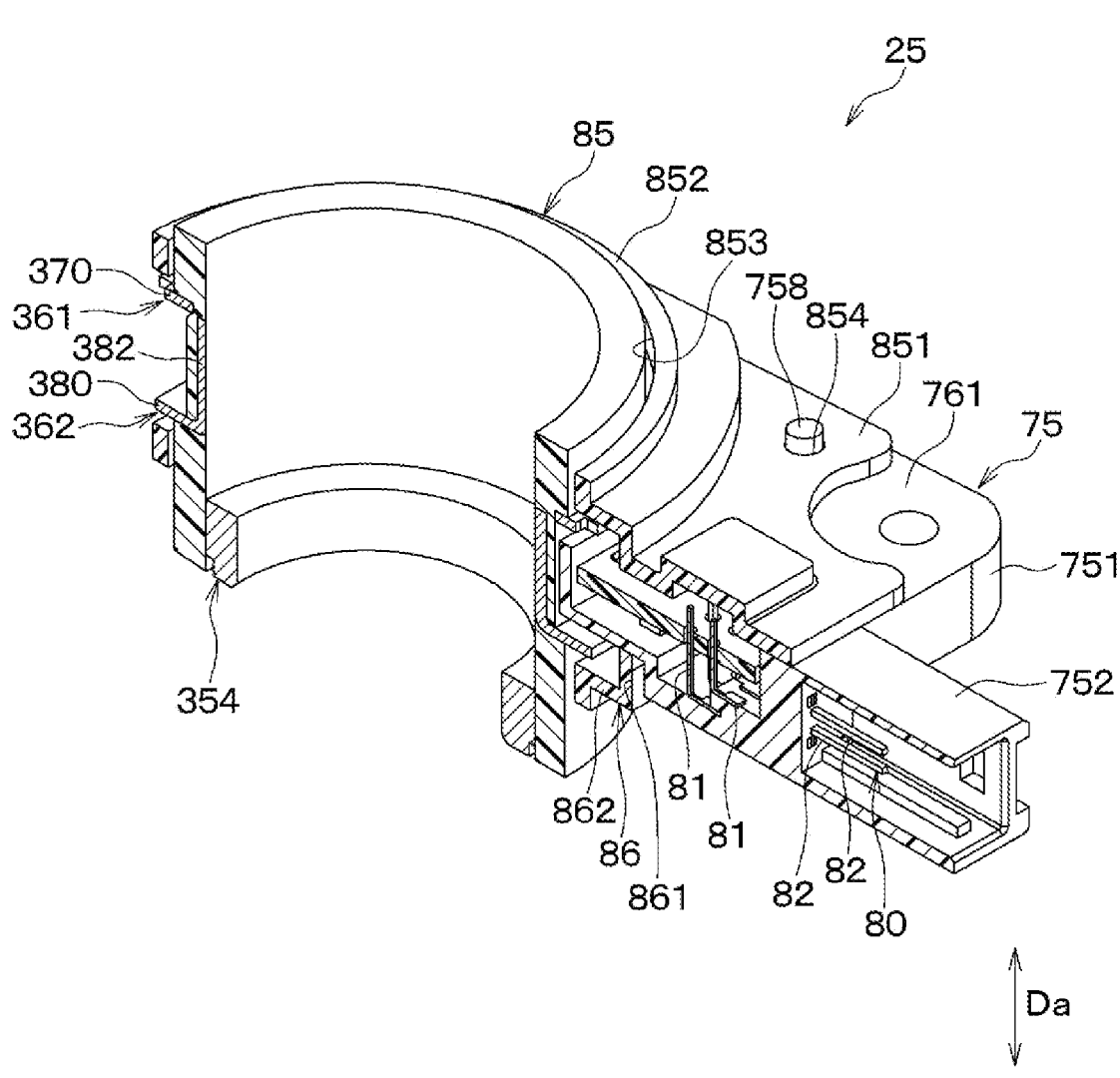
FIG. 7 is a perspective cross-sectional view of the torque sensor.
Figure 8:
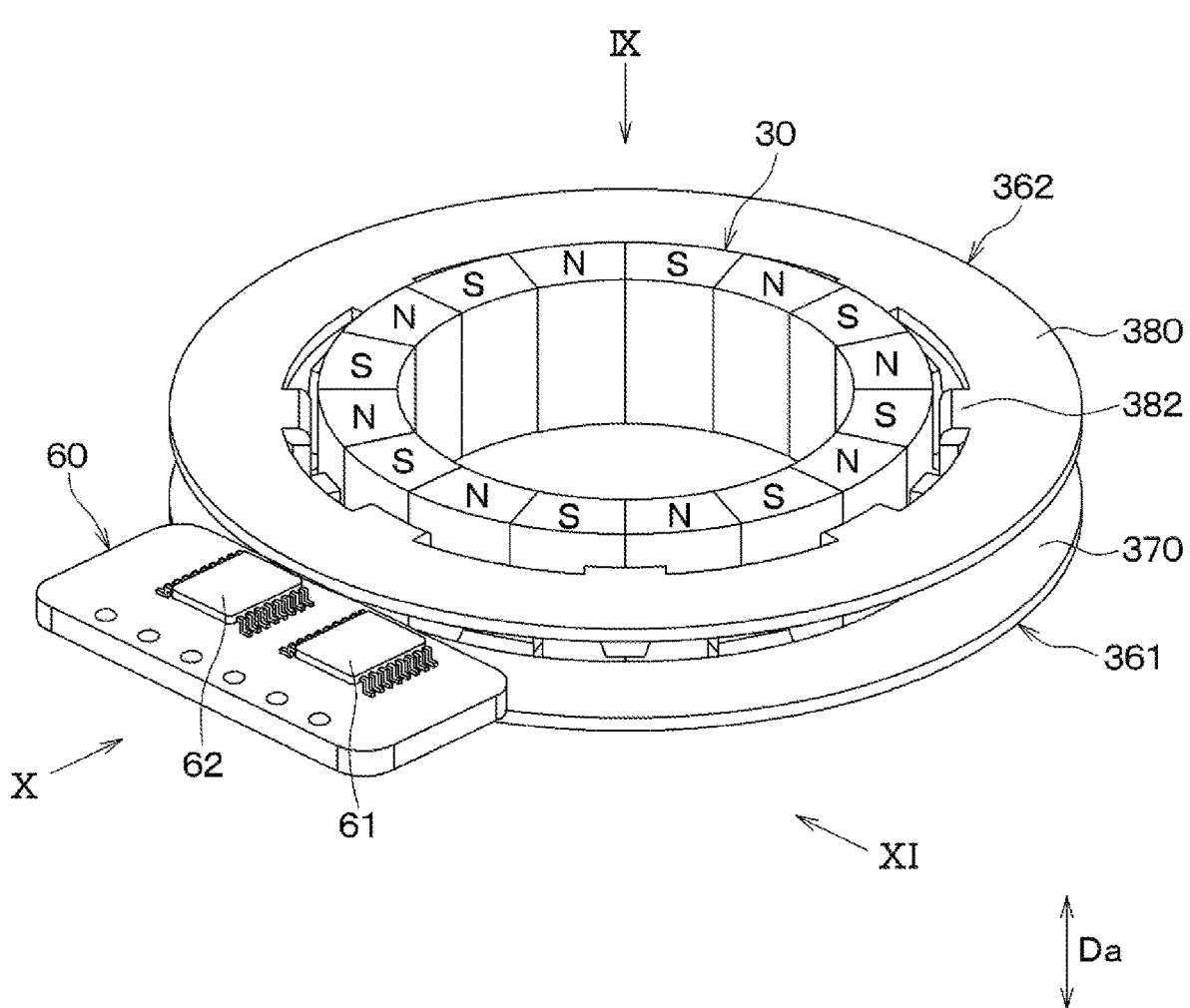
FIG. 8 is a perspective view showing a positional relationship among a magnet, a first yoke, a second yoke, a first magnetic detector and a second magnetic detector of the torque sensor.

As shown in FIGS. 2 and 3, the first yoke 361 is shaped in a tubular form and is made of a soft magnetic material. The first yoke 361 has a first-yoke ring 370 and a plurality of first-yoke claws 372.

The first-yoke ring 370 is shaped in a circular ring form and serves as a first ring. Furthermore, a plurality of portions of the first-yoke ring 370 are inserted into a plurality of corresponding holes of the rotor 35 each of which extends in the radial direction.

The first-yoke claws 372 serve as first claws and project from an inner periphery of the first-yoke ring 370 in the axial direction Da. Furthermore, each of the first-yoke claws 372 is shaped in a tapered form that is tapered from the inner periphery of the first-yoke ring 370 toward a distal end side of the first-yoke claw 372. Furthermore, each of the first-yoke claws 372 is in contact with and is connected to an inner peripheral surface of the rotor 35. Also, the first-yoke claws 372 are opposed to an outer peripheral surface of the magnet 30 in the radial direction. Furthermore, the plurality of corresponding holes of the rotor 35 are arranged at equal intervals in the circumferential direction, so that the first-yoke claws 372 are also arranged at predetermined intervals in the circumferential direction.

Like the first yoke 361, the second yoke 362 is shaped in a ring form and is made of a soft magnetic material. Furthermore, the second yoke 362 is, for example, integrally molded together with the rotor 35 and the first yoke 361. Furthermore, the second yoke 362 has a second-yoke ring 380 and a plurality of second-yoke claws 382.

The second-yoke ring 380 is shaped in a circular ring form and serves as a second ring. Furthermore, a plurality of portions of the second-yoke ring 380 are inserted into a plurality of corresponding holes of the rotor 35 each of which extends in the radial direction.

The second-yoke claws 382 project from an inner periphery of the second-yoke ring 380 in the axial direction Da and serve as second claws. Furthermore, each of the second-yoke claws 382 is shaped in a tapered form that is tapered from the inner periphery of the second-yoke ring 380 toward a distal end side of the second-yoke claw 382. Furthermore, each of the second-yoke claws 382 is in contact with and is connected to the inner peripheral surface of the rotor 35. Also, the second-yoke claws 382 are opposed to the outer peripheral surface of the magnet 30 in the radial direction. Furthermore, the plurality of corresponding holes of the rotor 35 are arranged at equal intervals in the circumferential direction, so that the second-yoke claws 382 are also arranged at predetermined intervals in the circumferential direction. Furthermore, each of the second-yoke claws 382 is placed between corresponding adjacent two of the first-yoke claws 372. Therefore, the first-yoke claws 372 and the second-yoke claws 382 are alternately arranged in the circumferential direction. Furthermore, the number of the second-yoke claws 382 is the same as the number of the first-yoke claws 372. In addition, a sum of the number of the first-yoke claws 372 and the number of the second-yoke claws 382 is set to be equal to the number of the magnetic poles of the magnet 30. In FIGS. 3 to 7, the first-yoke claws 372 and the second-yoke claws 382 are partially omitted to avoid complication.

The fixation collar 354 is shaped in a tubular form. The fixation collar 354 is coupled to the inner peripheral surface of the rotor 35. Furthermore, the fixation collar 354 is coupled to the second steering shaft 12. Therefore, the rotor 35 is rotated together with the second steering shaft 12.

The circuit board 60 is a printed circuit board. The first magnetic detector 61 is installed to the circuit board 60. The first magnetic detector 61 includes, for example, a Hall element or an MR element (not shown). By using the Hall element or the MR element, the first magnetic detector 61 detects a strength of the magnetic field exerted to the first magnetic detector 61 in the axial direction Da. Furthermore, the first magnetic detector 61 outputs a signal, which corresponds to the detected strength of the magnetic field, to the motor control device 18. The second magnetic detector 62 is installed to the circuit board 60. The second magnetic detector 62 includes, for example, a Hall element or an MR element (not shown). Like the first magnetic detector 61, by using the Hall element or the MR element, the second magnetic detector 62 detects the strength of the magnetic field exerted to the second magnetic detector 62 in the axial direction Da. Furthermore, the second magnetic detector 62 outputs a signal, which corresponds to the detected strength of the magnetic field, to the motor control device 18. Here, MR stands for magneto resistive.

Furthermore, as shown in FIGS. 8 to 11, the first magnetic detector 61 overlaps with the first-yoke ring 370 when the first-yoke ring 370 is projected onto the first magnetic detector 61 in the axial direction Da. Also, the first magnetic detector 61 overlaps with the second-yoke ring 380 when the second-yoke ring 380 is projected onto the first magnetic detector 61 in the axial direction Da. In an initial state, the first magnetic detector 61 overlaps with one of the N-poles among the magnetic poles of the magnet 30 when the one of the N-poles is projected onto the first magnetic detector 61 in a corresponding radial direction directed to the one of the N-poles. Furthermore, in the initial state, the first magnetic detector 61 does not overlap with any one of the S-poles among the magnetic poles of the magnet 30 even when any one of the S-poles is projected in the radial direction. The initial state refers to a state where the steering wheel 5 is not rotated, and thereby a steering torque is not generated.

Furthermore, the second magnetic detector 62 overlaps with the first-yoke ring 370 when the first-yoke ring 370 is projected onto the second magnetic detector 62 in the axial direction Da. Furthermore, the second magnetic detector 62 overlaps with the second-yoke ring 380 when the second-yoke ring 380 is projected onto the second magnetic detector 62 in the axial direction Da. In the initial state, the second magnetic detector 62 overlaps with one of the S-poles of the magnet 30 when the one of the S-poles is projected onto the second magnetic detector 62 in a corresponding radial direction directed to the one of the S-poles. Furthermore, in the initial state, the second magnetic detector 62 does not overlap with any one of the N-poles of the magnet 30 even when any one of the N-poles is projected in the radial direction. Alternatively, in the initial state, the first magnetic detector 61 may be radially opposed to one of the S-poles of the magnet 30 and may not be radially opposed to any one of the N-poles. In this case, in the initial state, the second magnetic detector 62 may be radially opposed to one of the N-poles of the magnet 30 and may not be radially opposed to any one of the S-poles of the magnet 30.

Figure 9:
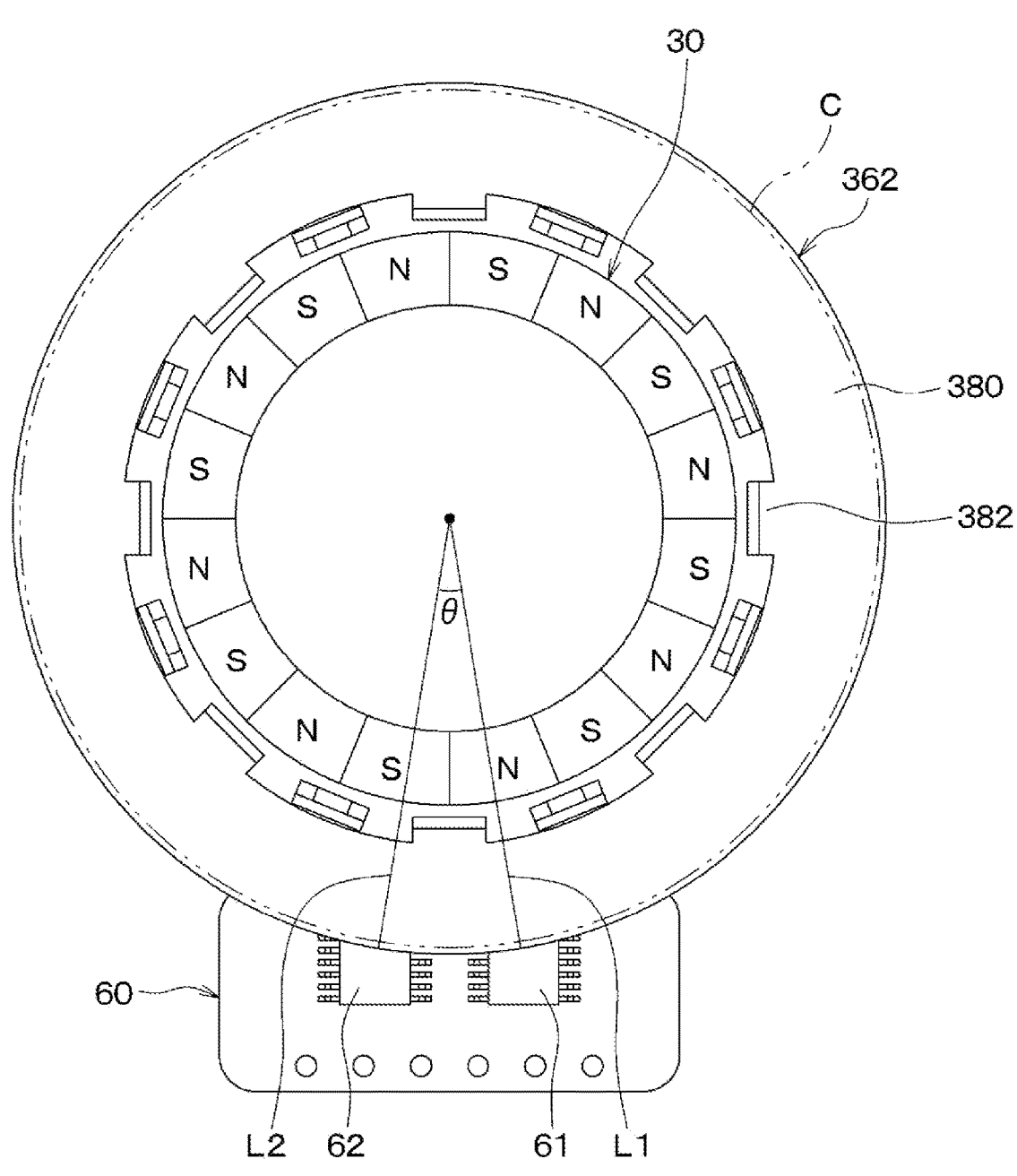
FIG. 9 is a view in a direction of an arrow IX in FIG. 8.
Figure 10:
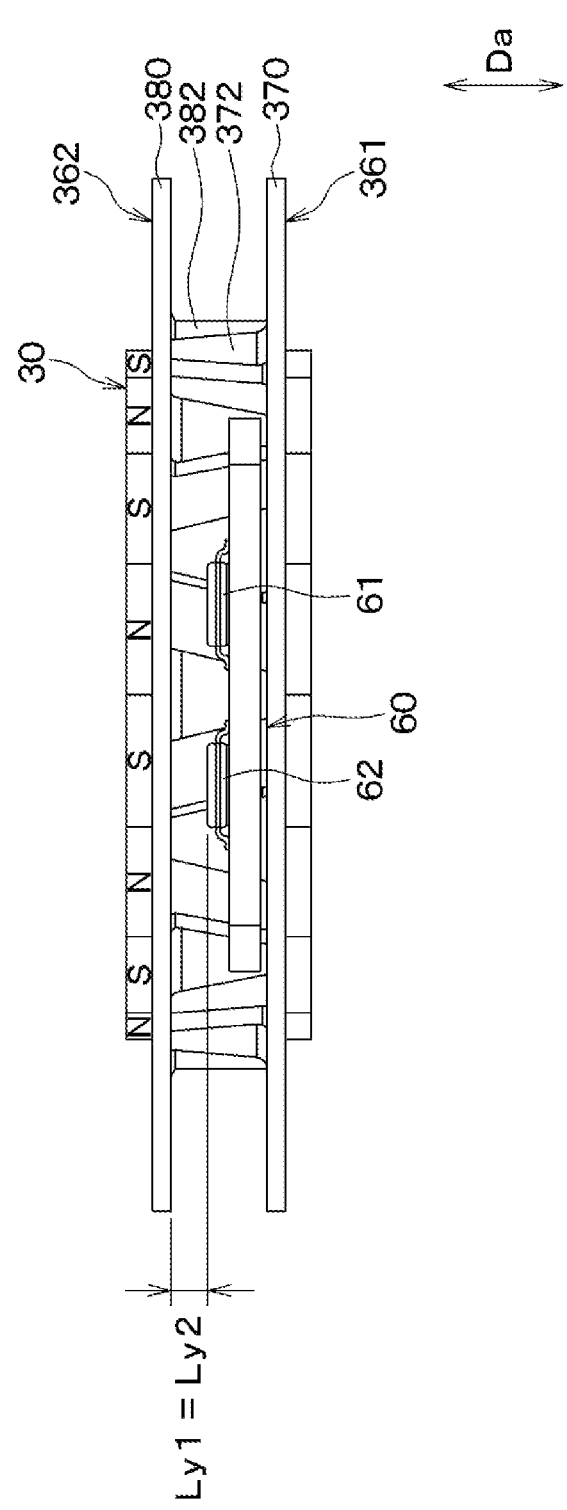
FIG. 10 is a view in a direction of an arrow X in FIG. 8.
Figure 11:
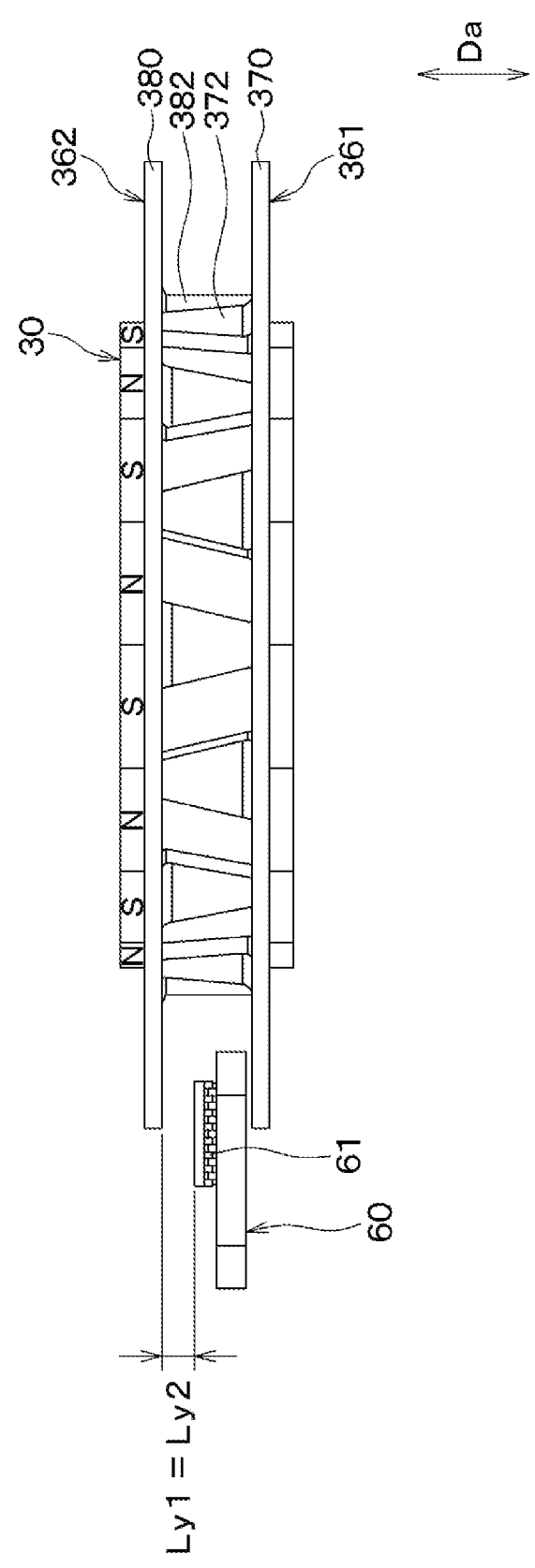
FIG. 11 is a view in a direction of an arrow XI in FIG. 8.

Furthermore, as shown in FIG. 9, the first magnetic detector 61 and the second magnetic detector 62 are arranged on a common circle C that is centered on the axis of the rotor 35. Here, as shown in FIGS. 10 and 11, a distance, which is measured in the axial direction Da from the second-yoke ring 380 to the first magnetic detector 61, is defined as a first yoke distance Ly1. A distance, which is measured in the axial direction Da from the second-yoke ring 380 to the second magnetic detector 62, is defined as a second yoke distance Ly2. The first yoke distance Ly1 is set to be the same as the second yoke distance Ly2. Here, the term "same" is meant to include a manufacturing error range.

Furthermore, as shown in FIG. 9, a line, which connects between the axis of the magnet 30 and the first magnetic detector 61, is defined as a first straight line L1. Also, a line, which connects between the axis of the magnet 30 and the second magnetic detector 62, is defined as a second straight line L2. Furthermore, an angle between the first straight line L1 and the second straight line L2 in the rotational direction of the magnet 30 is defined as a detector-to-detector angle θ. The detector-to-detector angle θ is set to an angle indicated by the following relational equation (1). In the following relational equation (1), "n" denotes the number of the magnetic poles of the magnet 30. Furthermore, "a" denotes an odd number. In this instance, "n" is 16. Furthermore, "a" is 1. Therefore, the detector-to-detector angle θ is 22.5°.

$$\theta = 360° \div n \times a \qquad (1)$$

As shown in FIGS. 3 to 7, the sensor case 75 is made of, for example, resin and is shaped in a plate form that extends in the radial direction. Furthermore, the sensor case 75 has a plurality of cover retainer pins 758, a first receiving portion 751 and a second receiving portion 752.

Each of the cover retainer pins 758 projects from the first base surface 761 in the axial direction Da. The first receiving portion 751 is shaped in a bottomed tubular form and thereby receives the first magnetic detector 61, the second magnetic detector 62 and first terminals 81 of the terminals 80 described later. Furthermore, the first receiving portion 751 receives the circuit board 60 such that a portion of the circuit board 60 is exposed from the first receiving portion 751. In addition, the first receiving portion 751 has a distal end surface 753, the first base surface 761 and a second base surface 762. The distal end surface 753 is shaped in an arcuate form. Furthermore, the distal end surface 753 is opposed to a rotor peripheral surface (outer peripheral surface) 350 of the rotor 35 in the radial direction. A space 754 is formed between the distal end surface 753 and the rotor peripheral surface 350. The first base surface 761 is a surface of the first receiving portion 751 which faces one side in the axial direction Da. The second base surface 762 is a surface of the first receiving portion 751 which faces the other side in the axial direction Da which is opposite to the one side.

The second receiving portion 752 is shaped in a bottomed tubular form. Furthermore, the second receiving portion 752 is joined to the first receiving portion 751 in the radial direction. The second receiving portion 752 receives second terminals 82 of the terminals 80 described later.

Each of the terminals 80 has the first terminal 81 and the second terminal 82. The first terminal 81 extends in the axial direction Da. A portion of the first terminal 81 is inserted into a corresponding one of holes of the circuit board 60. Furthermore, the first terminal 81 is soldered to the circuit board 60 and is thereby connected to the circuit board 60. The second terminal 82 is joined to the first terminal 81 and extends in the radial direction. Furthermore, the second terminal 82 is connected to the motor control device 18. Thus, the signal from the first magnetic detector 61 and the signal from the second magnetic detector 62 are outputted to the motor control device 18 through the corresponding terminals 80.

The first cover 85 is made of, for example, resin. Furthermore, the first cover 85 includes a first sensor cover portion 851 and a first rotor cover portion 852.

The first sensor cover portion 851 is joined to a portion of the first base surface 761 by, for example, welding or bonding. Furthermore, the first sensor cover portion 851 covers exposed portions of the circuit board 60 and the first terminals 81 which are exposed from the sensor case 75. The first sensor cover portion 851 has a plurality of pin receiving holes 854. A portion of each of the cover retainer pins 758 is inserted into a corresponding one of the pin receiving holes 854. This makes it difficult for the first cover 85 to come off the sensor case 75. In addition, the first sensor cover portion 851 and the cover retainer pins 758 are coupled together by, for example, heat-caulking, so that it makes more difficult for the first cover 85 to come off the sensor case 75 than in a case where the first sensor cover portion 851 and the cover retainer pins 758 are not coupled together by, for example, the heat-caulking. Alternatively, the first sensor cover portion 851 may have the cover retainer pins 758, and the pin receiving holes 854 may be formed at the first base surface 761 of the sensor case 75.

The first rotor cover portion 852 is joined to the first sensor cover portion 851. Furthermore, the first rotor cover portion 852 covers the first-yoke ring 370 in cooperation with the first receiving portion 751 of the sensor case 75. Also, the first rotor cover portion 852 is shaped in a circular ring form and has a first cover hole 853. A portion of the rotor 35 is inserted into the first cover hole 853 in the axial direction Da. Therefore, movement of the rotor 35 in the radial direction is limited. The first rotor cover portion 852 is opposed to the first-yoke ring 370 in the axial direction Da. Therefore, movement of the first-yoke ring 370 in the axial direction Da is limited, and movement of the rotor 35 in the axial direction Da is limited.

The second cover 86 is made of, for example, resin. Furthermore, the second cover 86 includes a second sensor cover portion 861 and a second rotor cover portion 862.

The second sensor cover portion 861 is joined to a portion of the second base surface 762 by, for example, welding or bonding. Furthermore, the second sensor cover portion 861 covers a portion of the first receiving portion 751 of the sensor case 75. Also, a portion of each of a plurality of pins (not shown), which project from the second base surface 762 of the sensor case 75, is inserted into a corresponding one of a plurality of holes (not shown) of the second sensor cover portion 861. This makes it difficult for the second cover 86 to come off the sensor case 75. In addition, the second sensor cover portion 861 and these pins (not shown) are coupled together by, for example, heat-caulking, so that it makes more difficult for the second cover 86 to come off the sensor case 75 than in the case where the second sensor cover portion 861 and these pins (not shown) are not coupled together by, for example, the heat-caulking. Alternatively, the second sensor cover portion 861 may have these pins (not shown), and the holes (not shown) may be formed at the second base surface 762 of the sensor case 75.

The second rotor cover portion 862 is joined to the second sensor cover portion 861. Furthermore, the second rotor cover portion 862 covers the second-yoke ring 380 in cooperation with the first receiving portion 751 of the sensor case 75. Also, the second rotor cover portion 862 is shaped in a circular ring form and has a second cover hole 863. A portion of the rotor 35 is inserted into the second cover hole 863 in the axial direction Da. Therefore, movement of the rotor 35 in the radial direction is limited. The second rotor cover portion 862 is opposed to the second-yoke ring 380 in the axial direction Da. Therefore, movement of the second-yoke ring 380 in the axial direction Da is limited, and movement of the rotor 35 in the axial direction Da is limited.

The torque sensor 25 is configured in the above-described manner. Next, the detection of the steering torque with the torque sensor 25 will be described.

Figure 12:
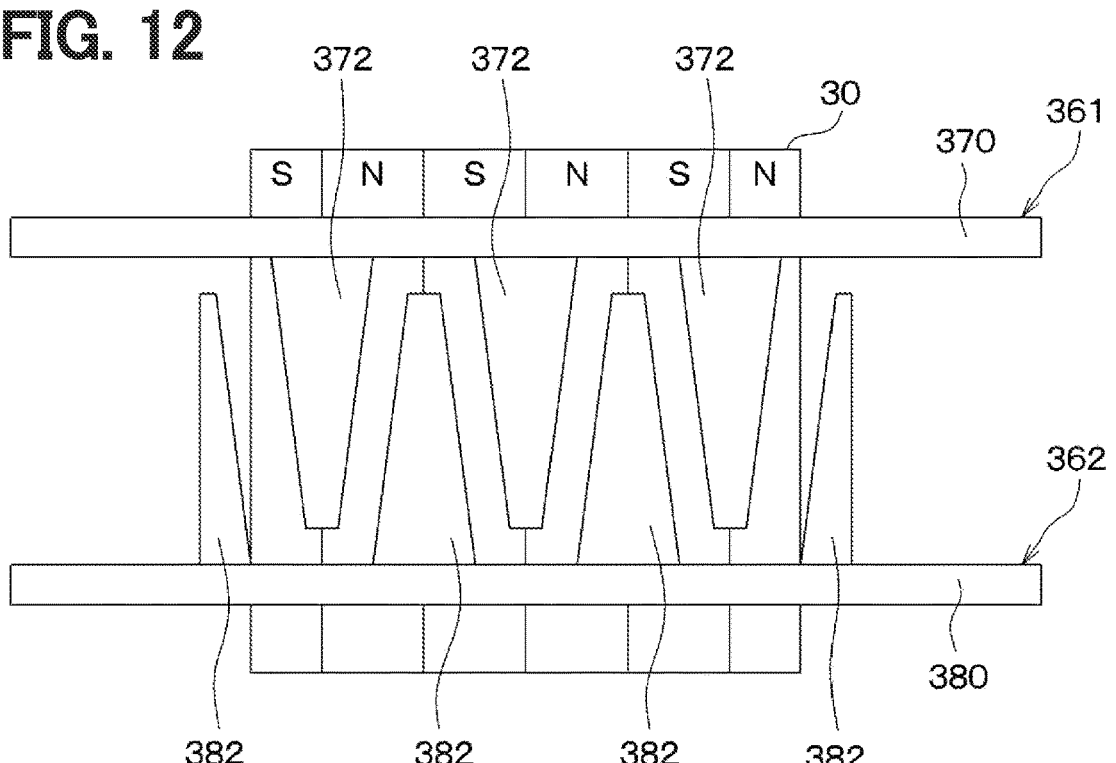
FIG. 12 is a side view showing a neutral state of the magnet, the first yoke and the second yoke of the torque sensor.

It is assumed that no steering torque is generated by the steering wheel 5 when the steering wheel 5 is not rotated. In this case, as shown in FIG. 12, a phase of the magnet 30, the first-yoke claws 372 and the second-yoke claws 382 is held in a neutral state in the circumferential direction. In this neutral state, a center of each first-yoke claw 372 coincides with a corresponding boundary between the corresponding N-pole and the corresponding S-pole of the magnet 30 in the circumferential direction, and a center of each second-yoke claw 382 coincides with a corresponding boundary between the corresponding N-pole and the corresponding S-pole of the magnet 30 in the circumferential direction. At this time, the number of magnetic field lines, which extend from the N-pole of the magnet 30 and pass through the first-yoke claw 372, is the same as the number of magnetic field lines, which extend from the N-pole of the magnet 30 and pass through the second-yoke claw 382. Therefore, a magnetic flux density is not generated between the first yoke 361 and the second yoke 362.

Then, when the steering wheel 5 is rotated, the steering torque is generated. Thereby, the first steering shaft 11, which is coupled to the steering wheel 5, is rotated. Furthermore, the torsion bar 13, which is fixed to the first steering shaft 11 by the shaft pin 14, is rotated. Also, the second steering shaft 12, which is fixed to the torsion bar 13 by the shaft pin 14, is rotated. Furthermore, the second steering shaft 12 is coupled to the fixation collar 354. Therefore, the rotor 35 is rotated. Thereby, the first yoke 361 and the second yoke 362, which are integrally formed with the rotor 35, are rotated relative to the magnet 30.

Figure 13:
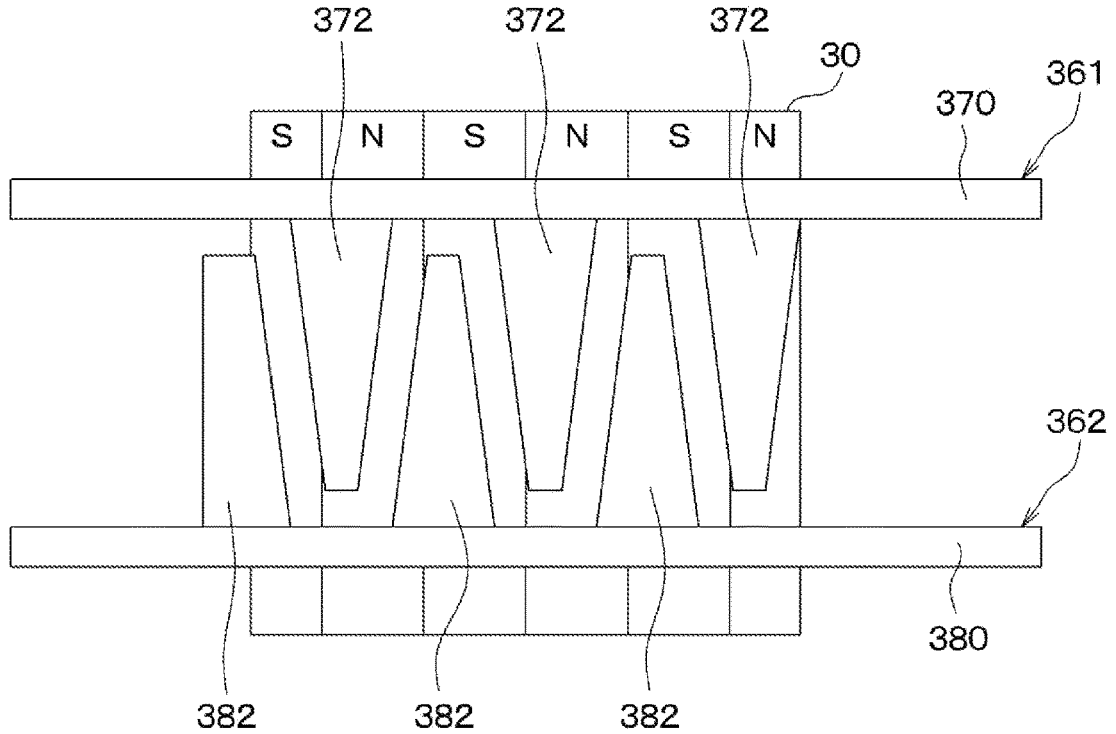
FIG. 13 is a side view of the magnet, the first yoke and the second yoke of the torque sensor when a steering wheel of the steering system is rotated.

In this case, as shown in FIG. 13, an overlapping area between the N-pole of the magnet 30 and the first-yoke claw

372 in the direction perpendicular to the axial direction Da is increased. Furthermore, an overlapping area between the S-pole of the magnet 30 and the second-yoke claw 382 in the direction perpendicular to the axial direction Da is increased. At this time, the number of magnetic field lines, which extend from the N-pole of the magnet 30 to the first-yoke claw 372, is increased, and the number of magnetic field lines, which extend from the second-yoke claw 382 to the S-pole of the magnet 30, is increased. Therefore, the magnetic flux density is generated between the first yoke 361 and the second yoke 362.

Here, as discussed above, the first-yoke ring 370 is opposed to the first magnetic detector 61 and the second magnetic detector 62 in the axial direction Da. Furthermore, the second-yoke ring 380 is opposed to the first magnetic detector 61 and the second magnetic detector 62 in the axial direction Da.

Therefore, at this time, the number of magnetic field lines, which extend from the N-pole of the magnet 30 and pass through the corresponding one of the first magnetic detector 61 and the second magnetic detector 62 via the first-yoke ring 370, is increased. Furthermore, the magnetic field lines, which have passed through the corresponding one of the first magnetic detector 61 and the second magnetic detector 62, pass through the corresponding S-pole of the magnet 30 via the second-yoke ring 380.

Thus, each of the first magnetic detector 61 and the second magnetic detector 62 detects the strength of the magnetic field directed toward corresponding one side among two opposite sides in the axial direction Da. Thereby, the first magnetic detector 61 and the second magnetic detector 62 detect the steering torque. Furthermore, each of the first magnetic detector 61 and the second magnetic detector 62 outputs a signal, which corresponds to the detected strength of the magnetic field, to the motor control device 18 through the corresponding terminal 80.

Figure 14:
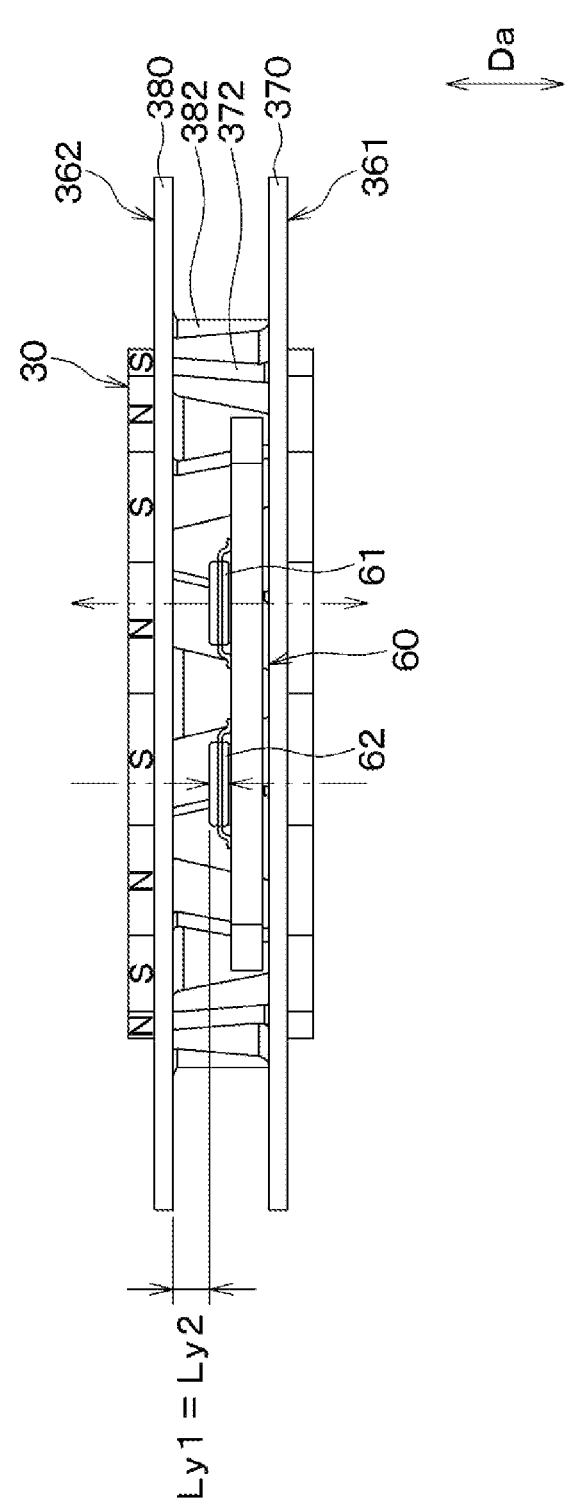
FIG. 14 is a schematic diagram showing how a magnetic field, which leaks from the magnet, passes through the first magnetic detector and the second magnetic detector.

Here, since the torque sensor 25 does not include the magnetism collecting elements, such as the magnetism collecting elements of the previously proposed torque sensor described above, the magnetic field, which leaks from the magnet 30, passes through the first magnetic detector 61 and the second magnetic detector 62. However, as described above, in the initial state, the first magnetic detector 61 is radially opposed to the N-pole of the magnet 30. Thereby, as shown in FIG. 14, the magnetic field, which leaks from the magnet 30 and passes through the first magnetic detector 61, includes a component thereof that is directed in the axial direction Da from the inside to the outside of the first magnetic detector 61. Furthermore, in the initial state, the second magnetic detector 62 is radially opposed to the S-pole of the magnet 30. Thereby, the magnetic field, which leaks from the magnet 30 and passes through the second magnetic detector 62, includes a component thereof that is directed in the axial direction Da from the outside to the inside of the second magnetic detector 62. Therefore, the direction of the magnetic field (magnetic field lines), which leaks from the magnet 30 and is detected by the second magnetic detector 62, is opposite to the direction of the magnetic field (magnetic field lines), which leaks from the magnet 30 and is detected by the first magnetic detector 61. In FIG. 14, the magnetic field line, which leaks from the magnet 30 and passes through the first magnetic detector 61, and the magnetic field line, which leaks from the magnet 30 and passes through the second magnetic detector 62, are schematically indicated by two dot-dot-dash lines, respectively.

Figure 15:
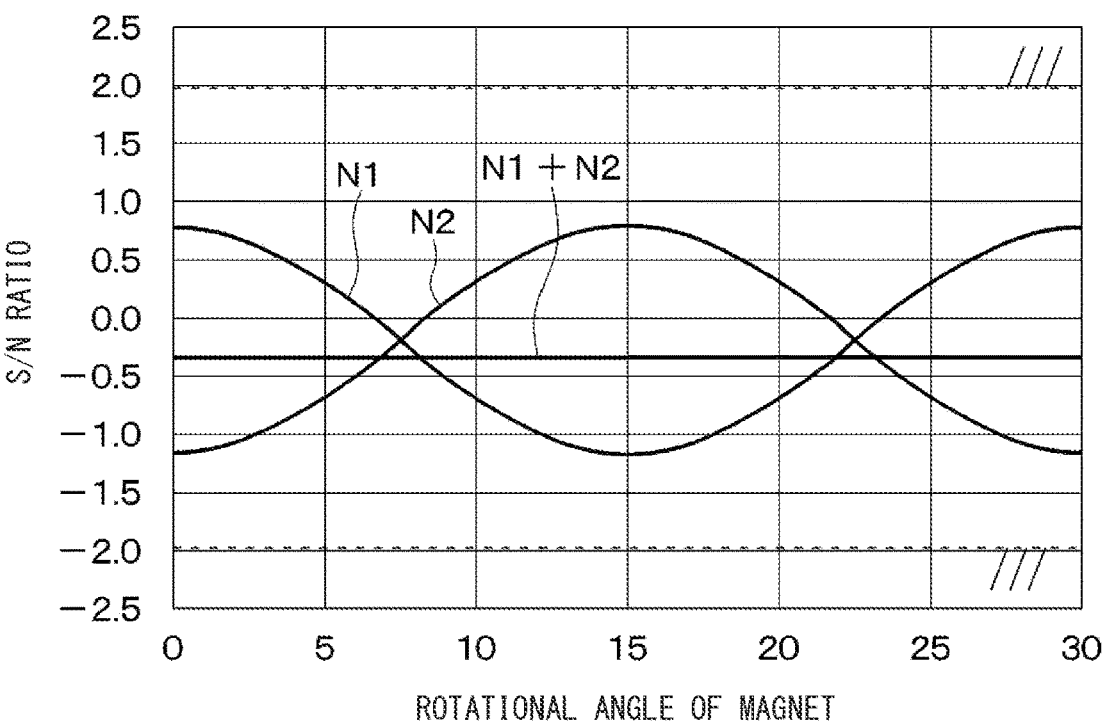
FIG. 15 is a diagram showing a relationship between a rotational angle of the magnet and an S/N ratio of each of the first magnetic detector and the second magnetic detector.

Therefore, when the steering wheel 5, the rotor 35, the first yoke 361 and the second yoke 362 are rotated relative to the magnet 30, the noise, which is detected by the first magnetic detector 61, and the noise, which is detected by the second magnetic detector 62, cancel with each other, as indicated in FIG. 15. In FIG. 15, the noise, which is detected by the first magnetic detector 61, is indicated by N1. The noise, which is detected by the second magnetic detector 62, is indicated by N2.

Therefore, the motor control device 18 calculates a sum of a value, which relates to a detected strength of the magnetic field detected by the first magnetic detector 61, and a value, which relates to a detected strength of the magnetic field detected by the second magnetic detector 62. Thereby, the motor control device 18 removes the noises which are induced by the magnetic field leaked from the magnet 30. The motor control device 18 calculates the steering torque based on the calculated sum.

Figure 16:
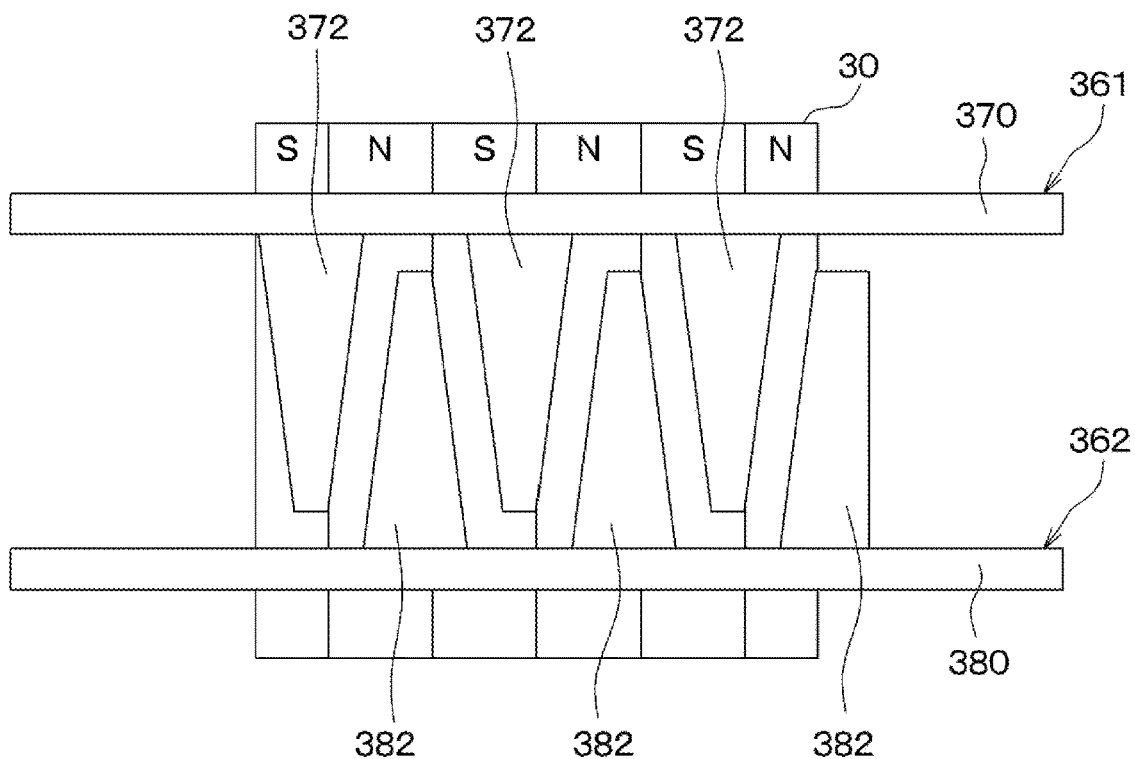
FIG. 16 is a side view of the magnet, the first yoke and the second yoke of the torque sensor when the steering wheel is rotated.
Figure 17:
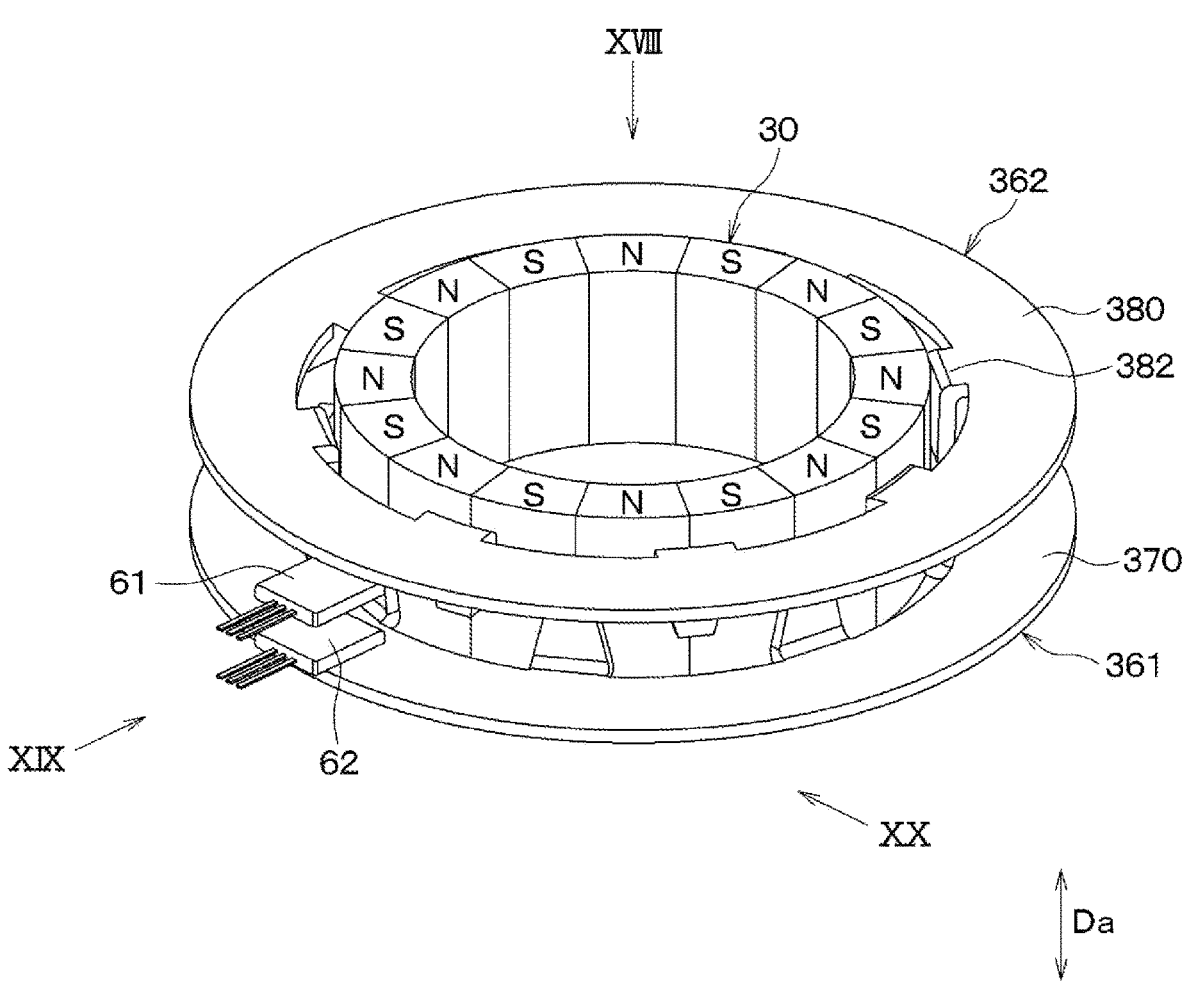
FIG. 17 is a perspective view showing a positional relationship among the magnet, the first yoke, the second yoke, the first magnetic detector and the second magnetic detector of the torque sensor of the torque detection system according to a second embodiment.
Figure 18:
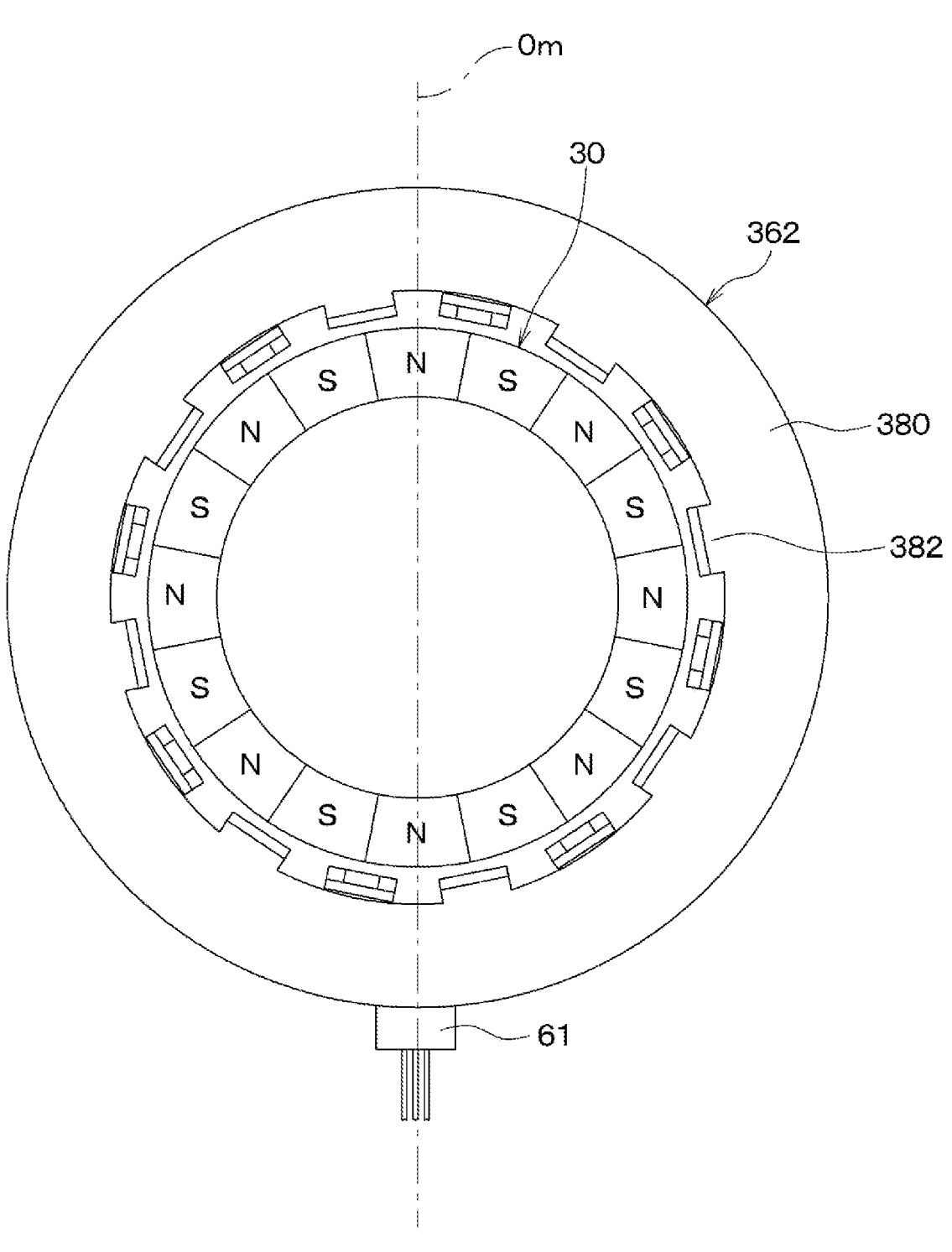
FIG. 18 is a view in a direction of an arrow XVIII in FIG. 17.

In a case where the steering torque is generated in an opposite direction, which is opposite to the direction of the steering torque in the case of FIG. 13, as shown in FIG. 16, the overlapping area between the S-pole of the magnet 30 and the first-yoke claw 372 in the direction perpendicular to the axial direction Da is increased. Furthermore, the overlapping area between the N-pole of the magnet 30 and the second-yoke claw 382 in the direction perpendicular to the axial direction Da is increased. At this time, the number of magnetic field lines, which extend from the N-pole of the magnet 30 to the second-yoke claw 382, is increased, and the number of magnetic field lines, which extend from the first-yoke claw 372 to the S-pole of the magnet 30, is increased. Therefore, the magnetic flux density is generated between the first yoke 361 and the second yoke 362.

Therefore, at this time, the number of magnetic field lines, which extend from the N-pole of the magnet 30 and pass through the corresponding one of the first magnetic detector 61 and the second magnetic detector 62 via the second-yoke ring 380, is increased. Furthermore, the magnetic field lines, which have passed through the corresponding one of the first magnetic detector 61 and the second magnetic detector 62, pass through the corresponding S-pole of the magnet 30 via the first-yoke ring 370.

Thus, each of the first magnetic detector 61 and the second magnetic detector 62 detects the strength of the magnetic field directed toward the corresponding other side among the two opposite sides in the axial direction Da. Thereby, the first magnetic detector 61 and the second magnetic detector 62 detect the steering torque. Furthermore, each of the first magnetic detector 61 and the second magnetic detector 62 outputs a signal, which corresponds to the detected strength of the magnetic field, to the motor control device 18 through the corresponding terminal 80.

Furthermore, like in the above-described case, the motor control device 18 calculates a sum of a value, which relates to a detected strength of the magnetic field detected by the first magnetic detector 61, and a value, which relates to a detected strength of the magnetic field detected by the second magnetic detector 62. Thereby, the motor control device 18 removes the noises which are induced by the magnetic field leaked from the magnet 30. The motor control device 18 calculates the steering torque based on the calculated sum.

As described above, the torque sensor 25 detects the steering torque. Next, in the torque sensor 25 of the torque detection system of the present embodiment, the magnetism collecting elements, such as the magnetism collecting elements of the previously proposed torque sensor described above, can be eliminated. Furthermore, even when the relative positions of the first magnetic detector 61 and the second magnetic detector 62 relative to the first yoke 361 and the second yoke 362 deviate, the tolerance to the noise magnetic field leaking from the magnet 30 is improved. These points will be described below.

The torque detection system of the present embodiment includes the torque sensor 25 and the motor control device 18. The torque sensor 25 includes the magnet 30, the rotor 35, the first yoke 361, the second yoke 362, the first magnetic detector 61 and the second magnetic detector 62. The magnet 30 is configured to generate the magnetic field and is configured to be rotated together with the steering wheel 5 about the axis of the magnet 30 which extends in the axial direction Da. The rotor 35 is shaped in the ring form and is configured to be rotated together with the steering wheel 5. The first yoke 361 has the first-yoke ring 370 and the first-yoke claws 372. The first-yoke ring 370 is shaped in the ring form and is configured to be rotated together with the rotor 35. The first-yoke claws 372 project from the first-yoke ring 370 in the axial direction Da and are thereby opposed to the magnet 30 in the radial direction. The first-yoke claws 372 are configured to be rotated together with the first-yoke ring 370 and thereby collect the magnetic field generated by the magnet 30. The second yoke 362 has the second-yoke ring 380 and the second-yoke claws 382. The second-yoke ring 380 is shaped in the ring form and is configured to be rotated together with the rotor 35. The second-yoke claws 382 project from the second-yoke ring 380 in the axial direction Da and are thereby opposed to the magnet 30 in the radial direction. The second-yoke claws 382 are configured to be rotated together with the second-yoke ring 380 and thereby collect the magnetic field generated by the magnet 30. The first magnetic detector 61 overlaps with the first-yoke ring 370 and the second-yoke ring 380 when the first magnetic detector 61 is projected onto the first-yoke ring 370 and the second-yoke ring 380 in the axial direction Da. Furthermore, the first magnetic detector 61 is configured to detect the strength of the magnetic field which corresponds to the torque and changes in response to a change in a relative angle of the first-yoke claws 372 and the second-yoke claws 382 relative to the magnet 30 in the rotational direction of the magnet 30. The second magnetic detector 62 overlaps with the first-yoke ring 370 and the second-yoke ring 380 when the second magnetic detector 62 is projected onto the first-yoke ring 370 and the second-yoke ring 380 in the axial direction Da. Also, the second magnetic detector 62 is configured to detect the strength of the magnetic field which corresponds to the torque and changes in response to the change in the relative angle of the first-yoke claws 372 and the second-yoke claws 382 relative to the magnet 30 in the rotational direction of the magnet 30. The motor control device 18 calculates the steering torque based on the signal outputted from the first magnetic detector 61 and the signal outputted from the second magnetic detector 62. Furthermore, in the initial state, the first magnetic detector 61 overlaps with one (e.g., the N-pole) of the magnetic poles of the magnet 30 when the one (e.g., the N-pole) of the magnetic poles is projected onto the first magnetic detector 61 in the corresponding radial direction directed to the one (e.g., the N-pole) of the magnetic poles. Also, in the initial state, the second magnetic detector 62 overlaps with another one (e.g., the S-pole) of the magnetic poles of the magnet 30, which has the polarity that is different from the polarity of the one (e.g., the N-pole) of the magnetic poles overlapped with the first magnetic detector 61, when the another one (e.g., the S-pole) of the magnetic poles is projected onto the second magnetic detector 62 in the corresponding radial direction directed to the another one (e.g., the S-pole) of the magnetic poles. The motor control device 18 calculates the sum of the value, which relates to the detected strength of the magnetic field detected by the first magnetic detector 61, and the value, which relates to the detected strength of the magnetic field detected by the second magnetic detector 62. Furthermore, the motor control device 18 calculates the steering torque based on the calculated sum. The steering wheel 5 serves as a detection subject (detection subject device). The steering torque serves as the torque of the detection subject. The first yoke 361 and the second yoke 362 each serve as a yoke. The first-yoke ring 370 and the second-yoke ring 380 each serve as a ring. The first-yoke claws 372 serve as a plurality of claws, and the second-yoke claws 382 also serve as a plurality of claws. The radial direction serves as an orthogonal direction, i.e., a direction orthogonal to, i.e., a direction perpendicular to the axial direction Da. The motor control device 18 serves as a calculation processor.

In the initial state, the second magnetic detector 62 overlaps with the another one of the magnetic poles of the magnet 30, which has the polarity that is different from the polarity of the one of the magnetic poles overlapped with the first magnetic detector 61, when the another one of the magnetic poles is projected onto the second magnetic detector 62 in the corresponding radial direction directed to the another one of the magnetic poles. Therefore, the direction of the magnetic field, which leaks from the magnet 30 and is detected by the second magnetic detector 62, is opposite to the direction of the magnetic field, which leaks from the magnet 30 and is detected by the first magnetic detector 61. Thus, the noise, which is detected by the first magnetic detector 61, and the noise, which is detected by the second magnetic detector 62, are canceled with each other. Furthermore, the motor control device 18 calculates the sum of the value, which relates to the detected strength of the magnetic field detected by the first magnetic detector 61, and the value, which relates to the detected strength of the magnetic field detected by the second magnetic detector 62. Thereby, the noise, which is detected by the first magnetic detector 61, and the noise, which is detected by the second magnetic detector 62, are removed. Therefore, even when the magnetism collecting elements are eliminated, or when the relative positions of the first magnetic detector 61 and the second magnetic detector 62 relative to the first yoke 361 and the second yoke 362 deviate, the tolerance to the noise magnetic field leaking from the magnet 30 is improved.

Furthermore, it is assumed that in a case where the torque sensor 25 includes the magnetism collecting elements, such as the magnetism collecting elements of the previously proposed torque sensor described above, the relative positions of the magnetism collecting elements relative to the first yoke 361, the second yoke 362, the first magnetic detector 61 and the second magnetic detector 62 may deviate. In this case, the first magnetic detector 61 and the second magnetic detector 62 are not protected by the magnetism collecting elements from the magnetic field which leaks from the magnet 30. Therefore, the magnetic field, which leaks from the magnet 30, passes through the first magnetic detector 61 and the second magnetic detector 62. Therefore, in this case, the first magnetic detector 61 and the second magnetic detector 62 detect the noise magnetic field, which leaks from the magnet 30. However, in the torque sensor 25, even when the relative positions of the first magnetic detector 61 and the second magnetic detector 62 relative to the first yoke 361 and the second yoke 362 deviate, the noise, which is detected by the first magnetic detector 61, and the noise, which is detected by the second magnetic detector 62, cancel with each other. The motor control device 18 calculates the sum of the value, which relates to the detected strength of the magnetic field detected by the first magnetic detector 61, and the value, which relates to the detected strength of the magnetic field detected by the second magnetic detector 62. Thus, the noise, which is detected by the first magnetic detector 61, and the noise, which is detected by the second magnetic detector 62, are removed. Therefore, the robustness with respect to the relative positions of the first magnetic detector 61 and the second magnetic detector 62 relative to the first yoke 361 and the second yoke 362 is improved.

Furthermore, since the torque sensor 25 does not include the magnetism collecting elements described above, the size of the torque sensor 25 can be reduced by the amount that corresponds to the size of the magnetism collecting elements.

Furthermore, in the first embodiment, the following advantages are achieved.

[1-1] The first magnetic detector 61 and the second magnetic detector 62 are arranged on the common circle C that is centered on the axis of the magnet 30.

Therefore, a radial distance from the magnet 30 to the first magnetic detector 61 and a radial distance from the magnet 30 to the second magnetic detector 62 are likely to be equal to each other. Furthermore, the relative position of the first magnetic detector 61 with respect to the magnet 30 in the axial direction Da is likely to be the same as the relative position of the second magnetic detector 62 with respect to the magnet 30 in the axial direction Da. Therefore, the strength of the magnetic field, which leaks from the magnet 30 and is detected by the first magnetic detector 61, is likely to be the same as the strength of the magnetic field, which leaks from the magnet 30 and is detected by the second magnetic detector 62. Thus, the noise, which is detected by the first magnetic detector 61, and the noise, which is detected by the second magnetic detector 62, are likely to be canceled with each other. Thereby, the noise, which is detected by the first magnetic detector 61, and the noise, which is detected by the second magnetic detector 62, are likely to be removed.

[1-2] The magnet 30 is magnetized such that the magnetic poles are arranged in the rotational direction of the magnet 30 such that the polarities of the magnetic poles are alternately reversed in the rotational direction of the magnet 30. Furthermore, the detector-to-detector angle θ is set to be the angle that is expressed by 360°÷n×a.

In the initial state, it is likely that the first magnetic detector 61 is radially opposed only to the corresponding N-pole of the magnet 30, and the second magnetic detector 62 is radially opposed only to the corresponding S-pole of the magnet 30. Therefore, the direction of the magnetic field, which leaks from the magnet 30 and is detected by the second magnetic detector 62, is likely to be opposite to the direction of the magnetic field, which leaks from the magnet 30 and is detected by the first magnetic detector 61. Thus, the noise, which is detected by the first magnetic detector 61, and the noise, which is detected by the second magnetic detector 62, are likely to be canceled with each other. Thereby, the noise, which is detected by the first magnetic detector 61, and the noise, which is detected by the second magnetic detector 62, are likely to be removed.

[1-3] The magnet 30 is magnetized such that the magnetic poles are arranged in the rotational direction of the magnet 30 such that the polarities of the magnetic poles are alternately reversed in the rotational direction of the magnet 30. Furthermore, the number of the magnetic poles of the magnet 30 is equal to the sum of the number of the first-yoke claws 372 and the number of the second-yoke claws 382. Here, it should be noted that the sum of the number of the first-yoke claws 372 and the number of the second-yoke claws 382 serves as the number of claws.

This facilitates the manufacture and the management of the magnet 30, the first yoke 361 and the second yoke 362.

Second Embodiment

The second embodiment differs from the first embodiment with respect to the arrangements of the first magnetic detector 61 and the second magnetic detector 62. The rest of the present embodiment is the same as that of the first embodiment.

Furthermore, as shown in FIGS. 17 to 20, the first magnetic detector 61 overlaps with the first-yoke ring 370 when the first-yoke ring 370 is projected onto the first magnetic detector 61 in the axial direction Da. Furthermore, the first magnetic detector 61 overlaps with the second-yoke ring 380 when the second-yoke ring 380 is projected onto the first magnetic detector 61 in the axial direction Da. Furthermore, in the initial state, the first magnetic detector 61 overlaps with a corresponding one of the N-poles of the magnet 30 when the corresponding one of the N-poles is projected onto the first magnetic detector 61 in the corresponding radial direction directed to the corresponding one of the N-poles. Furthermore, in the initial state, the first magnetic detector 61 does not overlap with any one of the S-poles of the magnet 30 even when any one of the S-poles is projected in the radial direction.

The second magnetic detector 62 overlaps with the first-yoke ring 370 when the first-yoke ring 370 is projected onto the second magnetic detector 62 in the axial direction Da. Furthermore, the second magnetic detector 62 overlaps with the second-yoke ring 380 when the second-yoke ring 380 is projected onto the second magnetic detector 62 in the axial direction Da. Furthermore, in the initial state, the second magnetic detector 62 overlaps with the corresponding one of the N-poles of the magnet 30, which is the same as the one (e.g., the N-pole) of the magnetic poles overlapped with the first magnetic detector 61, when the corresponding one of the N-poles is projected onto the second magnetic detector 62 in the corresponding radial direction directed to the corresponding one of the N-poles. Furthermore, in the initial state, the second magnetic detector 62 does not overlap with any one of the S-poles of the magnet 30 even when any one of the S-poles is projected in the radial direction. Alternatively, in the initial state, each of the first magnetic detector 61 and the second magnetic detector 62 may overlap with one of the S-poles of the magnet 30 when the one of the S-poles is projected onto each of the first magnetic detector 61 and the second magnetic detector 62 in the corresponding radial direction directed to the one of the S-poles, and each of the first magnetic detector 61 and the second magnetic detector 62 may not overlap with any one of the N-poles of the magnet 30 even when any one of the N-poles is projected in the radial direction.

Figure 19:
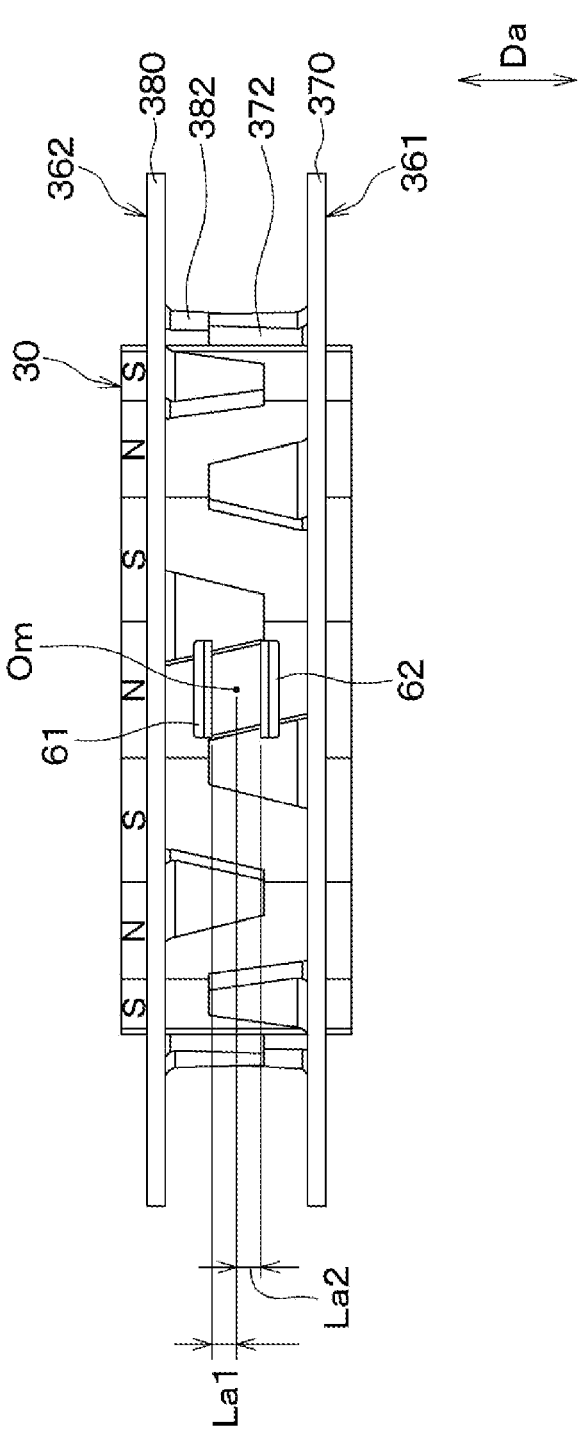
FIG. 19 is a view in a direction of an arrow XIX in FIG. 17.
Figure 20:
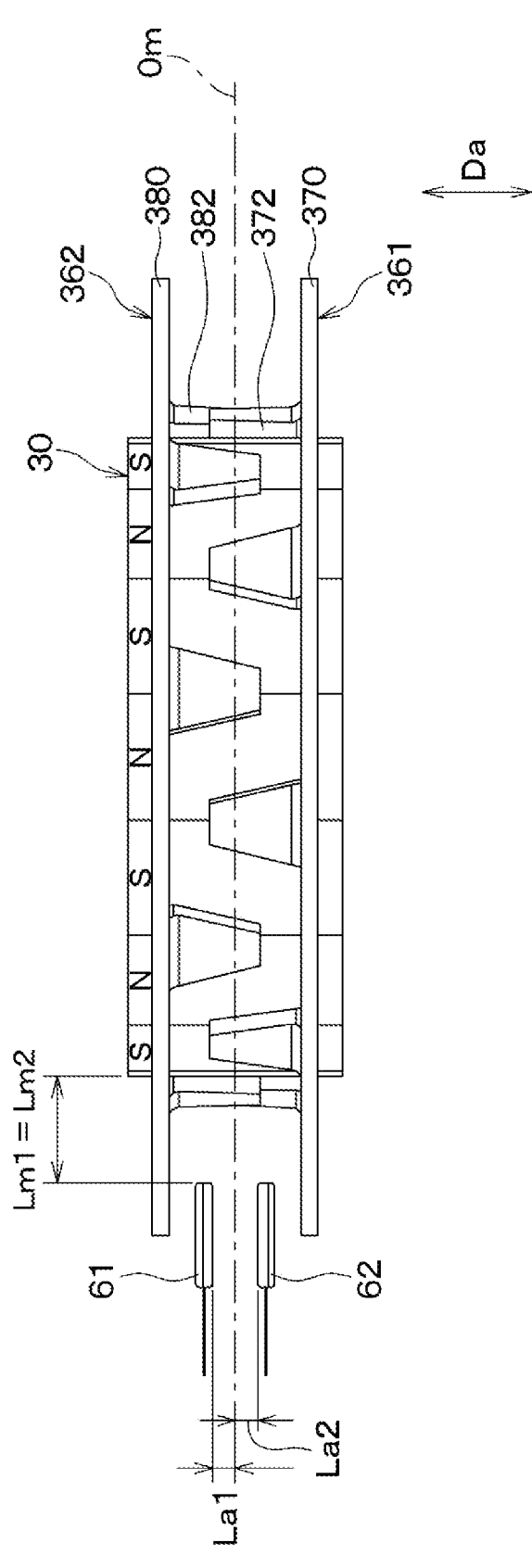
FIG. 20 is a view in a direction of an arrow XX in FIG. 17.
Figure 21:
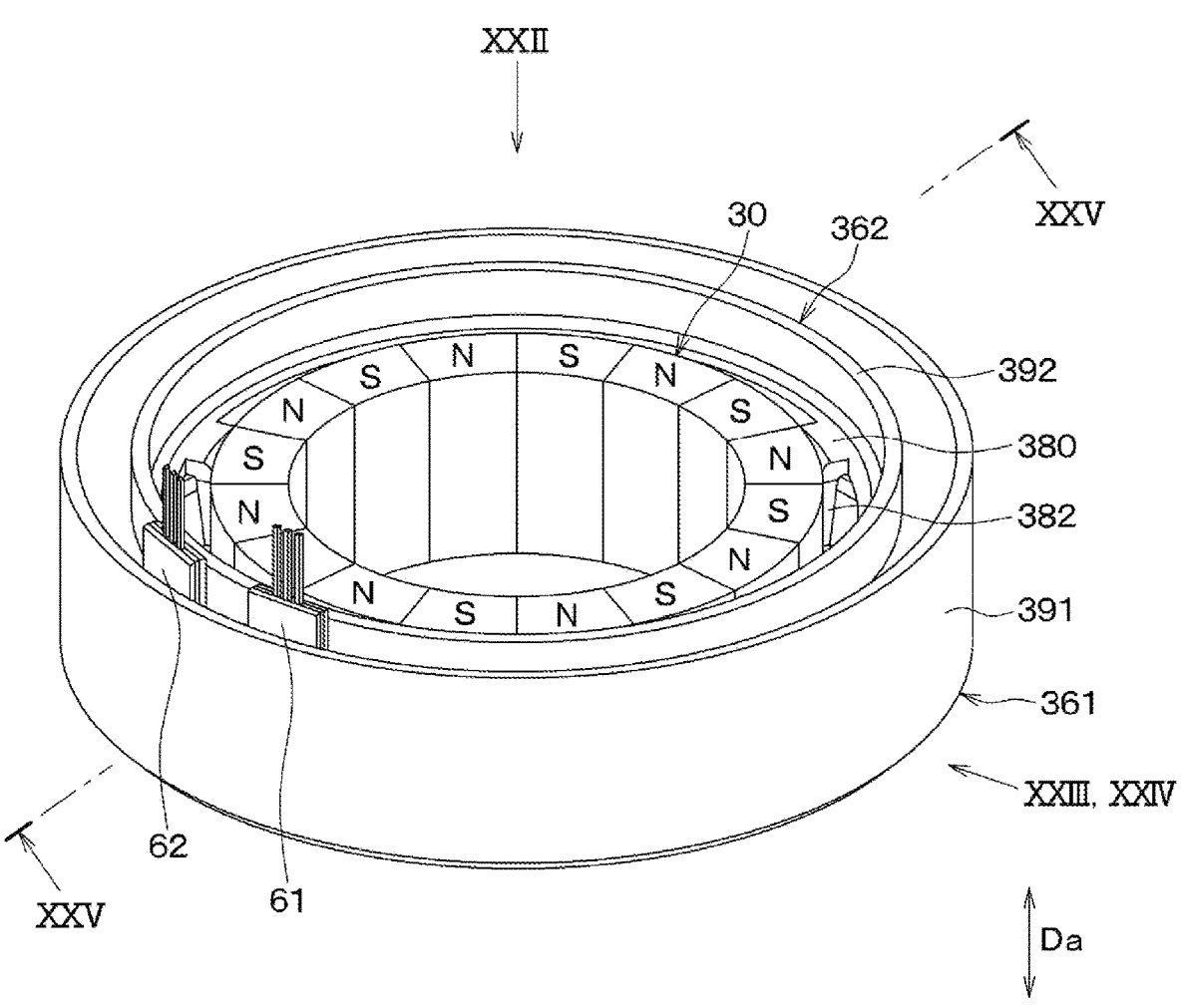
FIG. 21 is a perspective view showing a positional relationship among the magnet, the first yoke, the second yoke, the first magnetic detector and the second magnetic detector of the torque sensor of the torque detection system according to a third embodiment.

Here, a line, which passes through a center of a corresponding one of the magnetic poles of the magnet 30 and extends in the radial direction, is defined as a center line Om. As shown in FIGS. 19 and 20, a radial distance from the N-pole of the magnet 30, which is radially opposed to the first magnetic detector 61, to the first magnetic detector 61 is defined as a first magnet distance Lm1. A radial distance from the N-pole of the magnet 30, which is radially opposed to the second magnetic detector 62, to the second magnetic detector 62 is defined as a second magnet distance Lm2. A distance from the center line Om, which passes through the center of the N-pole, to the first magnetic detector 61 in the axial direction Da is defined as a first center-to-detector distance La1. A distance from the center line Om to the second magnetic detector 62 in the axial direction Da is defined as a second center-to-detector distance La2.

The first magnetic detector 61 is placed on one side of the center line Om in the axial direction Da. The second magnetic detector 62 is placed on the other side of the center line Om, which is opposite to the one side, in the axial direction Da. Furthermore, the second magnetic detector 62 overlaps with the first magnetic detector 61 when the second magnetic detector 62 is projected onto the first magnetic detector 61 in the axial direction Da. Furthermore, the first magnet distance Lm1 is the same as the second magnet distance Lm2. In addition, the first center-to-detector distance La1 is the same as the second center-to-detector distance La2.

The torque sensor 25 of the second embodiment is configured in the above-described manner. Next, even in the torque sensor 25 of the second embodiment, the magnetism collecting elements, such as the magnetism collecting elements of the previously proposed torque sensor described above, can be eliminated. Furthermore, even when the relative positions of the first magnetic detector 61 and the second magnetic detector 62 relative to the first yoke 361 and the second yoke 362 deviate, the tolerance to the noise magnetic field leaking from the magnet 30 is improved. These points will be described below.

The torque detection system of the present embodiment includes the torque sensor 25 and the motor control device 18. The torque sensor 25 includes the magnet 30, the rotor 35, the first yoke 361, the second yoke 362, the first magnetic detector 61 and the second magnetic detector 62. The magnet 30 is configured to generate the magnetic field and is configured to be rotated together with the steering wheel 5 about the axis of the magnet 30 which extends in the axial direction Da. The rotor 35 is shaped in the ring form and is configured to be rotated together with the steering wheel 5. The first yoke 361 has the first-yoke ring 370 and the first-yoke claws 372. The first-yoke ring 370 is shaped in the ring form and is configured to be rotated together with the rotor 35. The first-yoke claws 372 project from the first-yoke ring 370 in the axial direction Da and are thereby opposed to the magnet 30 in the radial direction. The first-yoke claws 372 are configured to be rotated together with the first-yoke ring 370 and thereby collect the magnetic field generated by the magnet 30. The second yoke 362 has the second-yoke ring 380 and the second-yoke claws 382. The second-yoke ring 380 is shaped in the ring form and is configured to be rotated together with the rotor 35. The second-yoke claws 382 project from the second-yoke ring 380 in the axial direction Da and are thereby opposed to the magnet 30 in the radial direction. The second-yoke claws 382 are configured to be rotated together with the second-yoke ring 380 and thereby collect the magnetic field generated by the magnet 30. The first magnetic detector 61 overlaps with the first-yoke ring 370 and the second-yoke ring 380 when the first magnetic detector 61 is projected onto the first-yoke ring 370 and the second-yoke ring 380 in the axial direction Da. Furthermore, the first magnetic detector 61 is configured to detect the strength of the magnetic field which corresponds to the torque and changes in response to a change in a relative angle of the first-yoke claws 372 and the second-yoke claws 382 relative to the magnet 30 in the rotational direction of the magnet 30. The second magnetic detector 62 overlaps with the first-yoke ring 370 and the second-yoke ring 380 when the second magnetic detector 62 is projected onto the first-yoke ring 370 and the second-yoke ring 380 in the axial direction Da. Also, the second magnetic detector 62 is configured to detect the strength of the magnetic field which corresponds to the torque and changes in response to the change in the relative angle of the first-yoke claws 372 and the second-yoke claws 382 relative to the magnet 30 in the rotational direction of the magnet 30. The motor control device 18 calculates the steering torque based on the signal outputted from the first magnetic detector 61 and the signal outputted from the second magnetic detector 62. Furthermore, in the initial state, the first magnetic detector 61 overlaps with the one (e.g., the N-pole) of the magnetic poles of the magnet 30 when the one (e.g., the N-pole) of the magnetic poles is projected onto the first magnetic detector 61 in the corresponding radial direction directed to the one (e.g., the N-pole) of the magnetic poles. In addition, the first magnetic detector 61 is placed on the one side of the center line Om in the axial direction Da. Also, in the initial state, the second magnetic detector 62 overlaps with the one (e.g., the N-pole) of the magnetic poles of the magnet 30, which is the same as the one (e.g., the N-pole) of the magnetic poles overlapped with the first magnetic detector 61, when the one (e.g., the N-pole) of the magnetic poles is projected onto the second magnetic detector 62 in the corresponding radial direction directed to the one (e.g., the N-pole) of the magnetic poles. In addition, the second magnetic detector 62 is placed on the other side of the center line Om in the axial direction Da. The motor control device 18 calculates the sum of the value, which relates to the detected strength of the magnetic field detected by the first magnetic detector 61, and the value, which relates to the detected strength of the magnetic field detected by the second magnetic detector 62. Furthermore, the motor control device 18 calculates the steering torque based on the calculated sum.

In the initial state, the second magnetic detector 62 overlaps with the one of the magnetic poles of the magnet 30, which is the same as the one of the magnetic poles overlapped with the first magnetic detector 61, when the one of the magnetic poles is projected onto the second magnetic detector 62 in the corresponding radial direction directed to the one of the magnetic poles. The first magnetic detector 61 is placed on the one side of the center line Om in the axial direction Da. In addition, the second magnetic detector 62 is placed on the other side of the center line Om in the axial direction Da. Therefore, the direction of the magnetic field, which leaks from the magnet 30 and is detected by the second magnetic detector 62, is opposite to the direction of the magnetic field, which leaks from the magnet 30 and is detected by the first magnetic detector 61. Thus, the noise, which is detected by the first magnetic detector 61, and the noise, which is detected by the second magnetic detector 62, are canceled with each other. Furthermore, the motor control device 18 calculates the sum of the value, which relates to the detected strength of the magnetic field detected by the first magnetic detector 61, and the value, which relates to the detected strength of the magnetic field detected by the second magnetic detector 62. Thereby, the noise, which is detected by the first magnetic detector 61, and the noise, which is detected by the second magnetic detector 62, are removed. Therefore, even when the magnetism collecting elements are eliminated, or when the relative positions of the first magnetic detector 61 and the second magnetic detector

62 relative to the first yoke 361 and the second yoke 362 deviate, the tolerance to the noise magnetic field leaking from the magnet 30 is improved.

Furthermore, in the second embodiment, in addition to the advantage recited in the above section [1-3], the following advantages can be achieved.

[2-1] The first magnet distance Lm1 is the same as the second magnet distance Lm2. Thereby, the strength of the magnetic field, which leaks from the magnet 30 and is detected by the first magnetic detector 61, is likely to be the same as the strength of the magnetic field, which leaks from the magnet 30 and is detected by the second magnetic detector 62. Thus, the noise, which is detected by the first magnetic detector 61, and the noise, which is detected by the second magnetic detector 62, are likely to be canceled with each other. Thereby, the noise, which is detected by the first magnetic detector 61, and the noise, which is detected by the second magnetic detector 62, are likely to be removed.

[2-2] The first center-to-detector distance La1 is the same as the second center-to-detector distance La2. Thereby, the strength of the magnetic field, which leaks from the magnet 30 and is detected by the first magnetic detector 61, is likely to be the same as the strength of the magnetic field, which leaks from the magnet 30 and is detected by the second magnetic detector 62. Thus, the noise, which is detected by the first magnetic detector 61, and the noise, which is detected by the second magnetic detector 62, are likely to be canceled with each other. Thereby, the noise, which is detected by the first magnetic detector 61, and the noise, which is detected by the second magnetic detector 62, are likely to be removed.

Third Embodiment

The third embodiment differs from the first embodiment with respect to the configurations of the first yoke 361, the second yoke 362, the first magnetic detector 61 and the second magnetic detector 62. The rest of the present embodiment is the same as that of the first embodiment.

As shown in FIGS. 21 to 25, the first yoke 361 includes a first-yoke flange 391 in addition to the first-yoke ring 370 and the first-yoke claws 372.

The first-yoke flange 391 is joined to a side of the first-yoke ring 370 which is axially opposite to the first-yoke claws 372. Furthermore, the first-yoke flange 391 extends in the axial direction Da from a boundary between the first-yoke flange 391 and the first-yoke ring 370. Furthermore, the first-yoke flange 391 is shaped in a cylindrical tubular form.

The second yoke 362 includes a second-yoke flange 392 in addition to the second-yoke ring 380 and the second-yoke claws 382.

The second-yoke flange 392 is joined to a side of the second-yoke ring 380 which is axially opposite to the second-yoke claws 382. Furthermore, the second-yoke flange 392 extends in the axial direction Da from a boundary between the second-yoke flange 392 and the second-yoke ring 380. Furthermore, the second-yoke flange 392 is shaped in a cylindrical tubular form.

The first magnetic detector 61 detects a strength of the magnetic field applied to the first magnetic detector 61 in the radial direction. Furthermore, the first magnetic detector 61 overlaps with the first-yoke flange 391 when the first-yoke flange 391 is projected onto the first magnetic detector 61 in the radial direction. Also, the first magnetic detector 61 overlaps with the second-yoke flange 392 when the second-yoke flange 392 is projected onto the first magnetic detector 61 in the radial direction. In the initial state, the first magnetic detector 61 overlaps with one of the N-poles among the magnetic poles of the magnet 30 when the one of the N-poles is projected onto the first magnetic detector 61 in a corresponding radial direction directed to the one of the N-poles. Furthermore, in the initial state, the first magnetic detector 61 does not overlap with any one of the S-poles among the magnetic poles of the magnet 30 even when any one of the S-poles is projected in the radial direction.

The second magnetic detector 62 detects a strength of the magnetic field applied to the second magnetic detector 62 in the radial direction. Furthermore, the second magnetic detector 62 overlaps with the first-yoke flange 391 when the first-yoke flange 391 is projected onto the second magnetic detector 62 in the radial direction. Also, the second magnetic detector 62 overlaps with the second-yoke flange 392 when the second-yoke flange 392 is projected onto the second magnetic detector 62 in the radial direction. In the initial state, the second magnetic detector 62 overlaps with one of the S-poles of the magnet 30 when the one of the S-poles is projected onto the second magnetic detector 62 in a corresponding radial direction directed to the one of the S-poles. Furthermore, in the initial state, the second magnetic detector 62 does not overlap with any one of the N-poles of the magnet 30 even when any one of the N-poles is projected in the radial direction.

Figure 22:
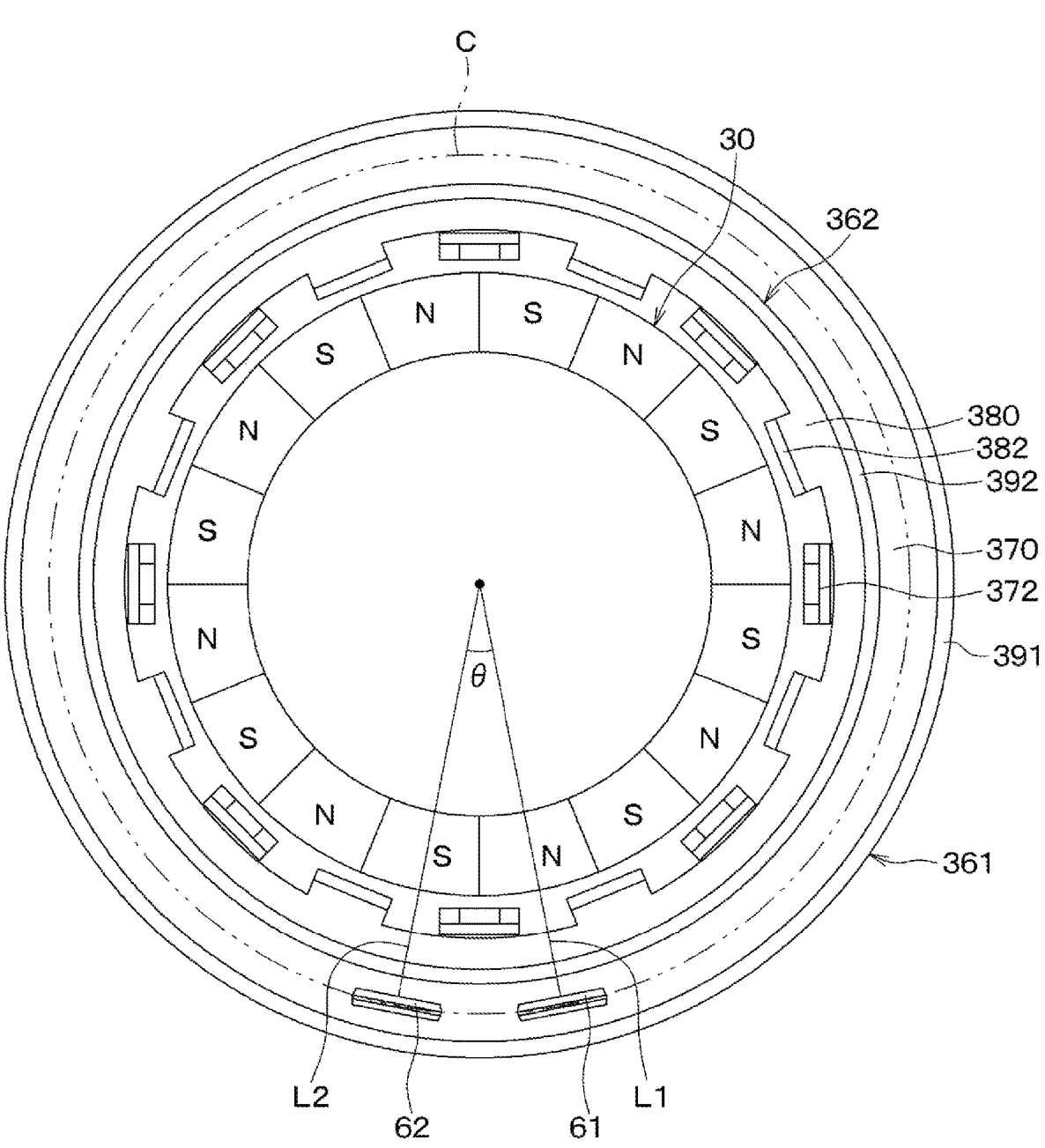
FIG. 22 is a view in a direction of an arrow XXII in FIG. 21.
Figure 23:
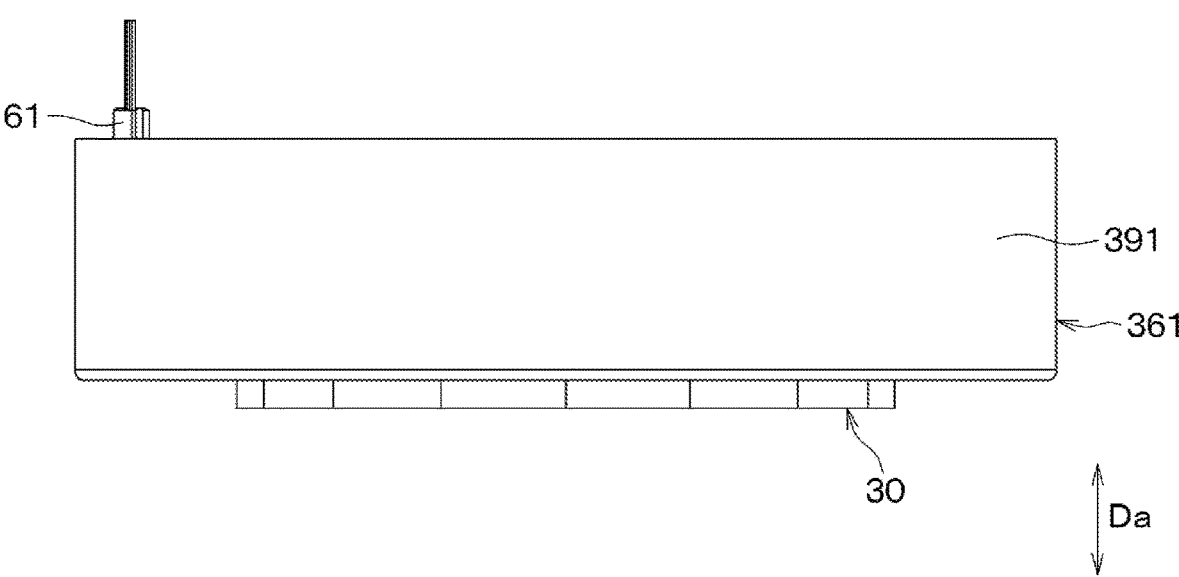
FIG. 23 is a view in a direction of an arrow XXIII in FIG. 21.
Figure 24:
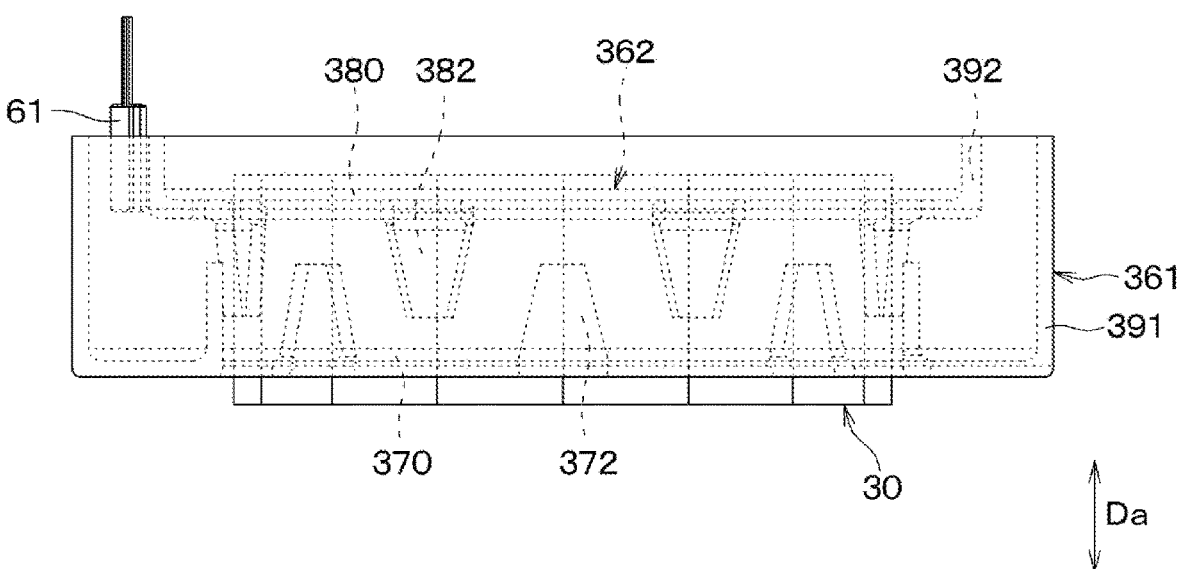
FIG. 24 is a view in a direction of an arrow XXIV in FIG. 21.
Figure 25:
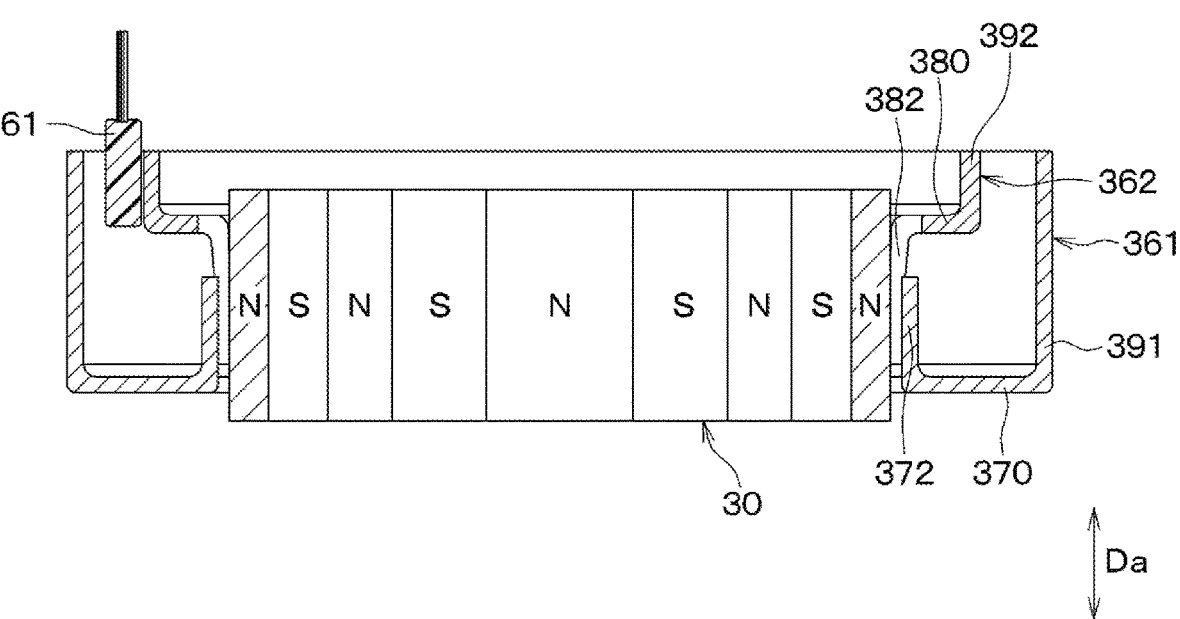
FIG. 25 is a cross-sectional view taken along line XXV-XXV in FIG. 21.

Also, as shown in FIG. 22, the first magnetic detector 61 and the second magnetic detector 62 are arranged on the common circle C that is centered on the axis of the rotor 35. In addition, the detector-to-detector angle θ is set to the angle indicated by the above-described relational equation (1). Furthermore, a distance from the first-yoke ring 370 to the first magnetic detector 61 in the axial direction Da is the same as a distance from the first-yoke ring 370 to the second magnetic detector 62 in the axial direction Da.

The torque sensor 25 of the third embodiment is configured in the above-described manner. Next, the detection of the steering torque with the torque sensor 25 of the third embodiment will be described.

When the steering wheel 5 is rotated, the first yoke 361 and the second yoke 362 are rotated relative to the magnet 30. At this time, it is assumed that the number of magnetic field lines, which extend from the corresponding N-pole of the magnet 30 to the corresponding first-yoke claw 372, is increased, and the number of magnetic field lines, which extend from the corresponding second-yoke claw 382 to the corresponding S-pole of the magnet 30, is increased.

In this case, the number of magnetic field lines, which extend from the N-pole of the magnet 30 and pass through the corresponding one of the first magnetic detector 61 and the second magnetic detector 62 via the first-yoke claw 372, the first-yoke ring 370 and the first-yoke flange 391, is increased. Furthermore, the magnetic field lines, which have passed through the corresponding one of the first magnetic detector 61 and the second magnetic detector 62, pass through the S-pole of the magnet 30 via the second-yoke flange 392, the second-yoke ring 380 and the second-yoke claw 382.

Thus, each of the first magnetic detector 61 and the second magnetic detector 62 detects the strength of the magnetic field directed toward a corresponding one side among two opposite sides in the radial direction. Thereby, the first magnetic detector 61 and the second magnetic detector 62 detect the steering torque. Furthermore, each of the first magnetic detector 61 and the second magnetic detector 62 outputs a signal, which corresponds to the detected strength of the magnetic field, to the motor control device 18 through the corresponding terminal 80.

Furthermore, it is assumed that the number of magnetic field lines, which extend from the N-pole of the magnet 30 to the second-yoke claw 382, is increased, and the number of magnetic field lines, which extend from the first-yoke claw 372 to the S-pole of the magnet 30, is increased.

In this case, the number of magnetic field lines, which extend from the N-pole of the magnet 30 and pass through the corresponding one of the first magnetic detector 61 and the second magnetic detector 62 via the second-yoke claw 382, the second-yoke ring 380 and the second-yoke flange 392, is increased. Furthermore, the magnetic field lines, which have passed through the corresponding one of the first magnetic detector 61 and the second magnetic detector 62, pass through the S-pole of the magnet 30 via the first-yoke flange 391, the first-yoke ring 370 and the first-yoke claw 372.

Thus, each of the first magnetic detector 61 and the second magnetic detector 62 detects the strength of the corresponding magnetic field directed toward the corresponding one side among the two opposite sides in the radial direction. Thereby, the first magnetic detector 61 and the second magnetic detector 62 detect the steering torque. Furthermore, each of the first magnetic detector 61 and the second magnetic detector 62 outputs a signal, which corresponds to the detected strength of the magnetic field, to the motor control device 18 through the corresponding terminal 80.

Furthermore, like in the above-described case, the motor control device 18 calculates a sum of a value, which relates to a detected strength of the magnetic field detected by the first magnetic detector 61, and a value, which relates to a detected strength of the magnetic field detected by the second magnetic detector 62. Thereby, the motor control device 18 removes the noises which are induced by the magnetic field leaking from the magnet 30. The motor control device 18 calculates the steering torque based on the calculated sum.

As described above, the torque sensor 25 detects the steering torque. Even in the third embodiment, the advantages, which are similar to those of the first embodiment, are achieved.

Fourth Embodiment

The fourth embodiment differs from the first embodiment with respect to the configurations of the first-yoke claws 372 and the second-yoke claws 382. The rest of the fourth embodiment is the same as that of the first embodiment.

Figure 26:
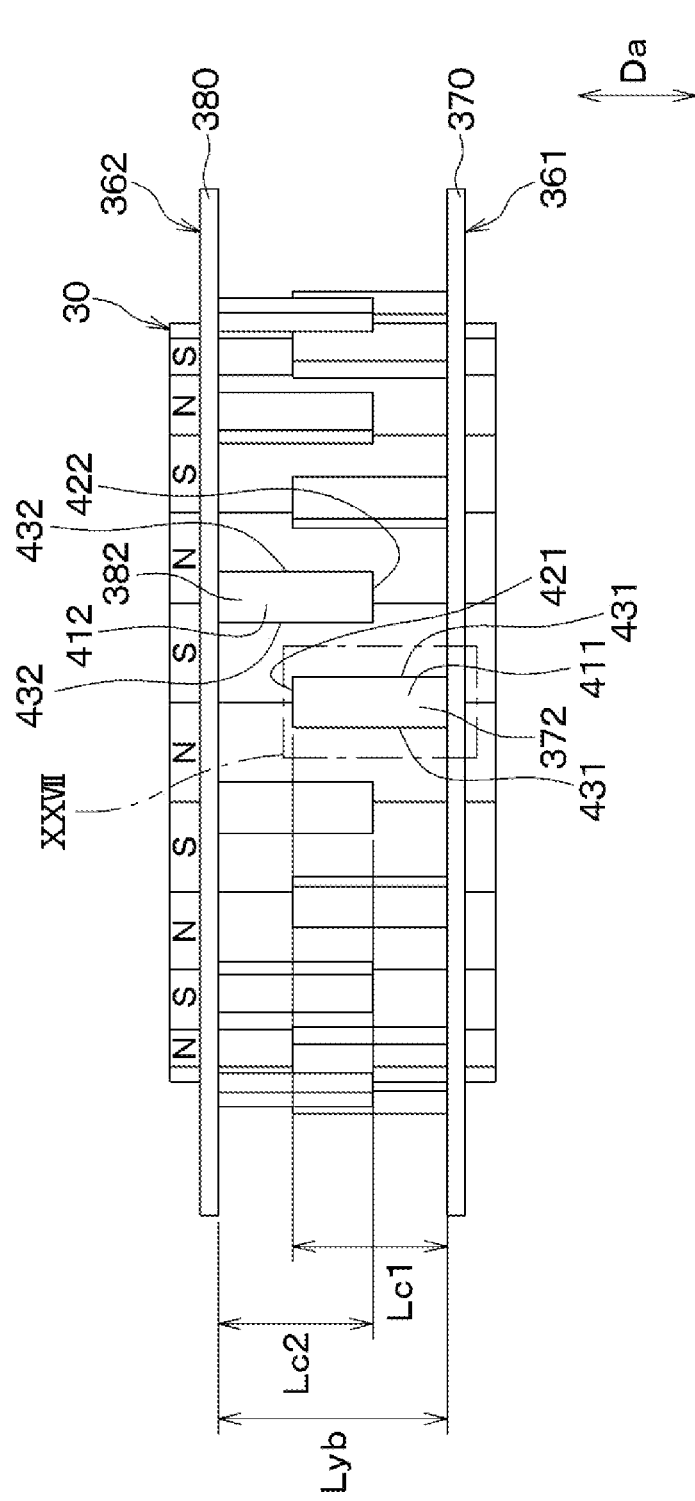
FIG. 26 is a side view showing the magnet, the first yoke and the second yoke of the torque sensor of the torque detection system according to a fourth embodiment.
Figure 27:
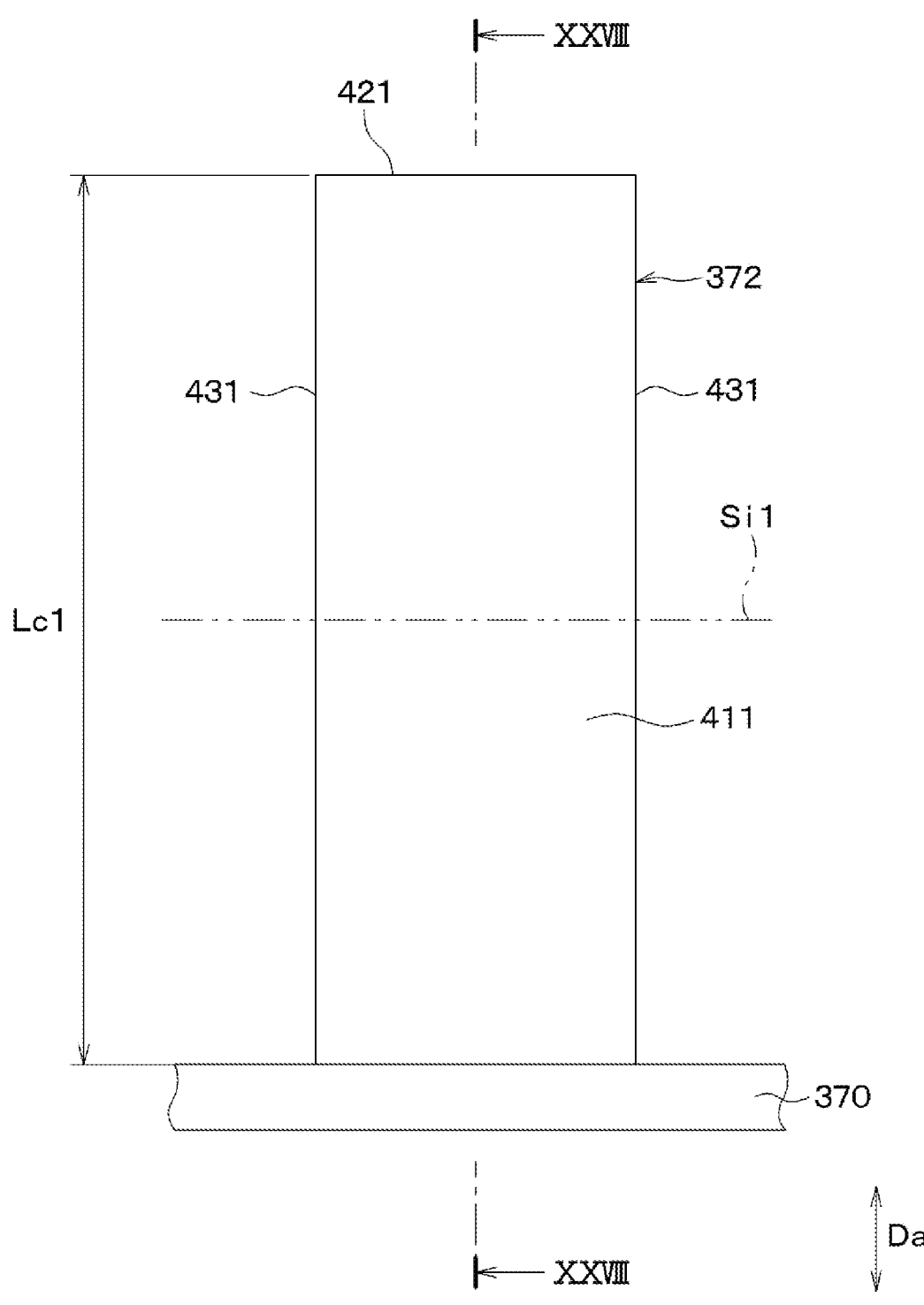
FIG. 27 is an enlarged view of a section XXVII of FIG. 26.
Figure 28:
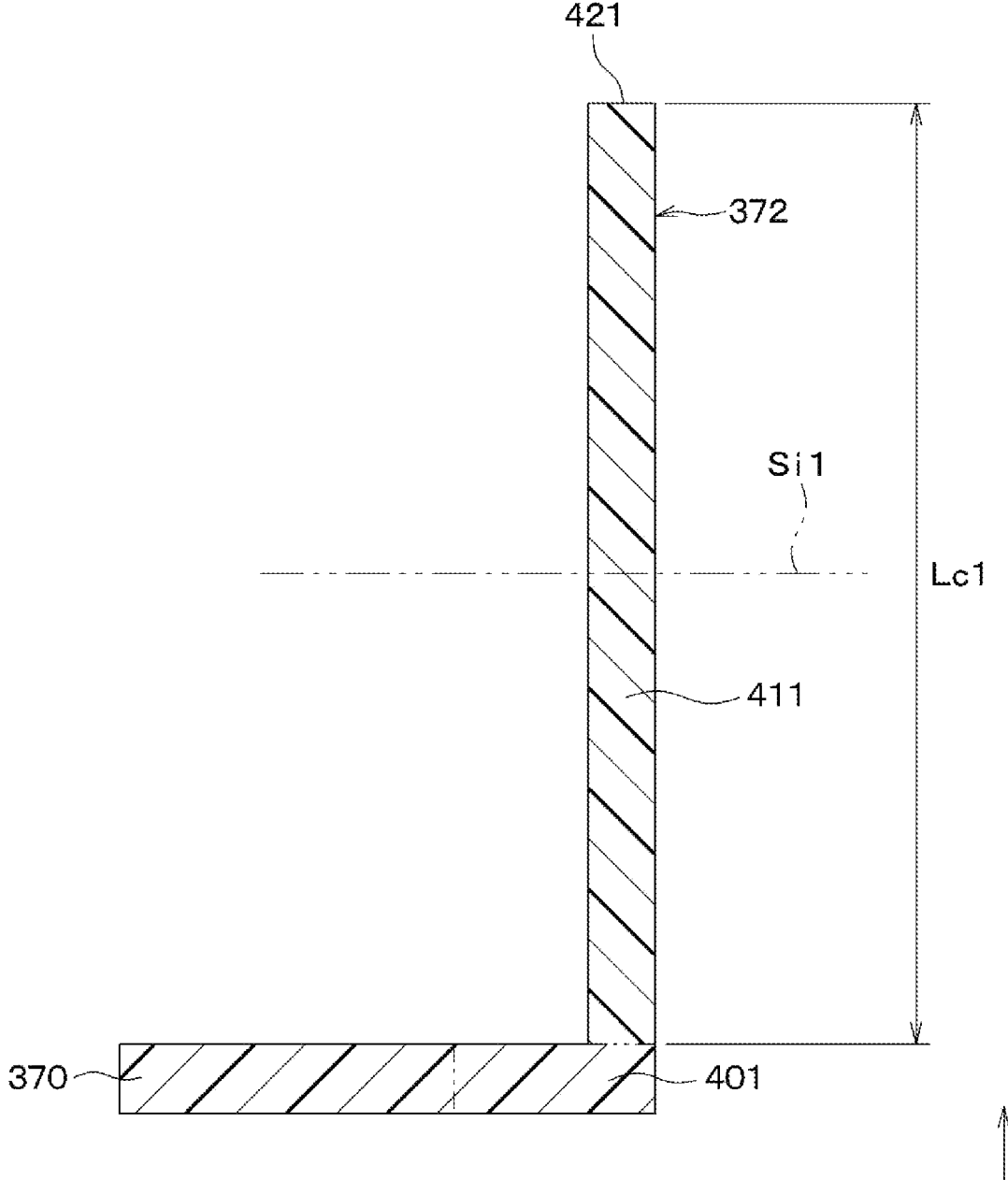
FIG. 28 is a cross-sectional view taken along line XXVIII-XXVIII in FIG. 27.

As shown in FIGS. 26 to 28, each of the first-yoke claws 372 has a first connecting portion 401 and a first projecting portion 411.

The first connecting portion 401 is joined to the first-yoke ring 370 in the radial direction. In FIGS. 26 to 28, the indication of the rotor 35 is omitted to avoid complication. Furthermore, the first connecting portions 401 are respectively inserted into holes of the rotor 35 which are arranged at predetermined intervals in the circumferential direction. In addition, although the first connecting portion 401 is joined to the first-yoke ring 370 in the radial direction, the configuration of the first connecting portion 401 is not limited to this. For example, the first connecting portion 401 may be joined to the first-yoke ring 370 in the axial direction Da.

The first projecting portion 411 is joined to a side of the first connecting portion 401 which is opposite to the first-yoke ring 370. Furthermore, the first projecting portion 411 projects from a boundary between the first projecting portion 411 and the first connecting portion 401 in the axial direction Da. Also, the first projecting portion 411 overlaps with the magnet 30 when the magnet 30 is projected onto the first projecting portion 411 in the radial direction. Like in the first embodiment, each of the first-yoke claws 372 is connected to the inner peripheral surface of the rotor 35, and thereby each of the first projecting portions 411 is connected to the inner peripheral surface of the rotor 35.

Here, a plane, which passes through a center of the first projecting portion 411 centered in the axial direction Da and is perpendicular to the axial direction Da, is defined as a first center plane Si1. Furthermore, a maximum length of the first projecting portion 411 in the axial direction Da is defined as a first length Lc1. Also, as shown in FIG. 26, a minimum length from the first-yoke ring 370 to the second-yoke ring 380 in the axial direction Da is defined as a yoke-to-yoke distance Lyb.

Referring back to FIGS. 26 to 28, the first projecting portion 411 has a symmetrical shape that is symmetrical in the axial direction Da with respect to the first center plane Si1. Specifically, the first projecting portion 411 is shaped in a prism form. Furthermore, the first projecting portion 411 has a first bottom surface 421 and a first peripheral surface 431. The first bottom surface 421 is formed in, for example, a polygonal shape, a circular shape or an elliptical shape. In this instance, the first bottom surface 421 is shaped in, for example, an oblong rectangular shape. Furthermore, the first bottom surface 421 is perpendicular to the axial direction Da. The first peripheral surface 431 is joined to the first bottom surface 421 and extends from the first bottom surface 421 in the axial direction Da. Therefore, in this instance, the first projecting portion 411 is shaped in a quadrangular prism form. Here, although all of the first projecting portions 411 are respectively shaped in the quadrangular prism form, the present disclosure is not limited to this. At least one of the first projecting portions 411 may be shaped in the quadrangular prism form. Furthermore, the term "symmetrical" refers to "line symmetrical" or "point symmetrical." Furthermore, the degree of symmetry includes a manufacturing error range.

Furthermore, the first length Lc1 is set to be equal to or larger than 30% of the yoke-to-yoke distance Lyb. In this instance, although all of the first projecting portions 411 have the first length Lc1 that is equal to or larger than 30% of the yoke-to-yoke distance Lyb, the present disclosure is not limited to this. At least one of the first projecting portions 411 may have the first length Lc1 that is equal to or larger than 30% of the yoke-to-yoke distance Lyb.

Figure 29:
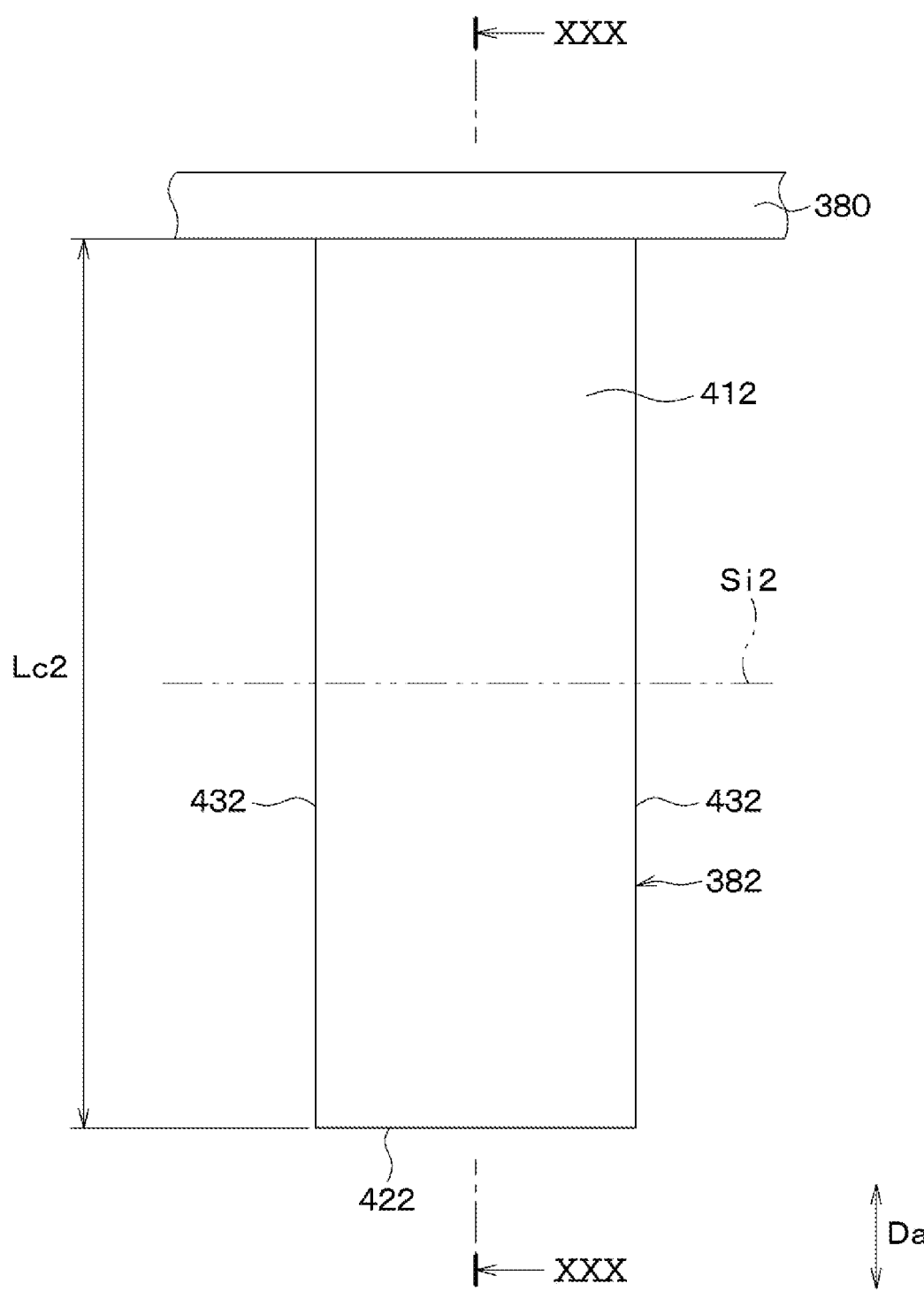
FIG. 29 is an enlarged view of the second yoke.
Figure 30:
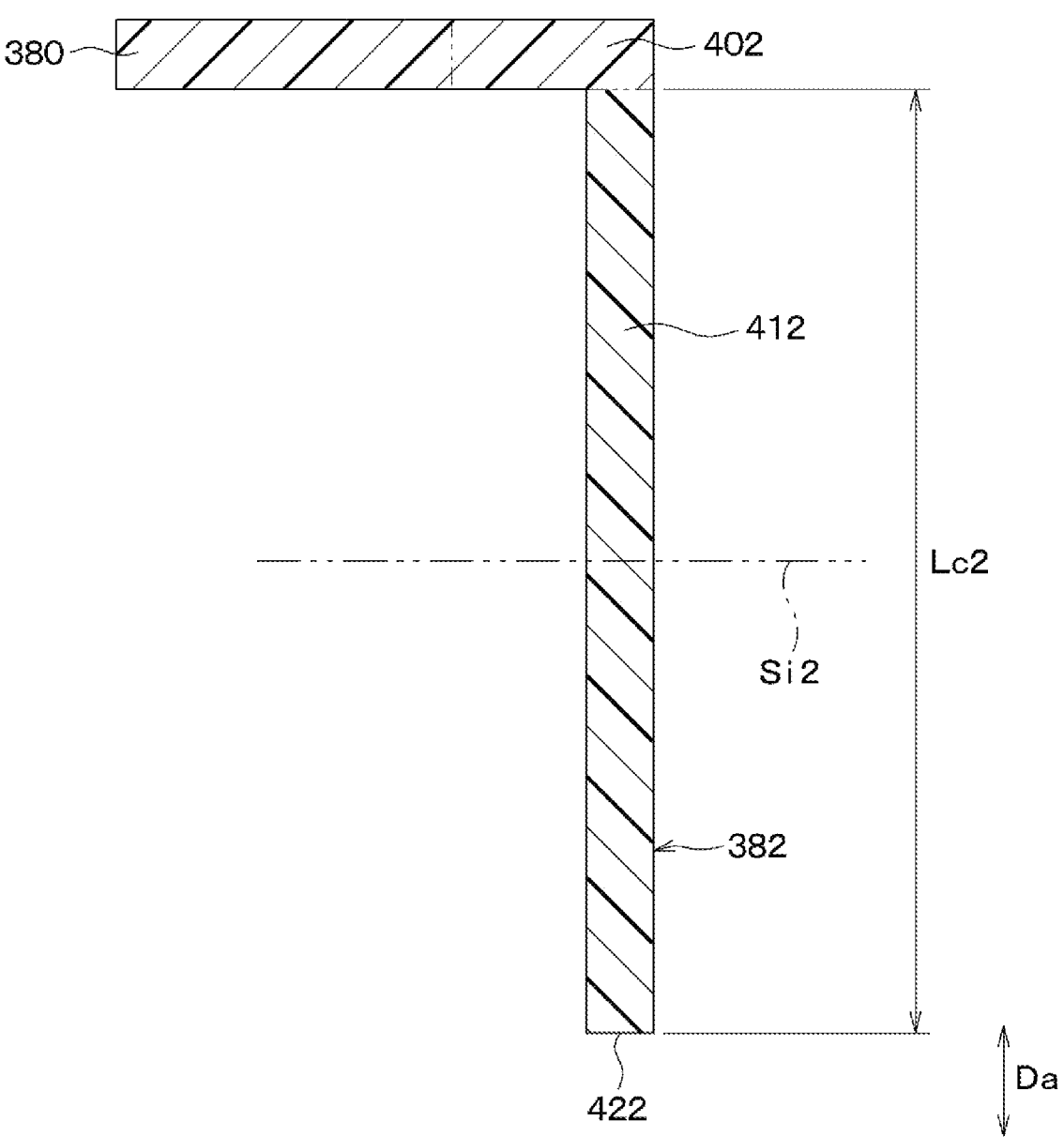
FIG. 30 is a cross-sectional view taken along line XXX-XXX in FIG. 29.

As shown in FIGS. 26, 29 and 30, each of the second-yoke claws 382 has a second connecting portion 402 and a second projecting portion 412.

The second connecting portion 402 is joined to the second-yoke ring 380 in the radial direction. In FIGS. 29 and 30, the indication of the rotor 35 is omitted to avoid complication. Furthermore, the second connecting portions 402 are respectively inserted into holes of the rotor 35 which are arranged at predetermined intervals in the circumferential direction. In addition, although the second connecting portion 402 is joined to the second-yoke ring 380 in the radial direction, the configuration of the second connecting portion 402 is not limited to this. For example, the second connecting portion 402 may be joined to the second-yoke ring 380 in the axial direction Da.

The second projecting portion 412 is joined to a side of the second connecting portion 402 which is opposite to the second-yoke ring 380. Furthermore, the second projecting portion 412 projects from a boundary between the second projecting portion 412 and the second connecting portion 402 in the axial direction Da. Also, the second projecting portion 412 overlaps with the magnet 30 when the magnet 30 is projected onto the second projecting portion 412 in the radial direction. Like in the first embodiment, each of the second-yoke claws 382 is connected to the inner peripheral surface of the rotor 35, and thereby each of the second projecting portions 412 is connected to the inner peripheral surface of the rotor 35. Like in the first embodiment, since each of the second-yoke claws 382 is placed between corresponding adjacent two of the first-yoke claws 372, each of the second projecting portions 412 is placed between corresponding adjacent two of the first projecting portions 411. Therefore, the first projecting portions 411 and the second projecting portions 412 are alternately arranged in the circumferential direction.

Furthermore, a plane, which passes through a center of the second projecting portion 412 centered in the axial direction Da and is perpendicular to the axial direction Da, is defined as a second center plane Si2. Furthermore, a maximum length of the second projecting portion 412 in the axial direction Da is defined as a second length Lc2.

The second projecting portion 412 has a symmetrical shape that is symmetrical in the axial direction Da with respect to the second center plane Si2. Specifically, the second projecting portion 412 is shaped in a prism form. Furthermore, the second projecting portion 412 has a second bottom surface 422 and a second peripheral surface 432. The second bottom surface 422 is formed in, for example, a polygonal shape, a circular shape or an elliptical shape. In this instance, the second bottom surface 422 is shaped in, for example, an oblong rectangular shape. Furthermore, the second bottom surface 422 is perpendicular to the axial direction Da. The second peripheral surface 432 is joined to the second bottom surface 422 and extends from the second bottom surface 422 in the axial direction Da. Therefore, in this instance, the second projecting portion 412 is shaped in a quadrangular prism form. Here, although all of the second projecting portions 412 are respectively shaped in the quadrangular prism form, the present disclosure is not limited to this. At least one of the second projecting portions 412 may be shaped in the quadrangular prism form.

Furthermore, the second length Lc2 is set to be equal to or larger than 30% of the yoke-to-yoke distance Lyb. In this instance, although all of the second projecting portions 412 have the second length Lc2 that is equal to or larger than 30% of the yoke-to-yoke distance Lyb, the present disclosure is not limited to this. At least one of the second projecting portions 412 may have the second length Lc2 that is equal to or larger than 30% of the yoke-to-yoke distance Lyb.

The torque sensor 25 of the fourth embodiment is configured in the above-described manner. Even in the fourth embodiment, the advantages, which are similar to those of the first embodiment, are achieved. Furthermore, in the fourth embodiment, the following advantages are achieved.

Figure 31:
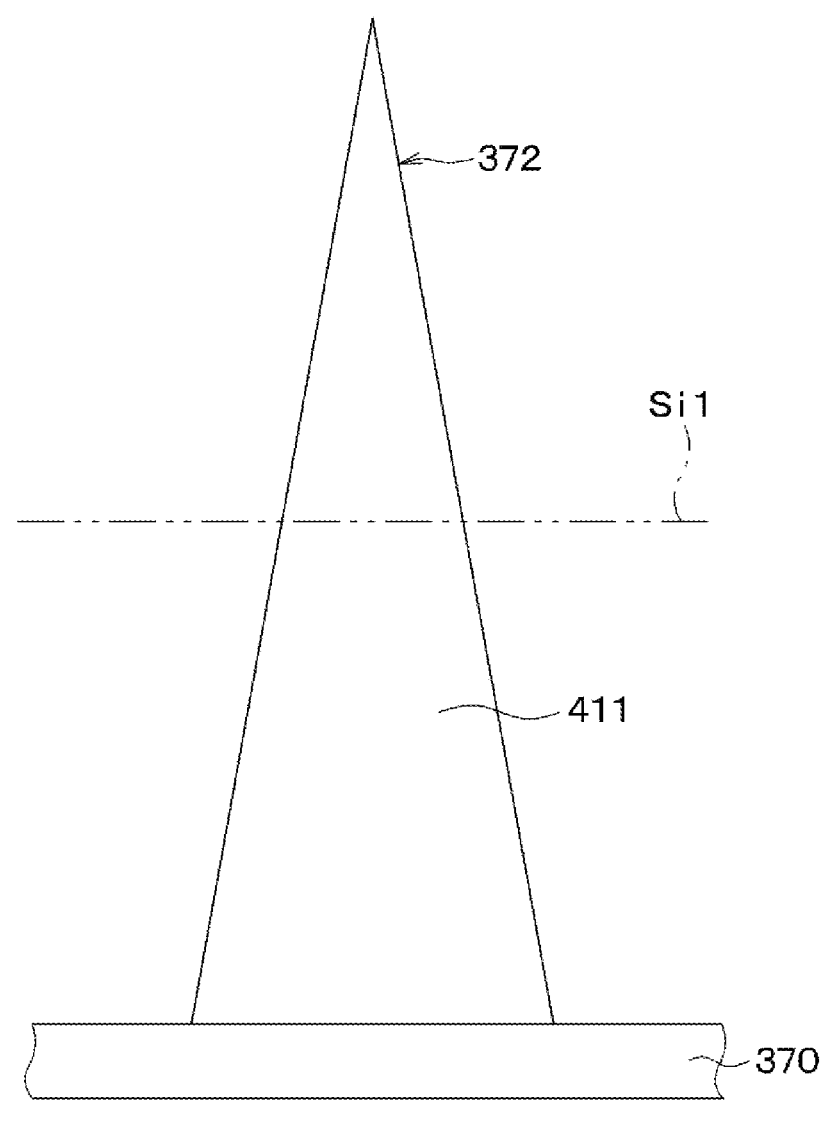
FIG. 31 is an enlarged view of a first projecting portion of a first yoke of a comparative example.

[3-1] Here, as a comparative example, it is assumed that as shown in FIG. 31, the first projecting portion 411 is shaped in a triangular prism form, and the bottom surface of the first projecting portion 411 is parallel to the axial direction Da and has a triangular shape. In this case, the first projecting portion 411 has an asymmetrical shape that is asymmetrical in the axial direction Da with respect to the first center plane Si1. At this time, a size of a distal end of the first projecting portion 411 (in this instance, a size of an end of the first projecting portion 411 which is opposite to the first-yoke ring 370) is smaller than a size of another end of the first projecting portion 411 at which the first-yoke ring 370 is placed. Therefore, since the magnetic field, which leaks from the magnet 30, is likely to pass through the distal end and a periphery thereof of the first projecting portion 411, a magnetic flux at the distal end and the periphery thereof of the first projecting portion 411, which is generated by the magnetic field leaking from the magnet 30, becomes larger than a magnetic flux at the other end and a periphery thereof of the first projecting portion 411 at which the first-yoke ring 370 is placed. Therefore, a magnetic flux distribution around the first projecting portion 411 becomes an asymmetrical distribution with respect to the first center plane Si1. This increases variations in the magnetic flux around the first projecting portion 411. Thus, the magnetic field, which leaks from the magnet 30, tends to pass through the corresponding one of the first magnetic detector 61 and the second magnetic detector 62 through a portion of the first projecting portion 411 (in this instance, the distal end and the periphery thereof of the first projecting portion 411) at which the large magnetic flux is present. Therefore, when the first projecting portion 411 has the asymmetrical shape, which is asymmetrical in the axial direction Da with respect to the first center plane Si1, the tolerance to the noise magnetic field leaking from the magnet 30 is reduced.

Figure 32:
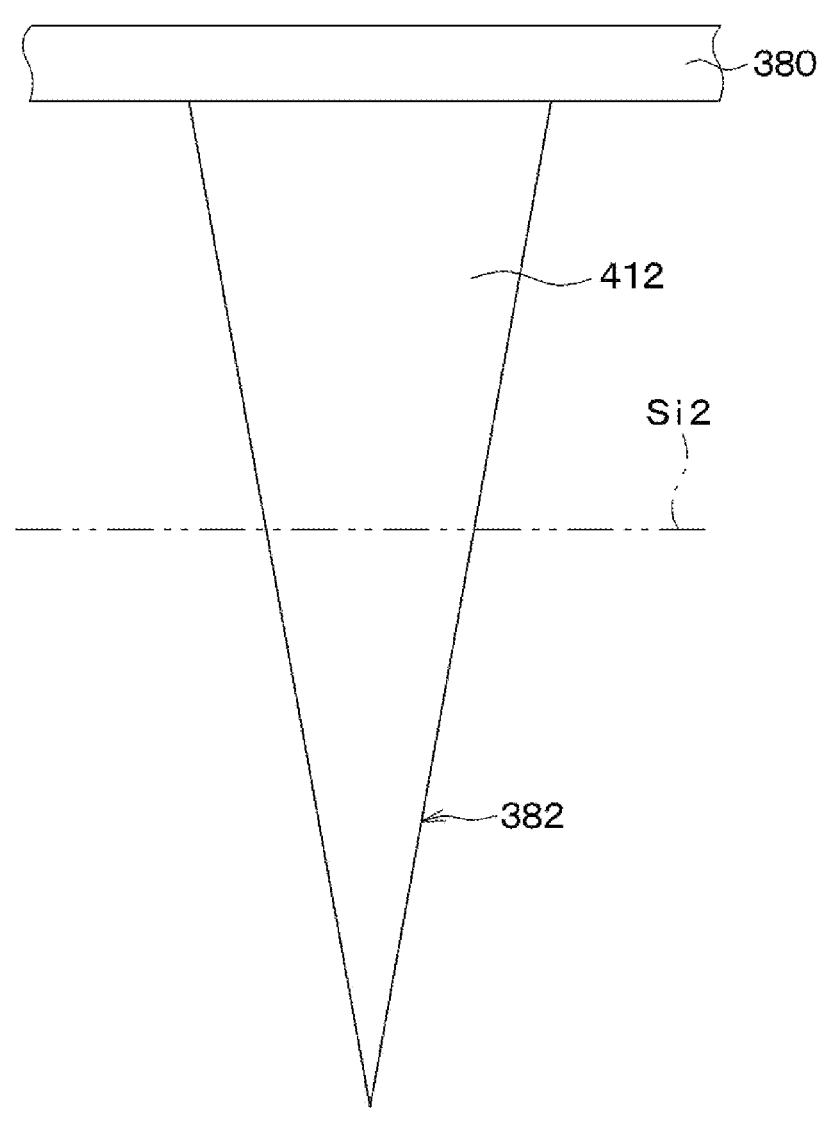
FIG. 32 is an enlarged view of a second projecting portion of a second yoke of the comparative example.

Furthermore, as a comparative example, it is assumed that as shown in FIG. 32, the second projecting portion 412 is shaped in a triangular prism form, and the bottom surface of the second projecting portion 412 is parallel to the axial direction Da and has a triangular shape. In this case, the second projecting portion 412 is asymmetrical in the axial direction Da with respect to the second center plane Si2. At this time, a size of a distal end of the second projecting portion 412 (in this instance, a size of an end of the second projecting portion 412 which is opposite to the second-yoke ring 380) is smaller than a size of another end of the second projecting portion 412 at which the second-yoke ring 380 is placed. Therefore, since the magnetic field, which leaks from the magnet 30, is likely to pass through the distal end and a periphery thereof of the second projecting portion 412, a magnetic flux at the distal end and the periphery thereof of the second projecting portion 412, which is generated by the magnetic field leaking from the magnet 30, becomes larger than a magnetic flux at the other end and a periphery thereof of the second projecting portion 412 at which the second-yoke ring 380 is placed. Therefore, a magnetic flux distribution around the second projecting portion 412 becomes an asymmetrical distribution with respect to the second center plane Si2. This increases variations in the magnetic flux around the second projecting portion 412. Thus, the magnetic field, which leaks from the magnet 30, tends to pass through the corresponding one of the first magnetic detector 61 and the second magnetic detector 62 through a portion of the second projecting portion 412 (in this instance, the distal end and the periphery thereof of the second projecting portion 412) at which the large magnetic flux is present. Therefore, when the second projecting portion 412 has the asymmetrical shape, which is asymmetrical in the axial direction Da with respect to the second center plane Si2, the tolerance to the noise magnetic field leaking from the magnet 30 is reduced.

In contrast to this, according to the fourth embodiment, each of the first-yoke claws 372 has the first connecting portion 401 and the first projecting portion 411. The first connecting portion 401 is joined to the first-yoke ring 370. The first projecting portion 411 is joined to the first connecting portion 401 and projects from the first connecting portion 401 in the axial direction Da. Furthermore, each of the second-yoke claws 382 has the second connecting portion 402 and the second projecting portion 412. The second connecting portion 402 is joined to the second-yoke ring 380. The second projecting portion 412 is joined to the second connecting portion 402 and projects from the second connecting portion 402 in the axial direction Da. Each of the first connecting portions 401 and the second connecting portions 402 serves as a connecting portion. Furthermore, each of the first projecting portions 411 and the second projecting portions 412 serves as a projecting portion.

The first projecting portion 411 has the symmetrical shape that is symmetrical in the axial direction Da with respect to the first center plane Si1. The first center plane Si1 serves as a plane that passes through the center of the projecting portion and is perpendicular to the axial direction Da.

Thereby, the magnetic flux distribution at the first projecting portion 411 produced by the magnetic field leaking from the magnet 30 is likely to become the symmetrical distribution which is symmetrical with respect to the first center plane Si1. This decreases the variations in the magnetic flux at the first projecting portion 411 and therearound. Therefore, the magnetic field, which leaks from the magnet 30, is less likely to pass through the corresponding one of the first magnetic detector 61 and the second magnetic detector 62 via the location where the relatively large magnetic flux is present. Thus, the magnetic field, which leaks from the magnet 30, is less likely to pass through the corresponding one of the first magnetic detector 61 and the second magnetic detector 62 through the first projecting portion 411 and therearound.

Furthermore, the second projecting portion 412 has the symmetrical shape that is symmetrical in the axial direction Da with respect to the second center plane Si2. The second center plane Si2 serves as a plane that passes through the center of the projecting portion and is perpendicular to the axial direction Da.

Thereby, the magnetic flux distribution at the second projecting portion 412 produced by the magnetic field leaking from the magnet 30 is likely to become the symmetrical distribution which is symmetrical with respect to the second center plane Si2. This decreases the variations in the magnetic flux at the second projecting portion 412 and therearound. Thus, like the above-discussed one, the magnetic field, which leaks from the magnet 30, is less likely to pass through the corresponding one of the first magnetic detector 61 and the second magnetic detector 62 through the second projecting portion 412 and therearound.

Figure 33:
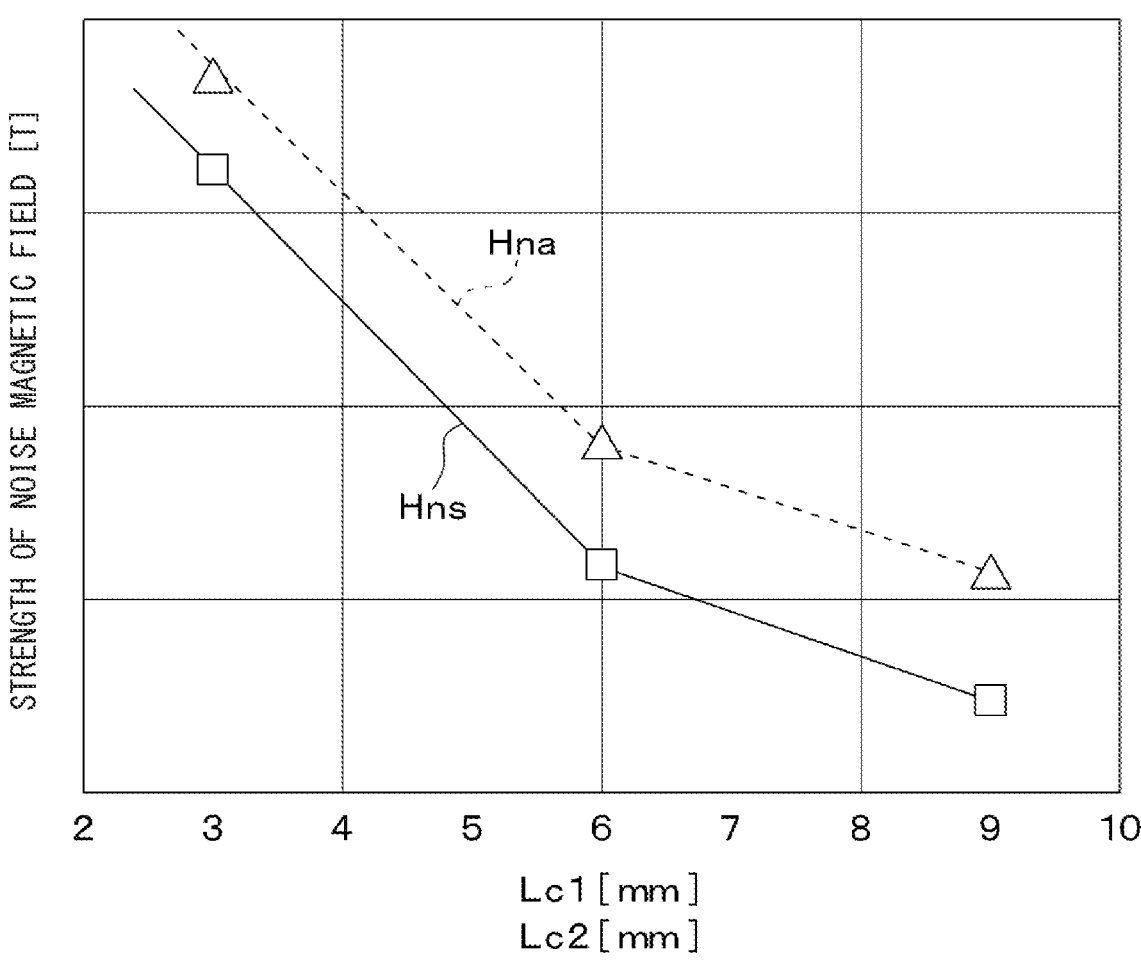
FIG. 33 is a diagram showing a relationship among a first length, a second length and a strength of a noise magnetic field.

Therefore, as shown in FIG. 33, the strength of the noise magnetic field, which is detected by each of the first magnetic detector 61 and the second magnetic detector 62 of the fourth embodiment, is reduced in comparison to the case where the first projecting portion 411 and the second projecting portion 412 are respectively shaped asymmetrical in the axial direction Da. As a result, the tolerance to the noise magnetic field leaking from the magnet 30 is improved. In FIG. 33, "Hns" indicates the strength of the noise magnetic field in the case where the first projecting portion 411 and the second projecting portion 412 are respectively shaped in the quadrangular prism form and are respectively symmetrical in the axial direction Da like in the fourth embodiment. Also, "Hna" indicates the strength of the noise magnetic field in the case where the first projecting portion 411 and the second projecting portion 412 are respectively shaped in the triangular prism form and are respectively asymmetrical in the axial direction Da. Furthermore, "Hns" and "Hna" are indicated for the respective distances at the time of changing the first length Lc1 and the second length Lc2 in the case where the yoke-to-yoke distance Lyb is set to 9 mm.

[3-2] The first projecting portion 411 is shaped in the prism form. Furthermore, the first projecting portion 411 has the first bottom surface 421 and the first peripheral surface 431. The first bottom surface 421 is perpendicular to the axial direction Da. The first peripheral surface 431 is joined to the first bottom surface 421 and extends from the first bottom surface 421 in the axial direction Da.

Therefore, the first projecting portion 411 has the symmetrical shape that is symmetrical in the axial direction Da with respect to the first center plane Si1. As a result, like in the above-described one, the tolerance to the noise magnetic field leaking from the magnet 30 is improved.

Furthermore, the second projecting portion 412 is shaped in the prism form. Furthermore, the second projecting portion 412 has the second bottom surface 422 and the second peripheral surface 432. The second bottom surface 422 is perpendicular to the axial direction Da. The second peripheral surface 432 is joined to the second bottom surface 422 and extends from the second bottom surface 422 in the axial direction Da.

Therefore, the second projecting portion 412 has the symmetrical shape that is symmetrical in the axial direction Da with respect to the second center plane Si2. As a result, like in the above-described one, the tolerance to the noise magnetic field leaking from the magnet 30 is improved.

Furthermore, each of the first length Lc1 and the second length Lc2 is set to be equal to or larger than 30% of the yoke-to-yoke distance Lyb.

Thus, in comparison to a case where each of the first length Lc1 and the second length Lc2 is smaller than 30% of the yoke-to-yoke distance Lyb, the first projecting portion 411 and the second projecting portion 412 can more easily block the magnetic field that leaks from the magnet 30. Therefore, it becomes more difficult for the magnetic field, which leaks from the magnet 30, to pass through the first magnetic detector 61 and the second magnetic detector 62. As a result, the tolerance to the noise magnetic field leaking from the magnet 30 is improved.

Fifth Embodiment

The fifth embodiment differs from the fourth embodiment with respect to the configurations of the first connecting portion 401, the first projecting portion 411, the second connecting portion 402 and the second projecting portion 412. The rest of the present embodiment is the same as that of the fourth embodiment.

Figure 34:
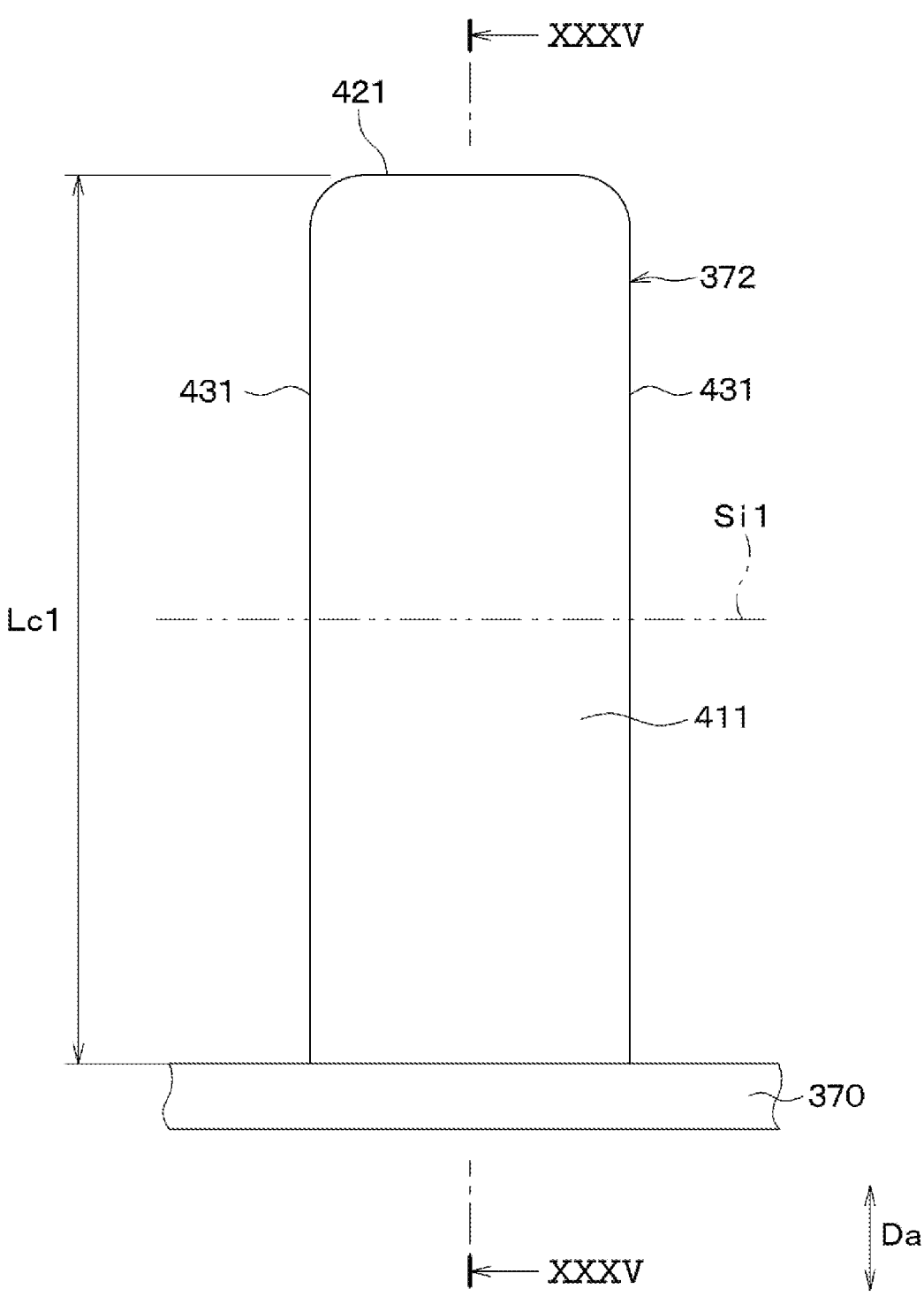
FIG. 34 is an enlarged view of the first yoke of the torque sensor of the torque detection system according to a fifth embodiment.

As shown in FIG. 34, among a plurality of boundary parts between the first bottom surface 421 and the first peripheral surface 431, each of two opposite boundary parts, which face in the circumferential direction, has a round shape. The present disclosure is not limited to that each of the two opposite boundary parts, which face in the circumferential direction, has the round shape among the boundary parts between the first bottom surface 421 and the first peripheral surface 431. Among the boundary parts between the first bottom surface 421 and the first peripheral surface 431, at least one boundary part may have the round shape. For example, among the boundary parts between the first bottom surface 421 and the first peripheral surface 431, one or both of other two boundary parts, which are adjacent to the two opposite boundary parts facing in the circumferential direction, may have the round shape.

Figure 35:
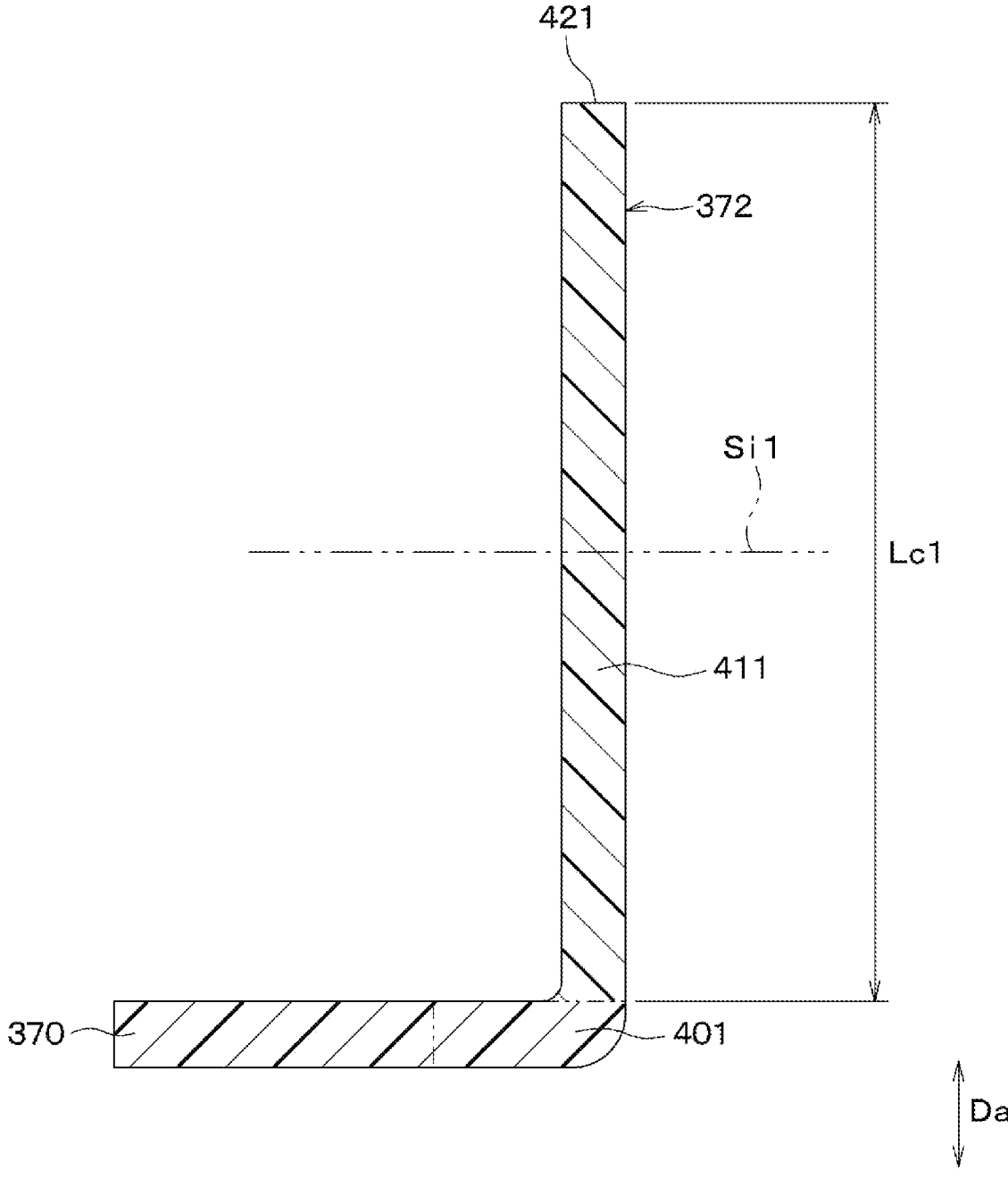
FIG. 35 is a cross-sectional view taken along line XXXV-XXXV in FIG. 34.

Furthermore, as shown in FIG. 35, a boundary part between the first connecting portion 401 and the first projecting portion 411 has a round shape. Also, a corner of the first connecting portion 401 has a round shape.

Figure 36:
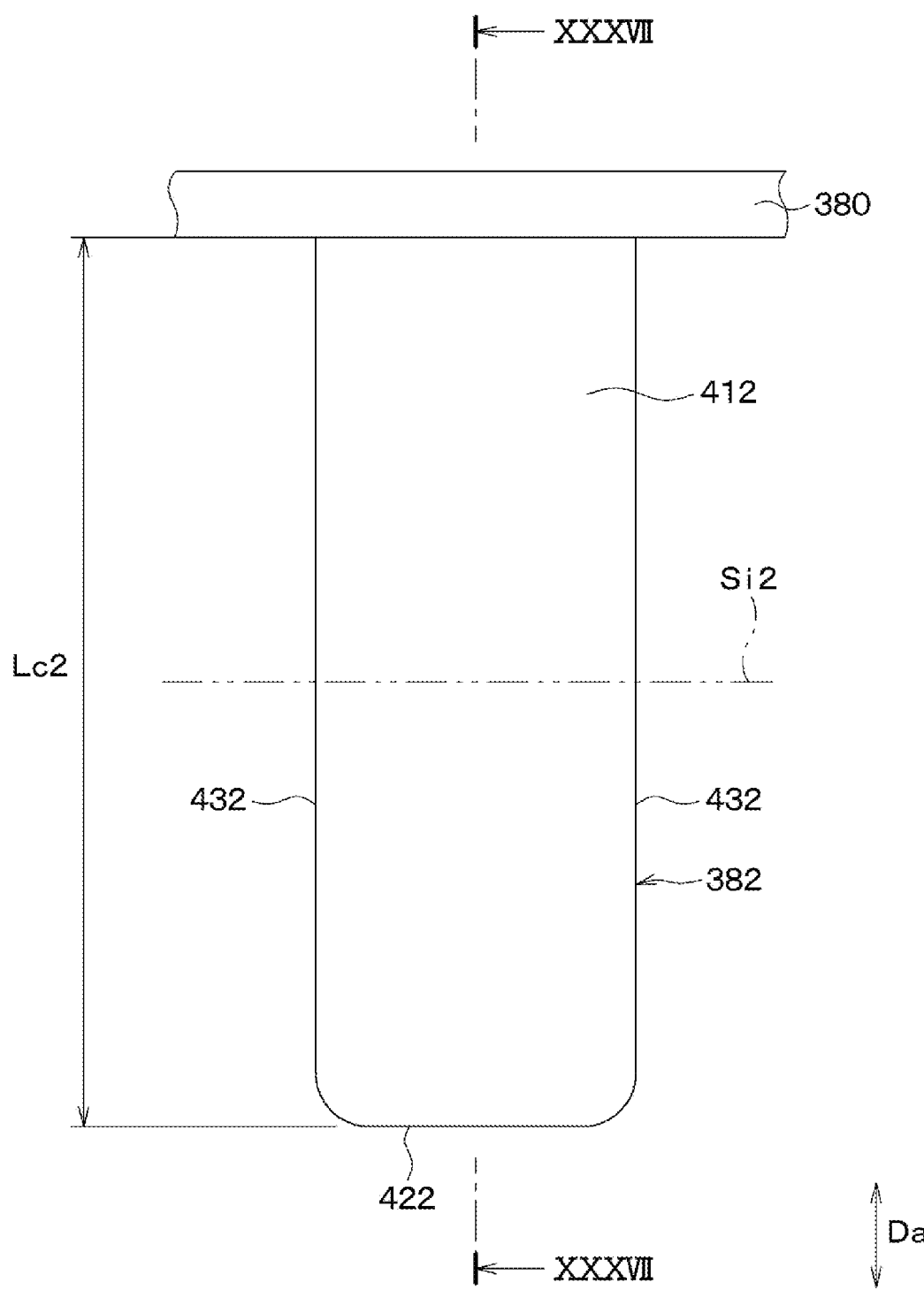
FIG. 36 is an enlarged view of the second yoke.

Furthermore, as shown in FIG. 36, among a plurality of boundary parts between the second bottom surface 422 and the second peripheral surface 432, each of two opposite boundary parts, which face in the circumferential direction, has a round shape. The present disclosure is not limited to that the two opposite boundary parts, which face in the circumferential direction, respectively have the round shape among the boundary parts between the second bottom surface 422 and the second peripheral surface 432. Among the boundary parts between the second bottom surface 422 and the second peripheral surface 432, at least one boundary part may have the round shape. For example, among the boundary parts between the second bottom surface 422 and the second peripheral surface 432, one or both of other two boundary parts, which are adjacent to the two opposite boundary parts facing in the circumferential direction, may have the round shape.

Figure 37:
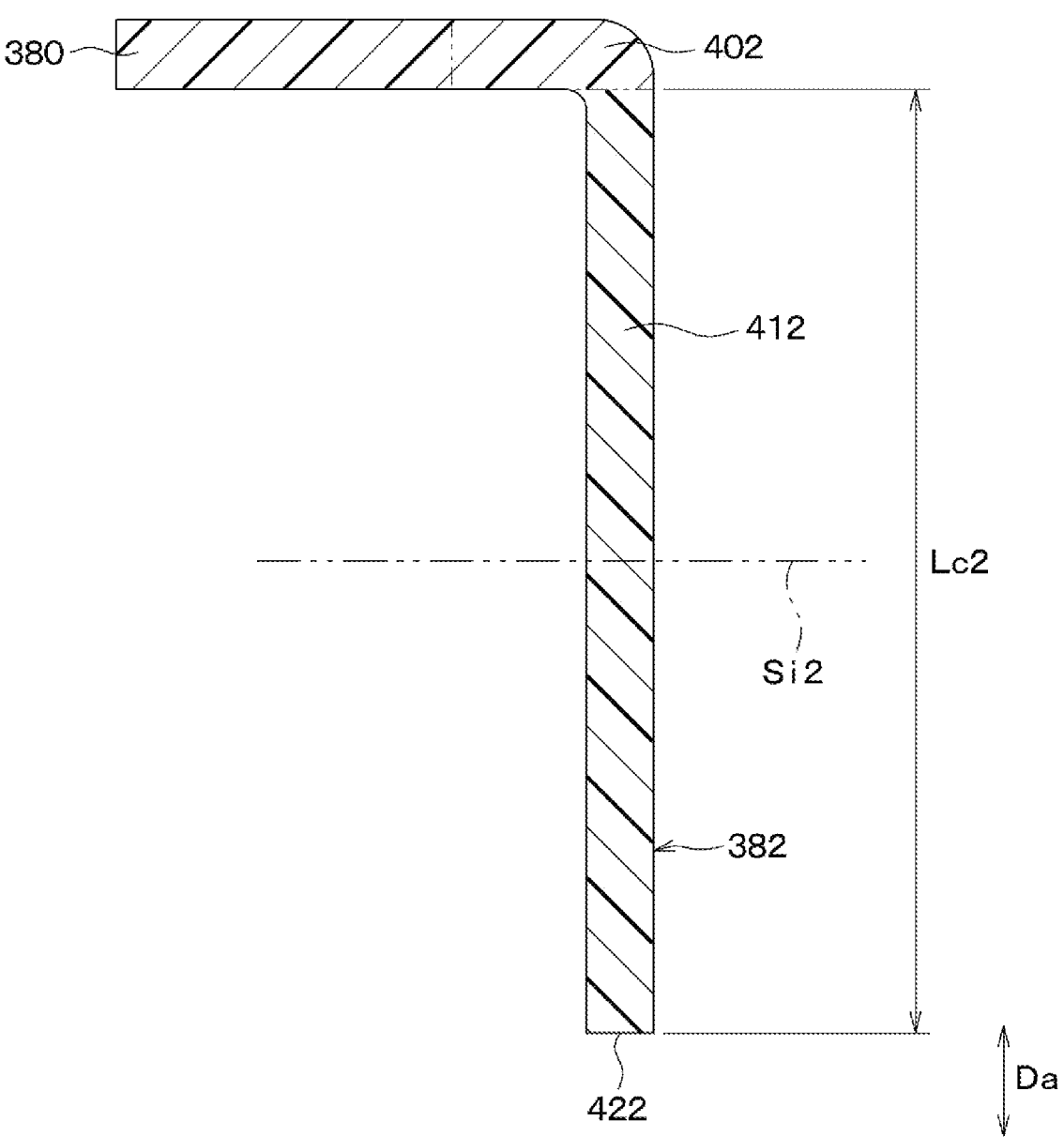
FIG. 37 is a cross-sectional view taken along line XXXVII-XXXVII in FIG. 36.

Furthermore, as shown in FIG. 37, a boundary part between the second connecting portion 402 and the second projecting portion 412 has a round shape. Also, a corner of the second connecting portion 402 has a round shape.

The torque sensor 25 of the fifth embodiment is configured in the above-described manner. Even in the fifth embodiment, the advantages, which are similar to those of the fourth embodiment, are achieved.

Sixth Embodiment

The sixth embodiment differs from the fourth embodiment with respect to the configurations of the first connecting portion 401, the first projecting portion 411, the second connecting portion 402 and the second projecting portion 412. The rest of the present embodiment is the same as that of the fourth embodiment.

Figure 38:
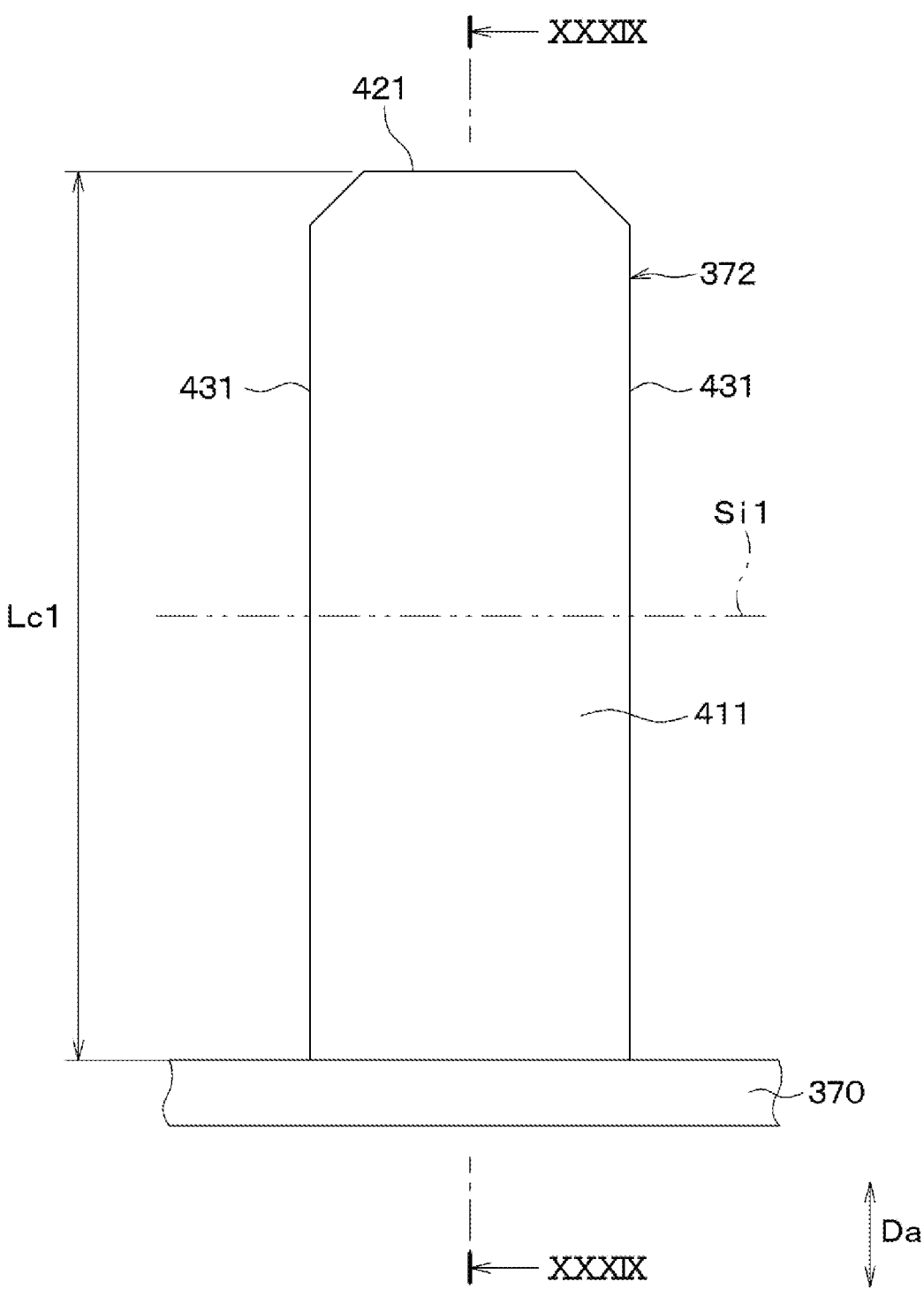
FIG. 38 is an enlarged view of the first yoke of the torque sensor of the torque detection system according to a sixth embodiment.

As shown in FIG. 38, among the boundary parts between the first bottom surface 421 and the first peripheral surface 431, each of the two opposite boundary parts, which face in the circumferential direction, has a chamfered shape, so that each of these two opposite boundary parts is formed as a tilted surface that is tilted relative to the first bottom surface 421 and the first peripheral surface 431. The present disclosure is not limited to that each of the two opposite boundary parts, which face in the circumferential direction, is formed as the tilted surface that is tilted relative to the first bottom surface 421 and the first peripheral surface 431. Among the boundary parts between the first bottom surface 421 and the first peripheral surface 431, at least one boundary part may be formed as the tilted surface that is tilted relative to the first bottom surface 421 and the first peripheral surface 431. For example, among the boundary parts between the first bottom surface 421 and the first peripheral surface 431, one or both of the other two boundary parts, which are adjacent to the two opposite boundary parts facing in the circumferential direction, may be formed as the tilted surface that is tilted relative to the first bottom surface 421 and the first peripheral surface 431.

Figure 39:
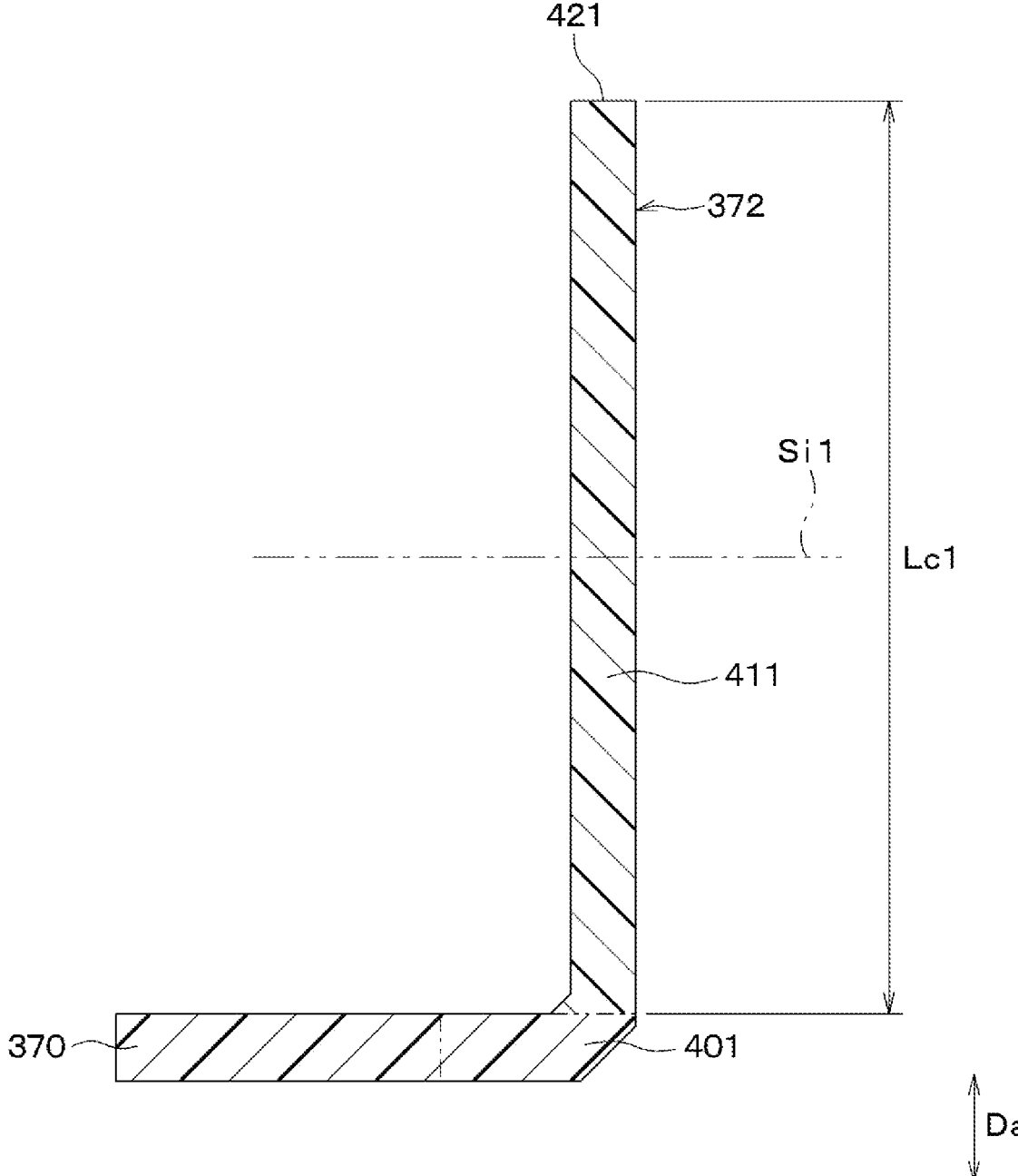
FIG. 39 is a cross-sectional view taken along line XXXIX-XXXIX in FIG. 34.

Furthermore, as shown in FIG. 39, the boundary part between the first connecting portion 401 and the first projecting portion 411 is formed as a tilted surface that is tilted relative to an extending direction of the first connecting portion 401 and an extending direction of the first projecting portion 411. Also, the corner of the first connecting portion 401 is formed as a tilted surface that is tilted relative to the extending direction of the first connecting portion 401.

Figure 40:
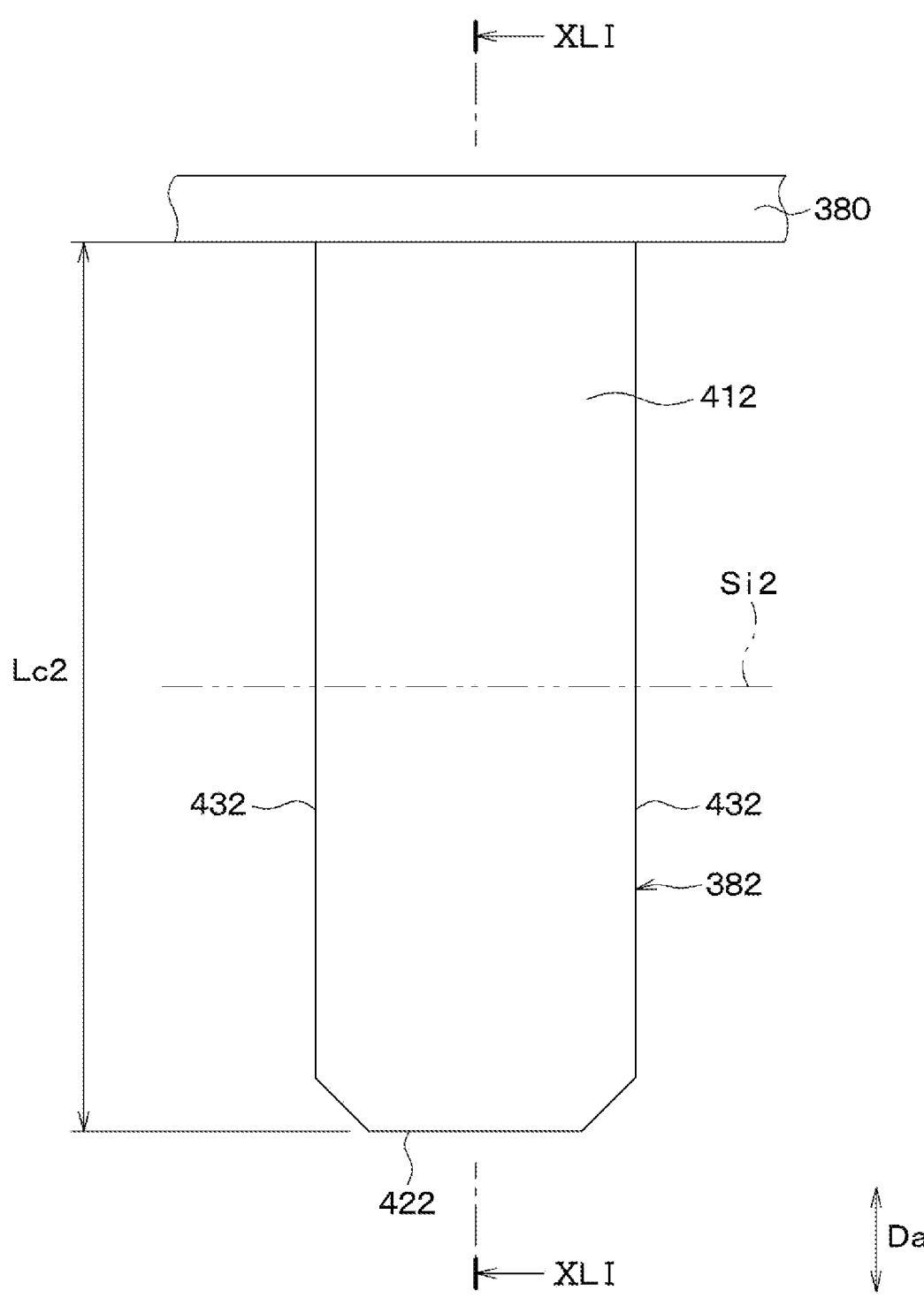
FIG. 40 is an enlarged view of the second yoke.

Furthermore, as shown in FIG. 40, among the boundary parts between the second bottom surface 422 and the second peripheral surface 432, each of the two opposite boundary parts, which face in the circumferential direction, has a chamfered shape, so that each of these two opposite boundary parts is formed as a tilted surface that is tilted relative to the second bottom surface 422 and the second peripheral surface 432. The present disclosure is not limited to that each of the two opposite boundary parts, which face in the circumferential direction, is formed as the tilted surface that is tilted relative to the second bottom surface 422 and the second peripheral surface 432. Among the boundary parts between the second bottom surface 422 and the second peripheral surface 432, at least one boundary part may be formed as the tilted surface that is tilted relative to the second bottom surface 422 and the second peripheral surface 432. For example, among the boundary parts between the second bottom surface 422 and the second peripheral surface 432, one or both of the other two boundary parts, which are adjacent to the two opposite boundary parts facing in the circumferential direction, may be formed as the tilted surface that is tilted relative to the second bottom surface 422 and the second peripheral surface 432.

Figure 41:
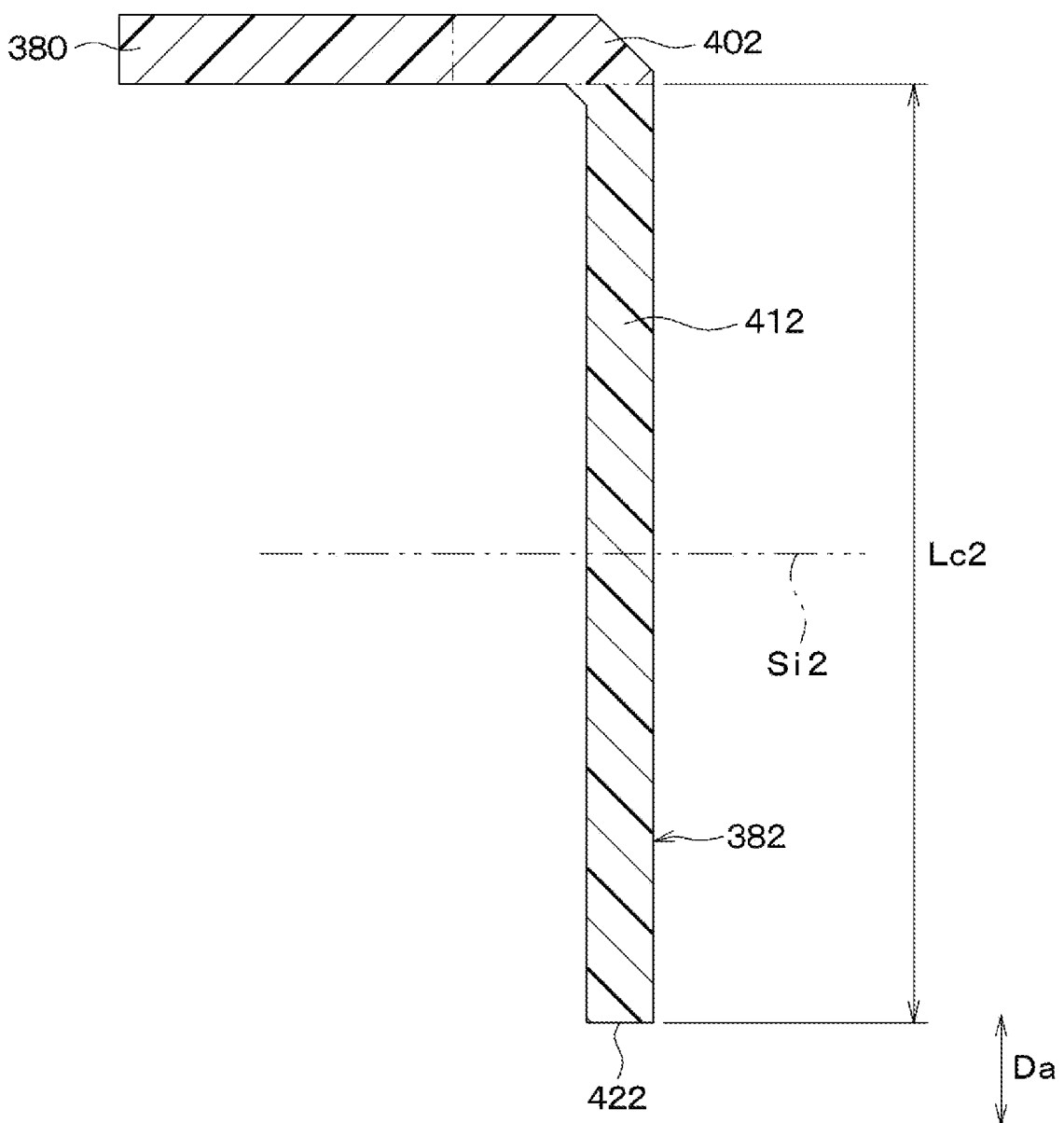
FIG. 41 is a cross-sectional view taken along line XLI-XLI in FIG. 40.

Furthermore, as shown in FIG. 41, the boundary part between the second connecting portion 402 and the second projecting portion 412 is formed as a tilted surface that is tilted relative to an extending direction of the second connecting portion 402 and an extending direction of the second projecting portion 412. Also, the corner of the second connecting portion 402 is formed as a tilted surface that is tilted relative to the extending direction of the second connecting portion 402.

The torque sensor 25 of the sixth embodiment is configured in the above-described manner. Even in the sixth embodiment, the advantages, which are similar to those of the fourth embodiment, are achieved.

Seventh Embodiment

In the seventh embodiment, the configuration of the magnet 30 is different from that of the first embodiment. The rest of the present embodiment is the same as that of the first embodiment.

Figure 42:
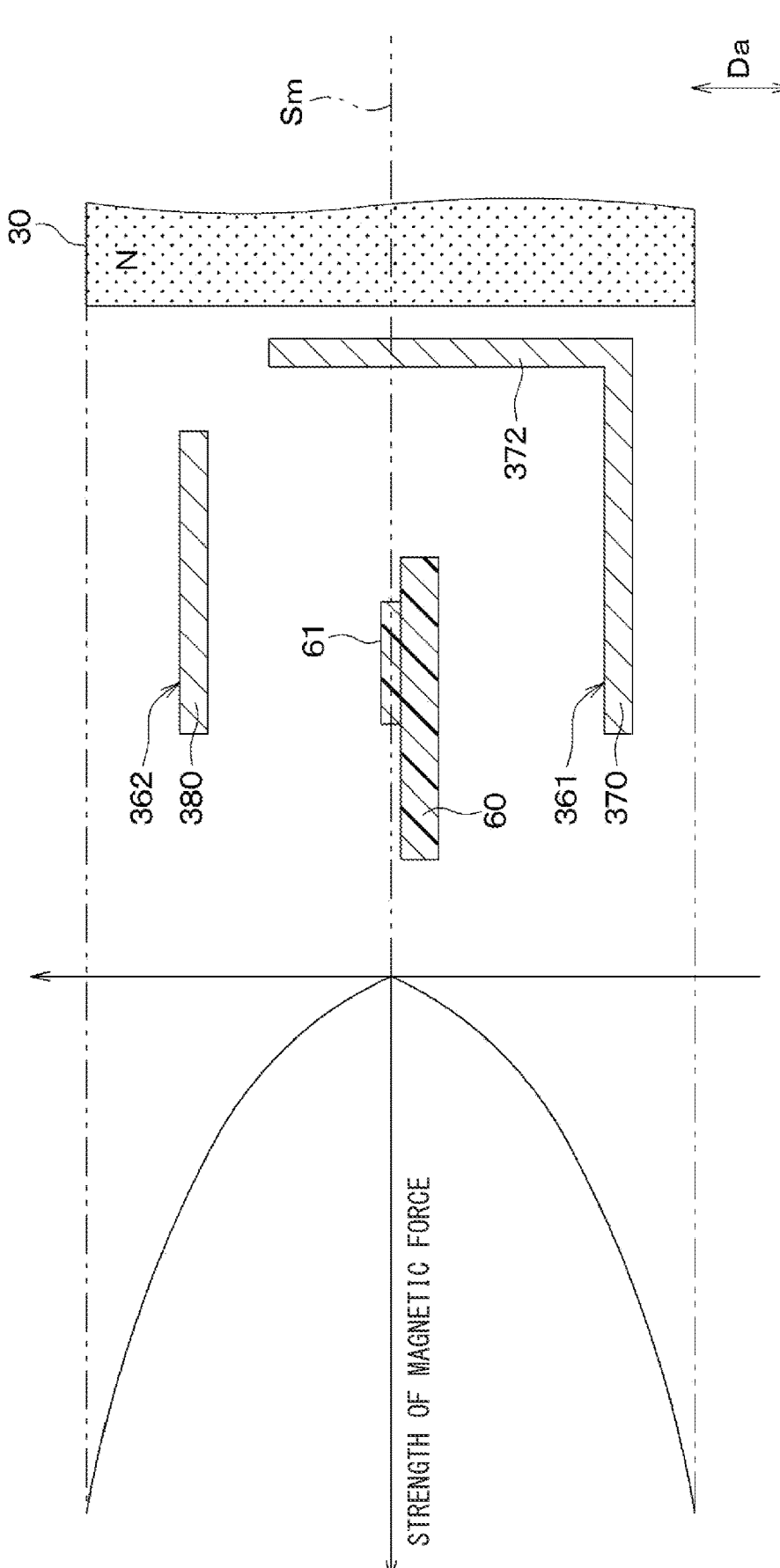
FIG. 42 is a cross-sectional view showing the magnet, the first yoke, the second yoke, a circuit board and the first magnetic detector of the torque sensor of the torque detection system according to a seventh embodiment.

Here, as shown in FIG. 42, a plane, which passes through a center of the magnet 30 centered in the axial direction Da and is perpendicular to the axial direction Da, is defined as a magnet center plane Sm. In FIG. 42, the indication of the rotor 35 is omitted to avoid complication.

Each of the first magnetic detector 61 and the second magnetic detector 62 intersects the magnet center plane Sm. Furthermore, each of the first-yoke claws 372 and the second-yoke claws 382 intersects the magnet center plane Sm.

The magnet 30 is formed such that a strength of the magnetic force of the magnet 30 increases from the magnet center plane Sm toward the outside of the magnet 30 in the axial direction Da. Thereby, the strength of the magnetic force of a portion of the magnet 30, which intersects the magnet center plane Sm, becomes smaller than the strength of the magnetic force of each of two opposite end portions of the magnet 30 which face in the axial direction Da. The strength of the magnetic force of the magnet 30 is measured by, for example, a Hall probe.

The torque sensor 25 of the seventh embodiment is configured in the above-described manner. Even in the seventh embodiment, the advantages, which are similar to those of the first embodiment, are achieved. Furthermore, in the seventh embodiment, the following advantage is achieved.

[4] Each of the first-yoke claws 372 and the second-yoke claws 382 intersects the magnet center plane Sm. Furthermore, the strength of the magnetic force of the magnet 30 increases from the magnet center plane Sm toward the outside of the magnet 30 in the axial direction Da.

Thereby, the strength of the magnetic force of the portion of the magnet 30, which is around the magnet center plane Sm, becomes smaller than the strength of the magnetic force of each of the two opposite end portions of the magnet 30 which face in the axial direction Da. This makes it difficult for the magnetic field leaking from the magnet 30 to pass through the first magnetic detector 61 and the second magnetic detector 62 via the first-yoke claw 372 and the second-yoke claw 382 which intersect the magnet center plane Sm. As a result, the tolerance to the noise magnetic field leaking from the magnet 30 is improved.

Eighth Embodiment

In the eighth embodiment, the configuration of the magnet 30 is different from that of the seventh embodiment. The rest of the present embodiment is the same as that of the seventh embodiment.

Figure 43:
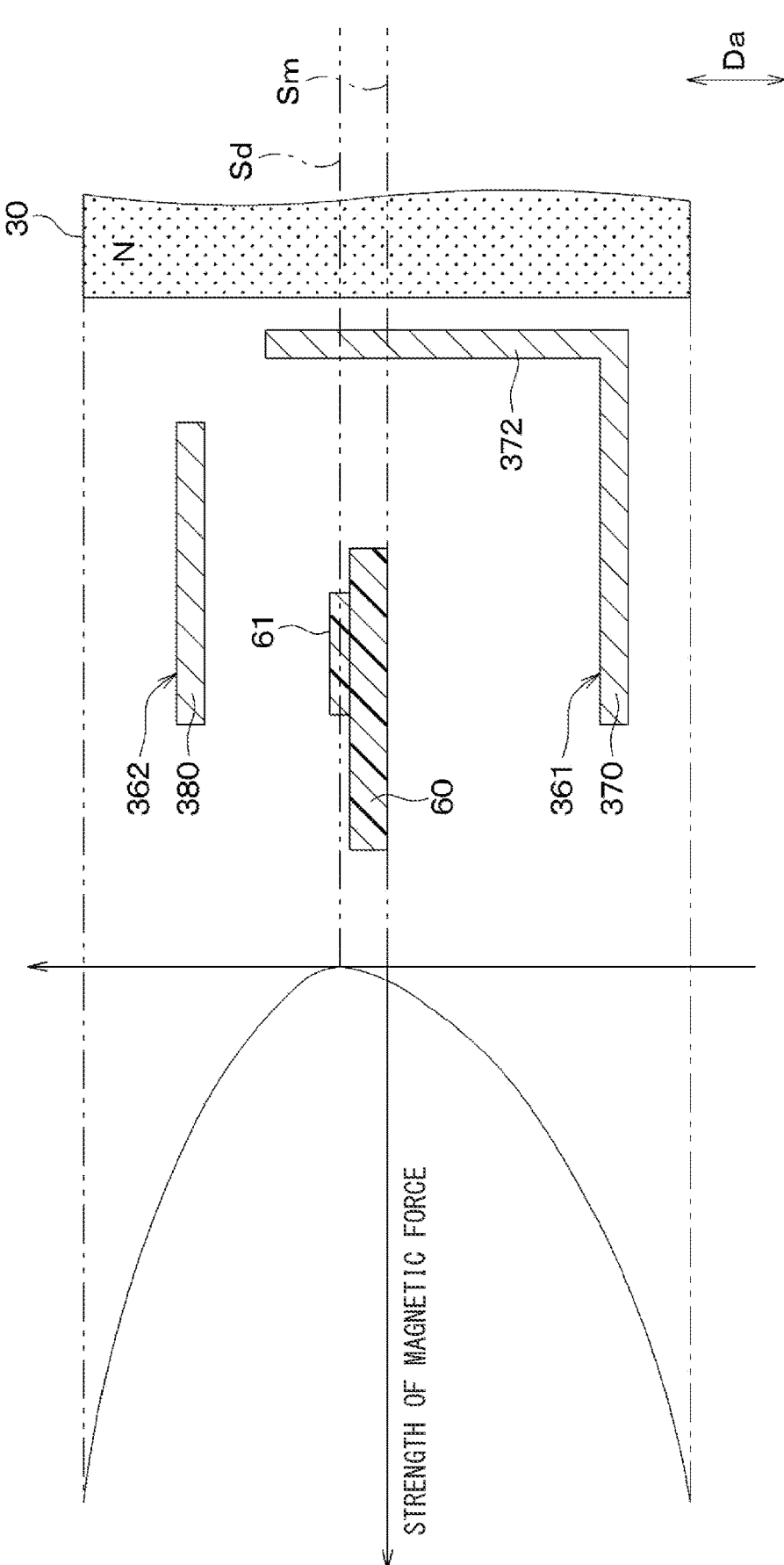
FIG. 43 is a cross-sectional view showing the magnet, the first yoke, the second yoke, the circuit board and the first magnetic detector of the torque sensor of the torque detection system according to an eighth embodiment.

Here, as shown in FIG. 43, a plane, which passes through the first magnetic detector 61 and is perpendicular to the axial direction Da, is defined as a pass-through plane Sd. The pass-through plane Sd may be a plane, which passes through the second magnetic detector 62 and is perpendicular to the axial direction Da. Furthermore, in FIG. 43, the indication of the rotor 35 is omitted to avoid complication.

The magnet 30 intersects the pass-through plane Sd. Furthermore, each of the first-yoke claws 372 and the second-yoke claws 382 intersects the pass-through plane Sd.

Furthermore, the magnet 30 is formed such that the strength of the magnetic force of the magnet 30 increases from the pass-through plane Sd toward the outside of the magnet 30 in the axial direction Da. Thereby, the strength of the magnetic force of a portion of the magnet 30, which intersects the pass-through plane Sd, becomes smaller than the strength of the magnetic force of each of the two opposite end portions of the magnet 30 which face in the axial direction Da.

The torque sensor 25 of the eighth embodiment is configured in the above-described manner. Even in the eighth embodiment, the advantages, which are similar to those of the seventh embodiment, are achieved.

Ninth Embodiment

In the ninth embodiment, the configuration of the magnet 30 is different from that of the seventh embodiment. The rest of the present embodiment is the same as that of the seventh embodiment.

Figure 44:
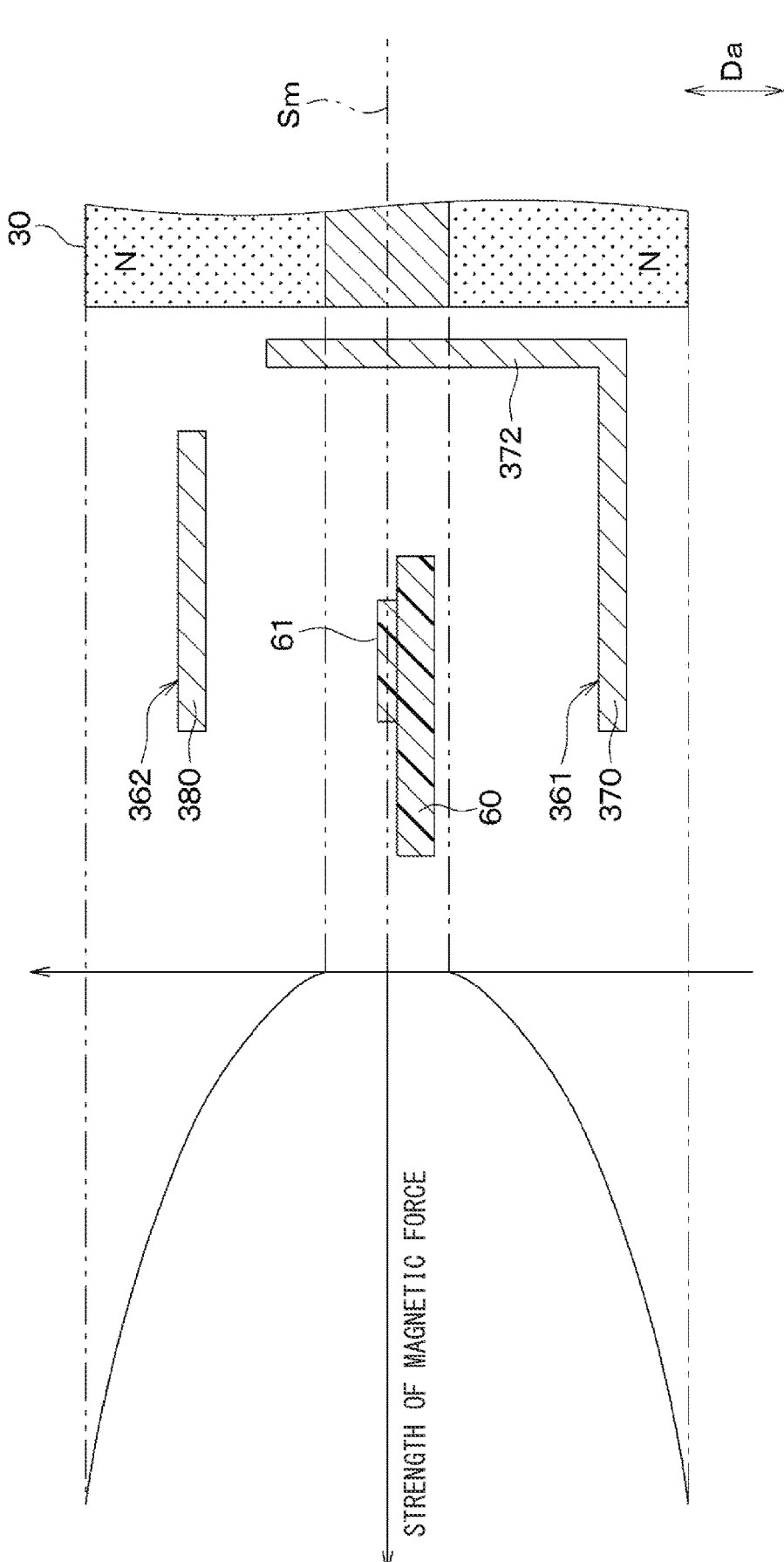
FIG. 44 is a cross-sectional view showing the magnet, the first yoke, the second yoke, the circuit board and the first magnetic detector of the torque sensor of the torque detection system according to a ninth embodiment.

As shown in FIG. 44, a predetermined extent of the magnet 30, which is from the portion of the magnet 30 intersecting the magnet center plane Sm to each of two opposite axial locations respectively outwardly spaced from this portion of the magnet 30 by a predetermined distance in the axial direction Da, is unmagnetized. Thereby, the strength of the magnetic force of the portion of the magnet 30, which intersects the magnet center plane Sm, becomes smaller than the strength of the magnetic force of each of the two opposite end portions of the magnet 30 which face in the axial direction Da. The predetermined distance discussed above is set based on, for example, a positional relationship among the magnet 30, the first-yoke claws 372, the second-yoke claws 382, the first magnetic detector 61 and the second magnetic detector 62 and the sizes of these components. Furthermore, in FIG. 44, the indication of the rotor 35 is omitted to avoid complication.

The torque sensor 25 of the ninth embodiment is configured in the above-described manner. Even in the ninth embodiment, the advantages, which are similar to those of the seventh embodiment, are achieved.

Tenth Embodiment

In the tenth embodiment, the configuration of the magnet 30 is different from that of the eighth embodiment. The rest of the present embodiment is the same as that of the eighth embodiment.

Figure 45:
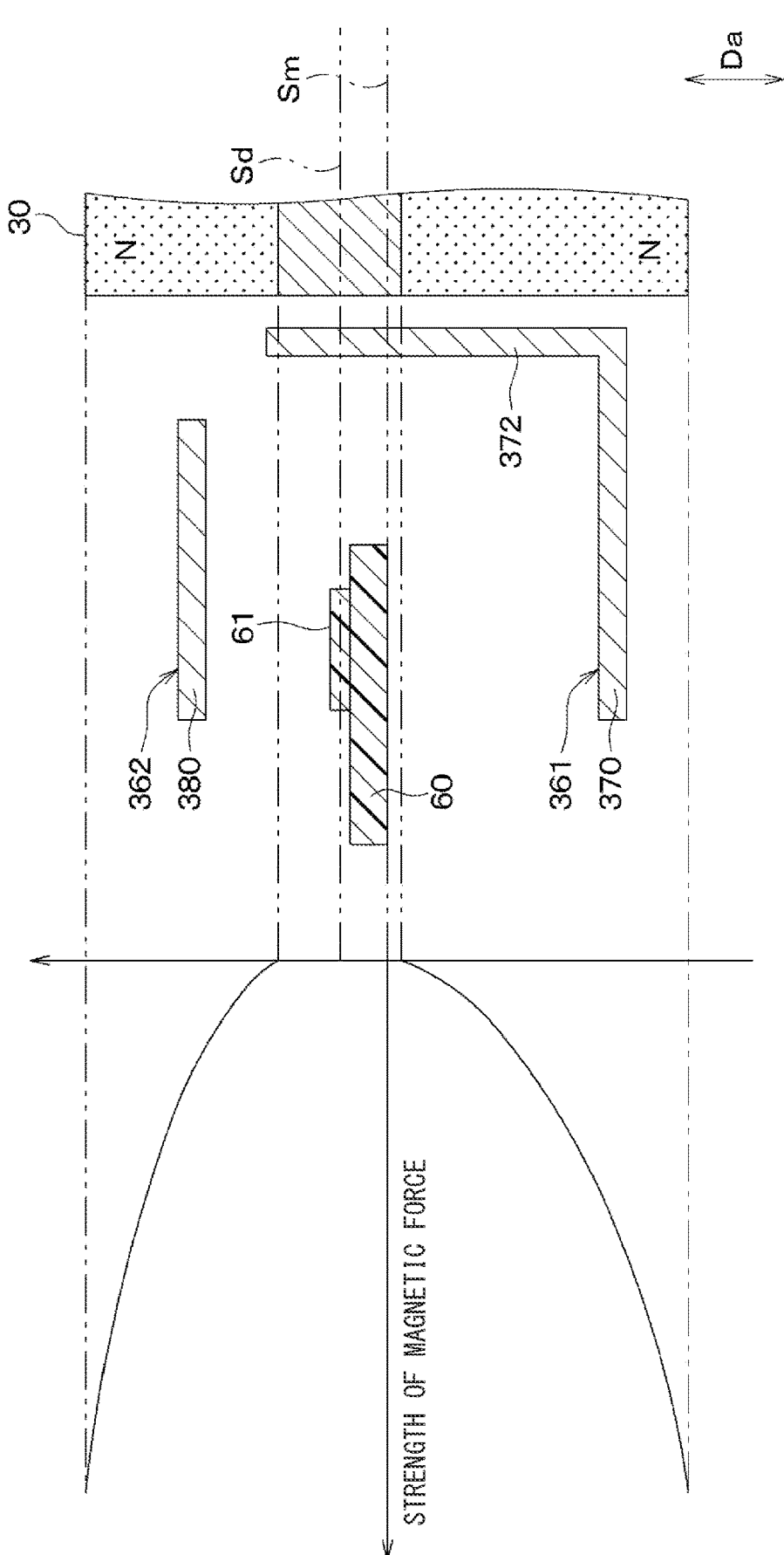
FIG. 45 is a cross-sectional view showing the magnet, the first yoke, the second yoke, the circuit board and the first magnetic detector of the torque sensor of the torque detection system according to a tenth embodiment.

As shown in FIG. 45, a predetermined extent of the magnet 30, which is from the portion of the magnet 30 intersecting the pass-through plane Sd to each of two opposite axial locations respectively outwardly spaced from this portion of the magnet 30 by a predetermined distance in the axial direction Da, is unmagnetized. Thereby, the strength of the magnetic force of the portion of the magnet 30, which intersects the pass-through plane Sd, becomes smaller than the strength of the magnetic force of each of the two opposite end portions of the magnet 30 which face in the axial direction Da. In FIG. 45, the indication of the rotor 35 is omitted to avoid complication.

The torque sensor 25 of the tenth embodiment is configured in the above-described manner. Even in the tenth embodiment, the advantages, which are similar to those of the eighth embodiment, are achieved.

Eleventh Embodiment

The eleventh embodiment differs from the first embodiment with respect to the arrangements of the first magnetic detector 61 and the second magnetic detector 62. The rest of the present embodiment is the same as that of the first embodiment.

Figure 46:
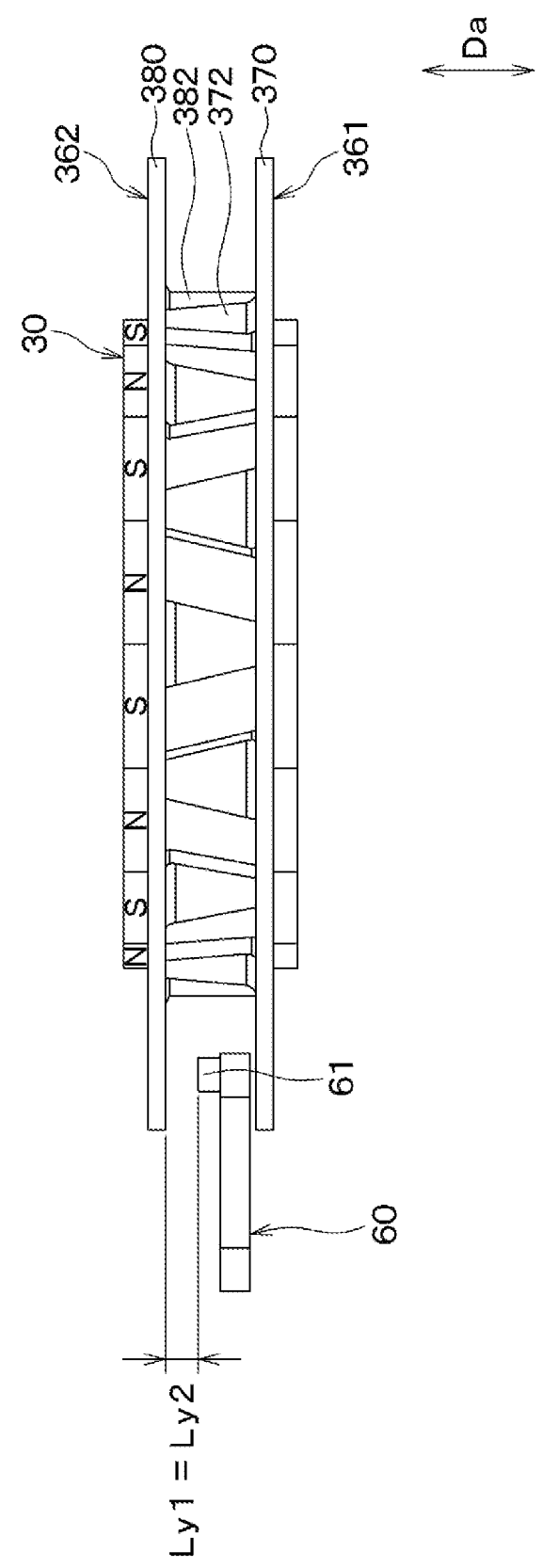
FIG. 46 is a diagram showing a positional relationship among the magnet, the first yoke, the second yoke, the circuit board and the first magnetic detector of the torque sensor of the torque detection system according to an eleventh embodiment.

As shown in FIG. 46, a radially outer end of the first magnetic detector 61 is placed on a radially inner side of a radially outer end of the first-yoke ring 370. Furthermore, a radially inner end of the first magnetic detector 61 is placed on a radially outer side of a radially inner end of the first-yoke ring 370. Therefore, the first magnetic detector 61 is radially placed between the radially outer end of the first-yoke ring 370 and the radially inner end of the first-yoke ring 370. Furthermore, the radially outer end of the first magnetic detector 61 is placed on a radially inner side of a radially outer end of the second-yoke ring 380. Furthermore, the radially inner end of the first magnetic detector 61 is placed on a radially outer side of a radially inner end of the second-yoke ring 380. Therefore, the first magnetic detector 61 is radially placed between the radially outer end and the radially inner end of the second-yoke ring 380. Here, the radially outer end of the first magnetic detector 61 corresponds to an end of the first magnetic detector 61 which is opposite to the magnet 30. Furthermore, the radially inner end of the first magnetic detector 61 corresponds to an end of the first magnetic detector 61 which faces the magnet 30. Also, the radially outer end of the first-yoke ring 370 corresponds to an end of the first-yoke ring 370 which is opposite to the magnet 30. Furthermore, the radially inner end of the first-yoke ring 370 corresponds to an end of the first-yoke ring 370 which faces the magnet 30. Also, the radially outer end of the second-yoke ring 380 corresponds to an end of the second-yoke ring 380 which is opposite to the magnet 30. Furthermore, the radially inner end of the second-yoke ring 380 corresponds to an end of the second-yoke ring 380 which faces the magnet 30.

Like the first magnetic detector 61, a radially outer end of the second magnetic detector 62 is placed on the radially inner side of the radially outer end of the first-yoke ring 370. Furthermore, a radially inner end of the second magnetic detector 62 is placed on the radially outer side of the radially inner end of the first-yoke ring 370. Therefore, the second magnetic detector 62 is radially placed between the radially outer end of the first-yoke ring 370 and the radially inner end of the first-yoke ring 370. Furthermore, the radially outer end of the second magnetic detector 62 is placed on the radially inner side of the radially outer end of the second-yoke ring 380. Furthermore, the radially inner end of the second magnetic detector 62 is placed on the radially outer side of the radially inner end of the second-yoke ring 380. Therefore, the second magnetic detector 62 is radially placed between the radially outer end of the second-yoke ring 380 and the radially inner end of the second-yoke ring 380. Here, the radially outer end of the second magnetic detector 62 corresponds to an end of the second magnetic detector 62 which is opposite to the magnet 30. Furthermore, the radially inner end of the second magnetic detector 62 corresponds to an end of the second magnetic detector 62 which faces the magnet 30.

The torque sensor 25 of the eleventh embodiment is configured in the above-described manner. Even in the eleventh embodiment, the advantages, which are similar to those of the first embodiment, are achieved.

Twelfth Embodiment

The twelfth embodiment differs from the second embodiment with respect to the arrangements of the first magnetic detector 61 and the second magnetic detector 62. The rest of the present embodiment is the same as that of the second embodiment.

Figure 47:
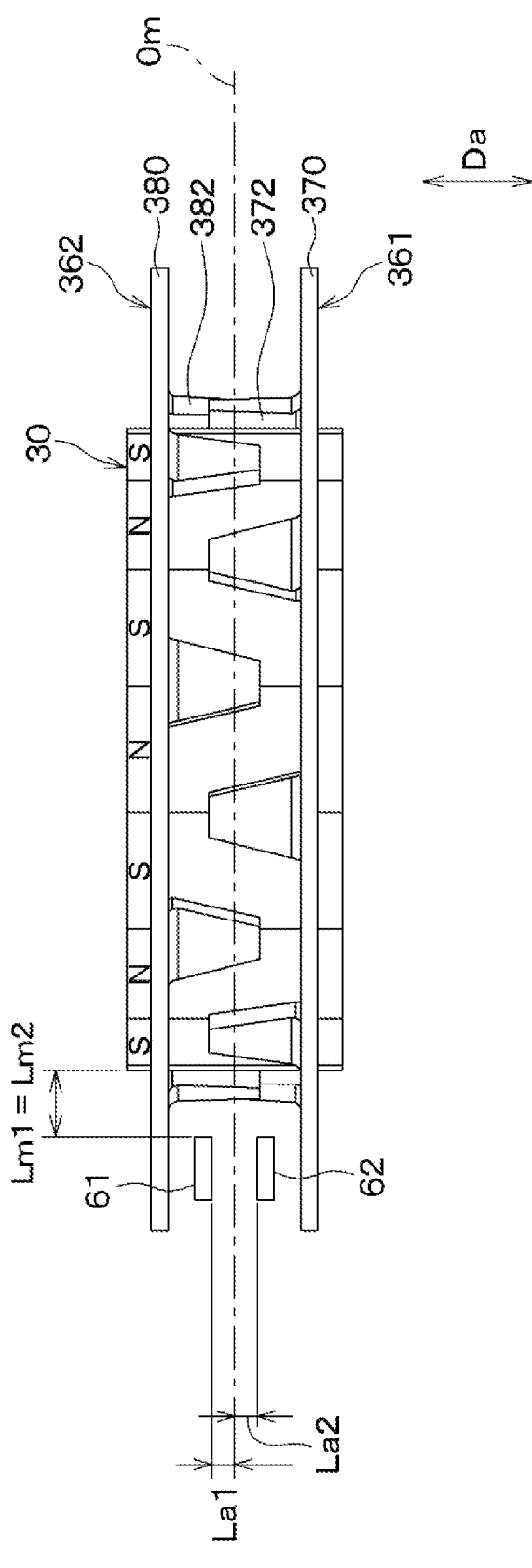
FIG. 47 is a diagram showing a positional relationship among the magnet, the first yoke, the second yoke, the circuit board, the first magnetic detector and the second magnetic detector of the torque sensor of the torque detection system according to a twelfth embodiment.

As shown in FIG. 47, the radially outer end of the first magnetic detector 61 is placed on the radially inner side of the radially outer end of the first-yoke ring 370. Furthermore, the radially inner end of the first magnetic detector 61 is placed on the radially outer side of the radially inner end of the first-yoke ring 370. Therefore, the first magnetic detector 61 is radially placed between the radially outer end of the first-yoke ring 370 and the radially inner end of the first-yoke ring 370. Furthermore, the radially outer end of the first magnetic detector 61 is placed on the radially inner side of the radially outer end of the second-yoke ring 380. Furthermore, the radially inner end of the first magnetic detector 61 is placed on the radially outer side of the radially inner end of the second-yoke ring 380. Therefore, the first magnetic detector 61 is radially placed between the radially outer end and the radially inner end of the second-yoke ring 380.

Furthermore, the radially outer end of the second magnetic detector 62 is placed on the radially inner side of the radially outer end of the first-yoke ring 370. Also, the radially inner end of the second magnetic detector 62 is placed on the radially outer side of the radially inner end of the first-yoke ring 370. Therefore, the second magnetic detector 62 is radially placed between the radially outer end of the first-yoke ring 370 and the radially inner end of the first-yoke ring 370. Furthermore, the radially outer end of the second magnetic detector 62 is placed on the radially inner side of the radially outer end of the second-yoke ring 380. Also, the radially inner end of the second magnetic detector 62 is placed on the radially outer side of the radially inner end of the second-yoke ring 380. Therefore, the second magnetic detector 62 is radially placed between the radially outer end of the second-yoke ring 380 and the radially inner end of the second-yoke ring 380.

The torque sensor 25 of the twelfth embodiment is configured in the above-described manner. Even in the twelfth embodiment, the advantages, which are similar to those of the second embodiment, are achieved.

Thirteenth Embodiment

The thirteenth embodiment differs from the third embodiment with respect to the arrangements of the first magnetic detector 61 and the second magnetic detector 62. The rest of the present embodiment is the same as that of the third embodiment.

Figure 48:
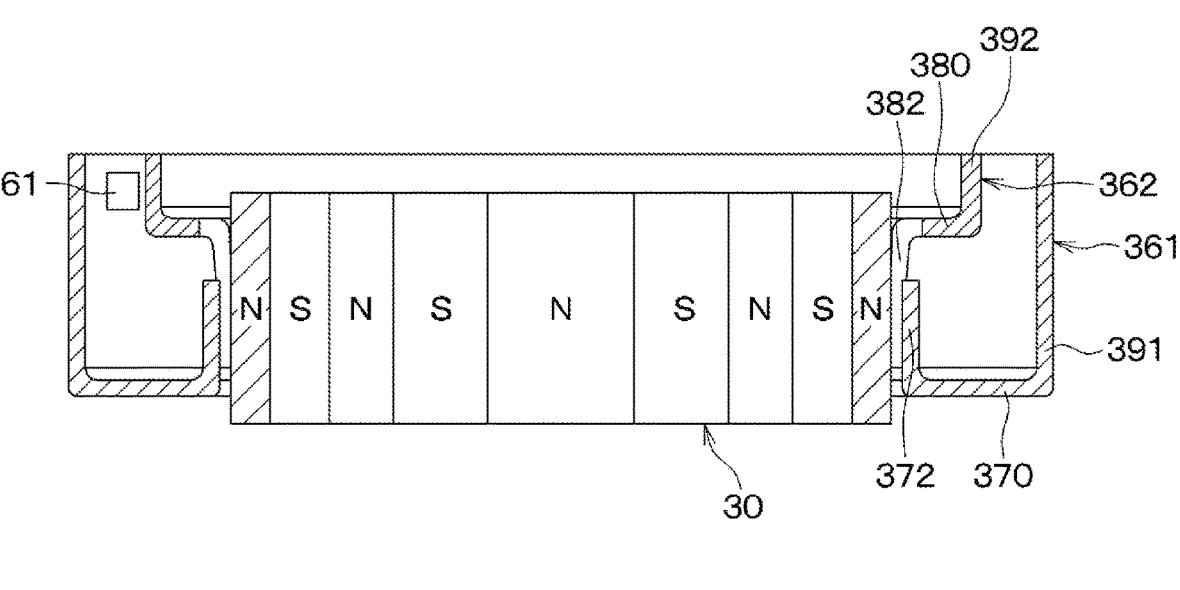
FIG. 48 is a diagram showing a positional relationship among the magnet, the first yoke, the second yoke, the circuit board and the first magnetic detector of the torque sensor of the torque detection system according to a thirteenth embodiment.

As shown in FIG. 48, an outer periphery of the first magnetic detector 61 is placed in the axial direction Da between: an axially outer end of the first-yoke flange 391, which faces in the axial direction Da; and a boundary part between the second-yoke ring 380 and the second-yoke flange 392. Furthermore, the outer periphery of the first magnetic detector 61 is placed in the axial direction Da between: an axially outer end of the second-yoke flange 392, which faces in the axial direction Da; and the boundary part between second-yoke ring 380 and the second-yoke flange 392.

Furthermore, like the first magnetic detector 61, an outer periphery of the second magnetic detector 62 is placed in the axial direction Da between: the axially outer end of the first-yoke flange 391, which faces in the axial direction Da; and the boundary part between the second-yoke ring 380 and the second-yoke flange 392. Also, the outer periphery of the second magnetic detector 62 is placed in the axial direction Da between: the axially outer end of the second-yoke flange 392, which faces in the axial direction Da; and the boundary part between second-yoke ring 380 and the second-yoke flange 392.

The torque sensor 25 of the thirteenth embodiment is configured in the above-described manner. Even in the thirteenth embodiment, the advantages, which are similar to those of the third embodiment, are achieved.

Other Embodiments

The present disclosure is not limited to the embodiments described above, and the embodiments described above may be appropriately modified. Needless to say, in each of the embodiments described above, the elements of the embodiment are not necessarily essential except when it is clearly indicated that they are essential and when they are clearly considered to be essential in principle.

The calculation processor and its method of the present disclosure may be realized by a dedicated computer that is provided by configuring at least one processor and a memory programmed to perform one or more functions embodied by a computer program. Alternatively, the calculation processor and its method of the present disclosure may be realized by a dedicated computer that is provided by configuring at least one processor with one or more dedicated hardware logic circuits. Further alternatively, the calculation processor and its method of the present disclosure may be realized by one or more dedicated computers that are provided by configuring a combination of: a processor programmed to perform one or more functions and a memory; and a processor composed of one or more hardware logic circuits. Further, the computer program may also be stored in a computer-readable, non-transitory, tangible storage medium as instructions to be executed by a computer.

In the respective embodiments described above, the magnet 30 is shaped in the circular ring form. However, the shape of the magnet 30 is not limited to the circular ring form. For example, the magnet 30 may be shaped in a polygonal ring form.

In the respective embodiments described above, the rotor 35 is shaped in the cylindrical tubular form. However, the shape of the rotor 35 is not limited to the cylindrical tubular form. For example, the rotor 35 may be shaped in a polygonal tubular form or an elliptical tubular form.

In the respective embodiments described above, the first-yoke ring 370 and the second-yoke ring 380 are each shaped in the circular ring form. However, the shape of each of the first-yoke ring 370 and the second-yoke ring 380 is not limited to the circular ring form. For example, each of the first-yoke ring 370 and the second-yoke ring 380 may be shaped in a polygonal ring form.

In the embodiments described above, each of the first-yoke claws 372 and the second-yoke claws 382 is shaped in the tapered form. However, the shape of each of the first-yoke claws 372 and the second-yoke claws 382 is not limited to the tapered form. For example, each of the first-yoke claws 372 and the second-yoke claws 382 may be shaped in an oblong rectangular shape.

In the respective embodiments described above, the fixation collar 354 is coupled to the second steering shaft 12, and the magnet 30 is coupled to the first steering shaft 11. However, the present disclosure is not limited to the above configuration, i.e., the fixation collar 354 is coupled to the second steering shaft 12, and the magnet 30 is coupled to the first steering shaft 11. For example, the fixation collar 354 may be coupled to the first steering shaft 11, and the magnet 30 may be coupled to the second steering shaft 12.

In the respective embodiments described above, the motor control device 18 calculates the steering torque based on the signals outputted from the first magnetic detector 61 and the second magnetic detector 62. However, the motor control device 18 is not limited to calculate the steering torque based on the signals outputted from the first magnetic detector 61 and the second magnetic detector 62. A calculation processor, which is different from the motor control device 18, may calculate the steering torque based on the signals outputted from the first magnetic detector 61 and the second magnetic detector 62.

The embodiments described above may be combined as appropriate.

Characteristics of Present Disclosure

First Aspect

A torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:
a ring which is shaped in a ring form and is config-
ured to be rotated together with the rotor; and
a plurality of claws which project from the ring in the
axial direction and are thereby opposed to the
magnet in a direction that is perpendicular to the
axial direction, wherein the plurality of claws are
configured to be rotated together with the ring and
thereby collect the magnetic field generated by the
magnet;
a first magnetic detector that overlaps with the ring
when the ring is projected onto the first magnetic
detector in the axial direction, wherein the first
magnetic detector is configured to detect a strength
of the magnetic field which corresponds to the torque
and changes in response to a change in a relative
angle of the at least one yoke relative to the magnet
in a rotational direction of the magnet; and
a second magnetic detector that overlaps with the ring
when the ring is projected onto the second magnetic
detector in the axial direction, wherein the second
magnetic detector is configured to detect the strength
of the magnetic field which corresponds to the torque
and changes in response to the change in the relative
angle of the at least one yoke relative to the magnet
in the rotational direction of the magnet; and
a calculation processor that is configured to calculate the
torque based on a signal from the first magnetic detec-
tor and a signal from the second magnetic detector,
wherein:
in a state where the torque is not generated, the first
magnetic detector overlaps with one of a plurality of
magnetic poles of the magnet when the one of the
plurality of magnetic poles is projected onto the first
magnetic detector in a corresponding orthogonal direc-
tion that is perpendicular to the axial direction and is
directed to the one of the plurality of magnetic poles;
in the state where the torque is not generated, the second
magnetic detector overlaps with another one of the
plurality of magnetic poles, which has a polarity that is
different from a polarity of the one of the plurality of
magnetic poles, when the another one of the plurality of
magnetic poles is projected onto the second magnetic
detector in a corresponding orthogonal direction that is
perpendicular to the axial direction and is directed to
the another one of the plurality of magnetic poles; and
the calculation processor is configured to calculate a sum
of a value, which relates to a detected strength of the
magnetic field detected by the first magnetic detector,
and a value, which relates to a detected strength of the
magnetic field detected by the second magnetic detec-
tor, and the calculation processor is configured to
calculate the torque based on the sum.

Second Aspect

The torque detection system according to the first aspect,
wherein the first magnetic detector and the second magnetic
detector are arranged on a common circle that is centered on
the axis of the magnet.

Third Aspect

The torque detection system according to the first or
second aspect, wherein:
the magnet is magnetized such that the plurality of
magnetic poles are arranged in the rotational direction of the magnet such that the polarities of the plurality of
magnetic poles are alternately reversed in the rotational
direction of the magnet; and
an angle in the rotational direction of the magnet between
one line, which connects between the axis of the
magnet and the first magnetic detector, and another
line, which connects between the axis of the magnet
and the second magnetic detector, is set to be an angle
that is expressed by $360°\div n\times a$, where n denotes a
number of the plurality of magnetic poles of the mag-
net, and a denotes an odd number.

Fourth Aspect

The torque detection system according to the first or
second aspect, wherein:
the magnet is magnetized such that the plurality of
magnetic poles are arranged in the rotational direction
of the magnet such that the polarities of the plurality of
magnetic poles are alternately reversed in the rotational
direction of the magnet; and
a number of the plurality of magnetic poles is the same as
a number of the plurality of claws of the at least one
yoke.

Fifth Aspect

A torque detection system configured to detect a torque
generated at a detection subject, comprising:
a torque sensor that includes:
a magnet that is configured to generate a magnetic field
and is configured to be rotated together with the
detection subject about an axis of the magnet which
extends in an axial direction of the magnet;
a rotor that is shaped in a ring form and is configured
to be rotated together with the detection subject;
at least one yoke that includes:
a ring which is shaped in a ring form and is config-
ured to be rotated together with the rotor; and
a plurality of claws which project from the ring in the
axial direction and are thereby opposed to the
magnet in a direction that is perpendicular to the
axial direction, wherein the plurality of claws are
configured to be rotated together with the ring and
thereby collect the magnetic field generated by the
magnet;
a first magnetic detector that overlaps with the ring
when the ring is projected onto the first magnetic
detector in the axial direction, wherein the first
magnetic detector is configured to detect a strength
of the magnetic field which corresponds to the torque
and changes in response to a change in a relative
angle of the at least one yoke relative to the magnet
in a rotational direction of the magnet; and
a second magnetic detector that overlaps with the ring
when the ring is projected onto the second magnetic
detector in the axial direction, wherein the second
magnetic detector is configured to detect the strength
of the magnetic field which corresponds to the torque
and changes in response to the change in the relative
angle of the at least one yoke relative to the magnet
in the rotational direction of the magnet; and
a calculation processor that is configured to calculate the
torque based on a signal from the first magnetic detec-
tor and a signal from the second magnetic detector,
wherein:

in a state where the torque is not generated, the first magnetic detector overlaps with one of a plurality of magnetic poles of the magnet when the one of the plurality of magnetic poles is projected onto the first magnetic detector in an orthogonal direction that is perpendicular to the axial direction and is directed to the one of the plurality of magnetic poles, and the first magnetic detector is placed in the axial direction on one side of a center line, which passes through a center of the one of the plurality of magnetic poles and extends in the orthogonal direction that is perpendicular to the axial direction;

in the state where the torque is not generated, the second magnetic detector overlaps with the one of the plurality of magnetic poles when the one of the plurality of magnetic poles is projected onto the second magnetic detector in the orthogonal direction that is perpendicular to the axial direction, and the second magnetic detector is placed in the axial direction on another side of the center line which is opposite to the one side; and the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum.

Sixth Aspect

A torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:

a ring which is shaped in a ring form and is configured to be rotated together with the rotor;

a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet; and a flange which projects from the ring in the axial direction;

a first magnetic detector that overlaps with the flange when the flange is projected onto the first magnetic detector in the direction perpendicular to the axial direction, wherein the first magnetic detector is configured to detect a strength of the magnetic field which corresponds to the torque and changes in response to a change in a relative angle of the at least one yoke relative to the magnet in a rotational direction of the magnet; and a second magnetic detector that overlaps with the flange when the flange is projected onto the second magnetic detector in the direction perpendicular to the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detector and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in a corresponding orthogonal direction that is perpendicular to the axial direction and is directed to the one of the plurality of magnetic poles;

in the state where the torque is not generated, the second magnetic detector overlaps with another one of the plurality of magnetic poles, which has a polarity that is different from a polarity of the one of the plurality of magnetic poles, when the another one of the plurality of magnetic poles is projected onto the second magnetic detector in a corresponding orthogonal direction that is perpendicular to the axial direction and is directed to the another one of the plurality of magnetic poles; and the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum.

Seventh Aspect

The torque detection system according to any one of the first to sixth aspects, wherein:

each of the plurality of claws has:

a connecting portion which is joined to the ring; and a projecting portion which is joined to the connecting portion and projects from the connecting portion in the axial direction; and the projecting portion of each of the plurality of claws has a symmetrical shape that is symmetrical in the axial direction with respect to a plane that passes through a center of the projecting portion and is perpendicular to the axial direction.

Eighth Aspect

The torque detection system according to the seventh aspect, wherein:

the projecting portion of each of the plurality of claws is shaped in a prism form and has a bottom surface and a peripheral surface;

the bottom surface is perpendicular to the axial direction; and the peripheral surface is joined to the bottom surface and extends from the bottom surface in the axial direction.

Ninth Aspect

The torque detection system according to any one of the first to sixth aspects, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface has a round shape.

Tenth Aspect

The torque detection system according to any one of the first to sixth aspects, wherein:

each of the plurality of claws has:
  a connecting portion which is joined to the ring; and
  a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface forms a tilted surface that is tilted relative to the bottom surface and the peripheral surface.

Eleventh Aspect

The torque detection system according to any one of the first to sixth aspects, wherein:

the ring is a first ring;

the plurality of claws is a plurality of first claws;

the at least one yoke further includes a second ring and a plurality of second claws;

the second ring is configured to be rotated together with the rotor;

the plurality of second claws project from the second ring in the axial direction and are thereby opposed to the magnet in the direction that is perpendicular to the axial direction, wherein the plurality of second claws are configured to be rotated together with the second ring and thereby collect the magnetic field generated by the magnet;

the first ring is opposed to the second ring in the axial direction;

each of the plurality of first claws has:
  a first connecting portion which is joined to the first ring; and
  a first projecting portion which is joined to the first connecting portion and projects from the first connecting portion in the axial direction;

each of the plurality of second claws has:
  a second connecting portion which is joined to the second ring; and
  a second projecting portion which is joined to the second connecting portion and projects from the second connecting portion in the axial direction; and a length of the first projecting portion of each of the plurality of first claws in the axial direction and a length of the second projecting portion of each of the plurality of second claws in the axial direction are respectively set to be equal to or larger than 30% of a distance from the first ring to the second ring in the axial direction.

Twelfth Aspect

The torque detection system according to any one of the first to eleventh aspects, wherein:

each of the plurality of claws intersects a magnet center plane that passes through a center of the magnet centered in the axial direction and is perpendicular to the axial direction; and a strength of a magnetic force of the magnet increases from the magnet center plane toward an outside of the magnet in the axial direction.

Thirteenth Aspect

The torque detection system according to any one of the first to eleventh aspects, wherein:

each of the plurality of claws intersects a pass-through plane that passes through the first magnetic detector and is perpendicular to the axial direction;

the magnet intersects the pass-through plane; and a strength of a magnetic force of the magnet increases from the pass-through plane toward an outside of the magnet in the axial direction.

Fourteenth Aspect

The torque detection system according to any one of the first to eleventh aspects, wherein:

each of the plurality of claws intersects a magnet center plane that passes through a center of the magnet centered in the axial direction and is perpendicular to the axial direction; and a portion of the magnet, which intersects the magnet center plane, is unmagnetized.

Fifteenth Aspect

The torque detection system according to any one of the first to eleventh aspects, wherein:

each of the plurality of claws intersects a pass-through plane that passes through the first magnetic detector and is perpendicular to the axial direction;

the magnet intersects the pass-through plane; and a portion of the magnet, which intersects the pass-through plane, is unmagnetized.

What is claimed is:

1. A torque detection system configured to detect a torque generated at a detection subject, comprising:
  a torque sensor that includes:
    a magnet that is configured to generate a magnetic field and is configured to be rotated together with the detection subject about an axis of the magnet which extends in an axial direction of the magnet;
    a rotor that is shaped in a ring form and is configured to be rotated together with the detection subject;
    at least one yoke that includes:
      a ring which is shaped in a ring form and is configured to be rotated together with the rotor; and
      a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet;

a first magnetic detector that overlaps with the ring when the ring is projected onto the first magnetic detector in the axial direction, wherein the first magnetic detector is configured to detect a strength of the magnetic field which corresponds to the torque and changes in response to a change in a relative angle of the at least one yoke relative to the magnet in a rotational direction of the magnet; and a second magnetic detector that overlaps with the ring when the ring is projected onto the second magnetic detector in the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detector and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in a corresponding orthogonal direction that is perpendicular to the axial direction and is directed to the one of the plurality of magnetic poles;

in the state where the torque is not generated, the second magnetic detector overlaps with another one of the plurality of magnetic poles, which has a polarity that is different from a polarity of the one of the plurality of magnetic poles, when the another one of the plurality of magnetic poles is projected onto the second magnetic detector in a corresponding orthogonal direction that is perpendicular to the axial direction and is directed to the another one of the plurality of magnetic poles;

the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum; and the torque sensor does not include a magnetism collecting element, which is configured to guide the magnetic field that is changed by the at least one yoke, to the first magnetic detector and the second magnetic detector.

2. The torque detection system according to claim 1, wherein the first magnetic detector and the second magnetic detector are arranged on a common circle that is centered on the axis of the magnet.

3. The torque detection system according to claim 1, wherein:

the magnet is magnetized such that the plurality of magnetic poles are arranged in the rotational direction of the magnet such that the polarities of the plurality of magnetic poles are alternately reversed in the rotational direction of the magnet; and an angle in the rotational direction of the magnet between one line, which connects between the axis of the magnet and the first magnetic detector, and another line, which connects between the axis of the magnet and the second magnetic detector, is set to be an angle that is expressed by $360°÷n×a$, where n denotes a number of the plurality of magnetic poles of the magnet, and a denotes an odd number.

4. The torque detection system according to claim 1, wherein:

the magnet is magnetized such that the plurality of magnetic poles are arranged in the rotational direction of the magnet such that the polarities of the plurality of magnetic poles are alternately reversed in the rotational direction of the magnet; and a number of the plurality of magnetic poles is the same as a number of the plurality of claws of the at least one yoke.

5. The torque detection system according to claim 1, wherein:

each of the plurality of claws has:

a connecting portion which is joined to the ring; and a projecting portion which is joined to the connecting portion and projects from the connecting portion in the axial direction; and the projecting portion of each of the plurality of claws has a symmetrical shape that is symmetrical in the axial direction with respect to a plane that passes through a center of the projecting portion and is perpendicular to the axial direction.

6. The torque detection system according to claim 5, wherein:

the projecting portion of each of the plurality of claws is shaped in a prism form and has a bottom surface and a peripheral surface;

the bottom surface is perpendicular to the axial direction; and the peripheral surface is joined to the bottom surface and extends from the bottom surface in the axial direction.

7. The torque detection system according to claim 1, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface has a round shape.

8. The torque detection system according to claim 1, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface forms a tilted surface that is tilted relative to the bottom surface and the peripheral surface.

9. The torque detection system according to claim 1, wherein:

the ring is a first ring;

the plurality of claws is a plurality of first claws;

the at least one yoke further includes a second ring and a plurality of second claws;

the second ring is configured to be rotated together with the rotor;

the plurality of second claws project from the second ring in the axial direction and are thereby opposed to the magnet in the direction that is perpendicular to the axial direction, wherein the plurality of second claws are configured to be rotated together with the second ring and thereby collect the magnetic field generated by the magnet;

the first ring is opposed to the second ring in the axial direction;

each of the plurality of first claws has:

a first connecting portion which is joined to the first ring; and a first projecting portion which is joined to the first connecting portion and projects from the first connecting portion in the axial direction;

each of the plurality of second claws has:

a second connecting portion which is joined to the second ring; and a second projecting portion which is joined to the second connecting portion and projects from the second connecting portion in the axial direction; and a length of the first projecting portion of each of the plurality of first claws in the axial direction and a length of the second projecting portion of each of the plurality of second claws in the axial direction are respectively set to be equal to or larger than 30% of a distance from the first ring to the second ring in the axial direction.

10. The torque detection system according to claim 1, wherein:

each of the plurality of claws intersects a magnet center plane that passes through a center of the magnet centered in the axial direction and is perpendicular to the axial direction; and a strength of a magnetic force of the magnet increases from the magnet center plane toward an outside of the magnet in the axial direction.

11. The torque detection system according to claim 1, wherein:

each of the plurality of claws intersects a pass-through plane that passes through the first magnetic detector and is perpendicular to the axial direction;

the magnet intersects the pass-through plane; and a strength of a magnetic force of the magnet increases from the pass-through plane toward an outside of the magnet in the axial direction.

12. The torque detection system according to claim 1, wherein:

each of the plurality of claws intersects a magnet center plane that passes through a center of the magnet centered in the axial direction and is perpendicular to the axial direction; and a portion of the magnet, which intersects the magnet center plane, is unmagnetized.

13. The torque detection system according to claim 1, wherein:

each of the plurality of claws intersects a pass-through plane that passes through the first magnetic detector and is perpendicular to the axial direction;

the magnet intersects the pass-through plane; and a portion of the magnet, which intersects the pass-through plane, is unmagnetized.

14. A torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:

a ring which is shaped in a ring form and is configured to be rotated together with the rotor; and a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet;

a first magnetic detector that overlaps with the ring when the ring is projected onto the first magnetic detector in the axial direction, wherein the first magnetic detector is configured to detect a strength of the magnetic field which corresponds to the torque and changes in response to a change in a relative angle of the at least one yoke relative to the magnet in a rotational direction of the magnet; and a second magnetic detector that overlaps with the ring when the ring is projected onto the second magnetic detector in the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detector and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in an orthogonal direction that is perpendicular to the axial direction and is directed to the one of the plurality of magnetic poles, and the first magnetic detector is placed in the axial direction on one side of a center line, which passes through a center of the one of the plurality of magnetic poles and extends in the orthogonal direction that is perpendicular to the axial direction;

in the state where the torque is not generated, the second magnetic detector overlaps with the one of the plurality of magnetic poles when the one of the plurality of magnetic poles is projected onto the second magnetic detector in the orthogonal direction that is perpendicular to the axial direction, and the second magnetic detector is placed in the axial direction on another side of the center line which is opposite to the one side; and the calculation processor is configured to calculate a sum of a value, which relates to a detected strength of the magnetic field detected by the first magnetic detector, and a value, which relates to a detected strength of the magnetic field detected by the second magnetic detector, and the calculation processor is configured to calculate the torque based on the sum.

15. The torque detection system according to claim 14, wherein:

each of the plurality of claws has:

a connecting portion which is joined to the ring; and a projecting portion which is joined to the connecting portion and projects from the connecting portion in the axial direction; and the projecting portion of each of the plurality of claws has a symmetrical shape that is symmetrical in the axial direction with respect to a plane that passes through a center of the projecting portion and is perpendicular to the axial direction.

16. The torque detection system according to claim 15, wherein:

the projecting portion of each of the plurality of claws is shaped in a prism form and has a bottom surface and a peripheral surface;

the bottom surface is perpendicular to the axial direction; and the peripheral surface is joined to the bottom surface and extends from the bottom surface in the axial direction.

17. The torque detection system according to claim 14, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface has a round shape.

18. The torque detection system according to claim 14, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface forms a tilted surface that is tilted relative to the bottom surface and the peripheral surface.

19. The torque detection system according to claim 14, wherein:

the ring is a first ring;

the plurality of claws is a plurality of first claws;

the at least one yoke further includes a second ring and a plurality of second claws;

the second ring is configured to be rotated together with the rotor;

the plurality of second claws project from the second ring in the axial direction and are thereby opposed to the magnet in the direction that is perpendicular to the axial direction, wherein the plurality of second claws are configured to be rotated together with the second ring and thereby collect the magnetic field generated by the magnet;

the first ring is opposed to the second ring in the axial direction;

each of the plurality of first claws has:

a first connecting portion which is joined to the first ring; and a first projecting portion which is joined to the first connecting portion and projects from the first connecting portion in the axial direction;

each of the plurality of second claws has:

a second connecting portion which is joined to the second ring; and a second projecting portion which is joined to the second connecting portion and projects from the second connecting portion in the axial direction; and a length of the first projecting portion of each of the plurality of first claws in the axial direction and a length of the second projecting portion of each of the plurality of second claws in the axial direction are respectively set to be equal to or larger than 30% of a distance from the first ring to the second ring in the axial direction.

20. The torque detection system according to claim 14, wherein:

each of the plurality of claws intersects a magnet center plane that passes through a center of the magnet centered in the axial direction and is perpendicular to the axial direction; and a strength of a magnetic force of the magnet increases from the magnet center plane toward an outside of the magnet in the axial direction.

21. The torque detection system according to claim 14, wherein:

each of the plurality of claws intersects a pass-through plane that passes through the first magnetic detector and is perpendicular to the axial direction;

the magnet intersects the pass-through plane; and a strength of a magnetic force of the magnet increases from the pass-through plane toward an outside of the magnet in the axial direction.

22. The torque detection system according to claim 14, wherein:

each of the plurality of claws intersects a magnet center plane that passes through a center of the magnet centered in the axial direction and is perpendicular to the axial direction; and a portion of the magnet, which intersects the magnet center plane, is unmagnetized.

23. The torque detection system according to claim 14, wherein:

each of the plurality of claws intersects a pass-through plane that passes through the first magnetic detector and is perpendicular to the axial direction;

the magnet intersects the pass-through plane; and a portion of the magnet, which intersects the pass-through plane, is unmagnetized.

24. A torque detection system configured to detect a torque generated at a detection subject, comprising:

a torque sensor that includes:

a magnet that is configured to generate a magnetic field and is configured to be rotated together with the detection subject about an axis of the magnet which extends in an axial direction of the magnet;

a rotor that is shaped in a ring form and is configured to be rotated together with the detection subject;

at least one yoke that includes:

a ring which is shaped in a ring form and is config-ured to be rotated together with the rotor;

a plurality of claws which project from the ring in the axial direction and are thereby opposed to the magnet in a direction that is perpendicular to the axial direction, wherein the plurality of claws are configured to be rotated together with the ring and thereby collect the magnetic field generated by the magnet; and a flange which projects from the ring in the axial direction;

a first magnetic detector that overlaps with the flange when the flange is projected onto the first magnetic detector in the direction perpendicular to the axial direction, wherein the first magnetic detector is con-figured to detect a strength of the magnetic field which corresponds to the torque and changes in response to a change in a relative angle of the at least one yoke relative to the magnet in a rotational direction of the magnet; and a second magnetic detector that overlaps with the flange when the flange is projected onto the second magnetic detector in the direction perpendicular to the axial direction, wherein the second magnetic detector is configured to detect the strength of the magnetic field which corresponds to the torque and changes in response to the change in the relative angle of the at least one yoke relative to the magnet in the rotational direction of the magnet; and a calculation processor that is configured to calculate the torque based on a signal from the first magnetic detec-tor and a signal from the second magnetic detector, wherein:

in a state where the torque is not generated, the first magnetic detector overlaps with one of a plurality of magnetic poles of the magnet when the one of the plurality of magnetic poles is projected onto the first magnetic detector in a corresponding orthogonal direc-tion that is perpendicular to the axial direction and is directed to the one of the plurality of magnetic poles;

in the state where the torque is not generated, the second magnetic detector overlaps with another one of the plurality of magnetic poles, which has a polarity that is different from a polarity of the one of the plurality of magnetic poles, when the another one of the plurality of magnetic poles is projected onto the second magnetic detector in a corresponding orthogonal direction that is perpendicular to the axial direction and is directed to the another one of the plurality of magnetic poles; and the calculation processor is configured to calculate a sum of a value, which relates to a detected strength of the magnetic field detected by the first magnetic detector, and a value, which relates to a detected strength of the magnetic field detected by the second magnetic detec-tor, and the calculation processor is configured to calculate the torque based on the sum.

25. The torque detection system according to claim 24, wherein:

each of the plurality of claws has:

a connecting portion which is joined to the ring; and a projecting portion which is joined to the connecting portion and projects from the connecting portion in the axial direction; and the projecting portion of each of the plurality of claws has a symmetrical shape that is symmetrical in the axial direction with respect to a plane that passes through a center of the projecting portion and is perpendicular to the axial direction.

26. The torque detection system according to claim 25, wherein:

the projecting portion of each of the plurality of claws is shaped in a prism form and has a bottom surface and a peripheral surface;

the bottom surface is perpendicular to the axial direction; and the peripheral surface is joined to the bottom surface and extends from the bottom surface in the axial direction.

27. The torque detection system according to claim 24, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface has a round shape.

28. The torque detection system according to claim 24, wherein:

each of the plurality of claws has:

a connecting portion which is joined to the ring; and a projecting portion which is joined to the connecting portion and projects from the connecting portion in the axial direction;

the projecting portion of each of the plurality of claws is shaped in a prism form and has a bottom surface and a peripheral surface;

the bottom surface is perpendicular to the axial direction;

the peripheral surface is joined to the bottom surface and extends from the bottom surface in the axial direction; and at least one boundary part between the bottom surface and the peripheral surface forms a tilted surface that is tilted relative to the bottom surface and the peripheral sur-face.

29. The torque detection system according to claim 24, wherein:

the ring is a first ring;

the plurality of claws is a plurality of first claws;

the at least one yoke further includes a second ring and a plurality of second claws;

the second ring is configured to be rotated together with the rotor;

the plurality of second claws project from the second ring in the axial direction and are thereby opposed to the magnet in the direction that is perpendicular to the axial direction, wherein the plurality of second claws are configured to be rotated together with the second ring and thereby collect the magnetic field generated by the magnet;

the first ring is opposed to the second ring in the axial direction;

each of the plurality of first claws has:

a first connecting portion which is joined to the first ring; and a first projecting portion which is joined to the first connecting portion and projects from the first connecting portion in the axial direction;

each of the plurality of second claws has:

a second connecting portion which is joined to the second ring; and a second projecting portion which is joined to the second connecting portion and projects from the second connecting portion in the axial direction; and a length of the first projecting portion of each of the plurality of first claws in the axial direction and a length of the second projecting portion of each of the plurality of second claws in the axial direction are respectively set to be equal to or larger than 30% of a distance from the first ring to the second ring in the axial direction.

30. The torque detection system according to claim 24, wherein:

each of the plurality of claws intersects a magnet center plane that passes through a center of the magnet centered in the axial direction and is perpendicular to the axial direction; and a strength of a magnetic force of the magnet increases from the magnet center plane toward an outside of the magnet in the axial direction.

31. The torque detection system according to claim 24, wherein:

each of the plurality of claws intersects a pass-through plane that passes through the first magnetic detector and is perpendicular to the axial direction;

the magnet intersects the pass-through plane; and a strength of a magnetic force of the magnet increases from the pass-through plane toward an outside of the magnet in the axial direction.

32. The torque detection system according to claim 24, wherein:

each of the plurality of claws intersects a magnet center plane that passes through a center of the magnet centered in the axial direction and is perpendicular to the axial direction; and a portion of the magnet, which intersects the magnet center plane, is unmagnetized.

33. The torque detection system according to claim 24, wherein:

each of the plurality of claws intersects a pass-through plane that passes through the first magnetic detector and is perpendicular to the axial direction;

the magnet intersects the pass-through plane; and a portion of the magnet, which intersects the pass-through plane, is unmagnetized.

* * * * *